United States Patent
Jo et al.

(10) Patent No.: US 12,228,684 B2
(45) Date of Patent: Feb. 18, 2025

(54) RANGEFINDER, RANGEFINDING SYSTEM, AND RANGEFINDING METHOD

(71) Applicant: SONY SEMICONDUCTOR SOLUTIONS CORPORATION, Kanagawa (JP)

(72) Inventors: Kensei Jo, Kanagawa (JP); Tomoya Takeda, Kanagawa (JP); Nana Matsumoto, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 966 days.

(21) Appl. No.: 17/250,517

(22) PCT Filed: Jul. 10, 2019

(86) PCT No.: PCT/JP2019/027353
§ 371 (c)(1),
(2) Date: Jan. 31, 2021

(87) PCT Pub. No.: WO2020/031603
PCT Pub. Date: Feb. 13, 2020

(65) Prior Publication Data
US 2021/0293939 A1   Sep. 23, 2021

(30) Foreign Application Priority Data
Aug. 7, 2018   (JP) .................. 2018-148529

(51) Int. Cl.
*G01S 7/4865* (2020.01)
*G01S 17/46* (2006.01)
*G01S 17/89* (2020.01)

(52) U.S. Cl.
CPC ............ *G01S 7/4865* (2013.01); *G01S 17/46* (2013.01); *G01S 17/89* (2013.01)

(58) Field of Classification Search
CPC ........ G01S 7/4815; G01S 7/484; G01S 7/486; G01S 7/4861; G01S 7/4865; G01S 7/497;
(Continued)

(56) References Cited

U.S. PATENT DOCUMENTS

| 6,373,428 B1 | 4/2002 | McEwan |
| 9,739,609 B1 | 8/2017 | Lewis |

(Continued)

FOREIGN PATENT DOCUMENTS

| CN | 101981468 A | 2/2011 |
| CN | 105393083 A | 3/2016 |

(Continued)

OTHER PUBLICATIONS

International Search Report and Written Opinion of PCT Application No. PCT/JP2019/027353, issued on Sep. 17, 2019, 13 pages of ISRWO.

*Primary Examiner* — Yuqing Xiao
*Assistant Examiner* — Benjamin Richard Hebert
(74) *Attorney, Agent, or Firm* — CHIP LAW GROUP

(57) ABSTRACT

To achieve a configuration of controlling a light source unit having a plurality of light sources and a rangefinder by individual clocks to allow for setting the light sources at optional positions. The output light of a plurality of light sources of the light source unit is reflected from an object's surface, and a ToF sensor captures the reflected light to calculate the distance to the object. A sensor clock that controls the image capturing timing of the ToF sensor is the clock specific to the rangefinder, which is different from a light source unit clock that controls the light emission timing of the light sources of the light source unit. The rangefinder creates a difference calculation formula of a plurality of distance calculation formulas used to calculate the distance from each light source to the rangefinder to calculate the (Continued)

distance to the object using the created difference calculation formula.

17 Claims, 38 Drawing Sheets

(58) Field of Classification Search
CPC .......... G01S 17/08; G01S 17/10; G01S 17/46; G01S 17/88; G01S 17/89
See application file for complete search history.

(56) References Cited

U.S. PATENT DOCUMENTS

| | | | |
|---|---|---|---|
| 2010/0013711 A1* | 1/2010 | Bartlett | G01S 5/0009 342/442 |
| 2011/0176146 A1* | 7/2011 | Alvarez Diez | G01S 7/4817 356/601 |
| 2013/0242058 A1* | 9/2013 | Bae | G01S 17/894 348/46 |
| 2016/0259032 A1* | 9/2016 | Hehn | H04W 84/18 |
| 2016/0259038 A1* | 9/2016 | Retterath | G01S 17/931 |
| 2018/0088218 A1 | 3/2018 | Kawasaki | |
| 2018/0180733 A1 | 6/2018 | Smits | |
| 2019/0011544 A1* | 1/2019 | Gassend | G01S 17/931 |
| 2019/0101614 A1* | 4/2019 | Lohbihler | G01S 11/06 |

FOREIGN PATENT DOCUMENTS

| | | |
|---|---|---|
| JP | 2010-190675 A | 9/2010 |
| JP | 2018-031607 A | 3/2018 |
| KR | 10-2013-0106094 A | 9/2013 |
| TW | 200905171 A | 2/2009 |
| WO | 2018/125850 A1 | 7/2018 |

* cited by examiner

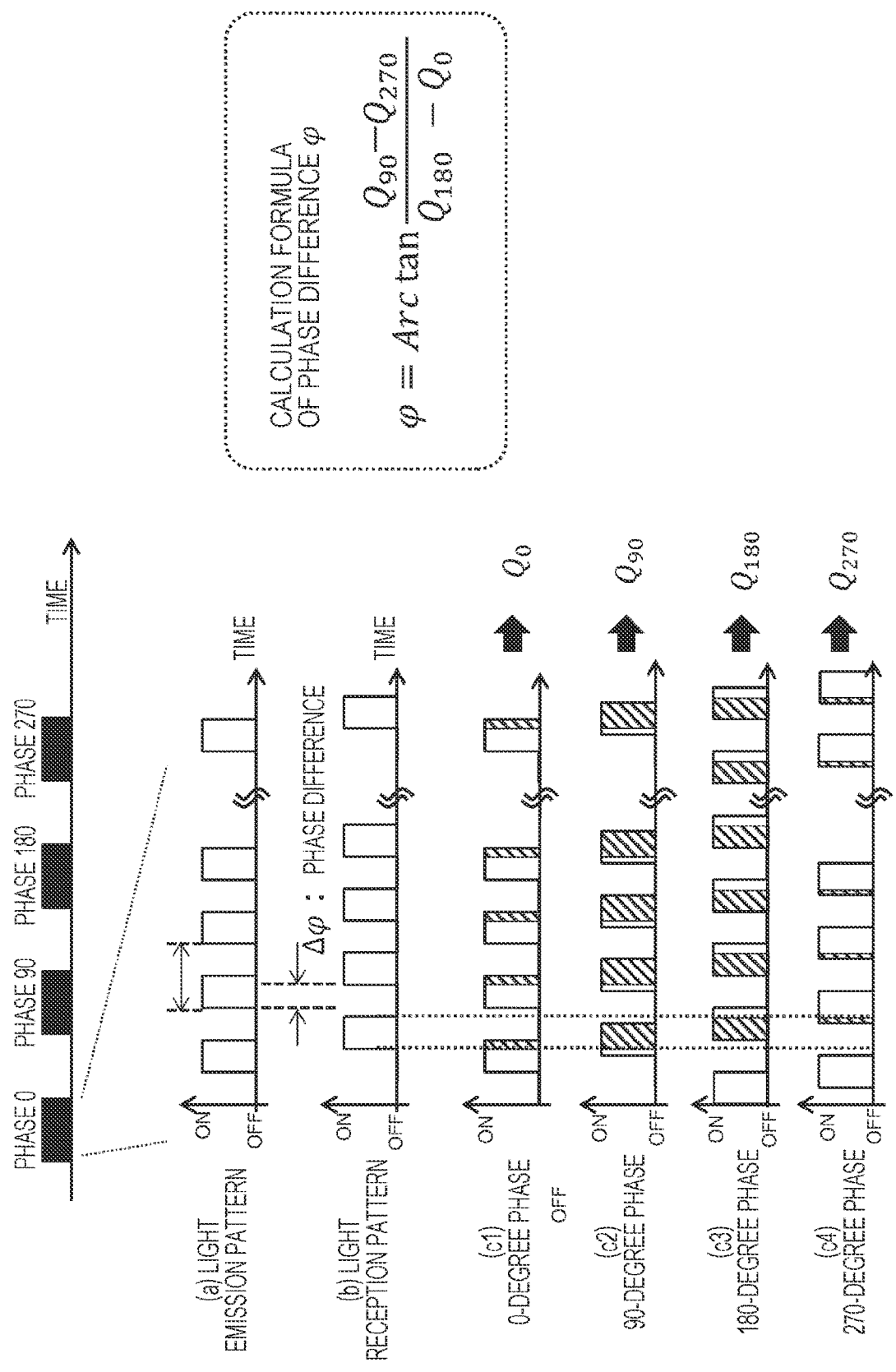

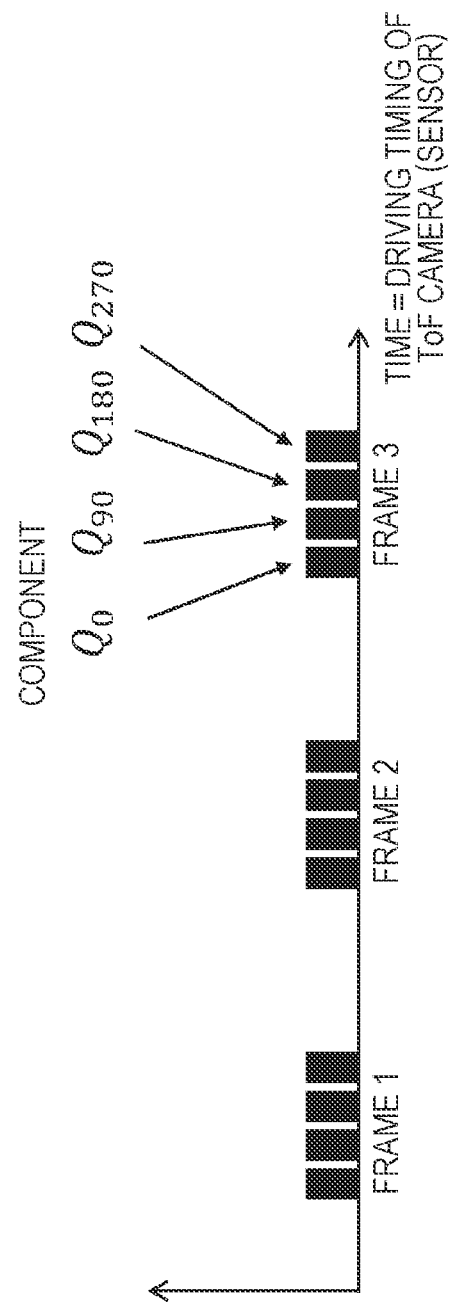

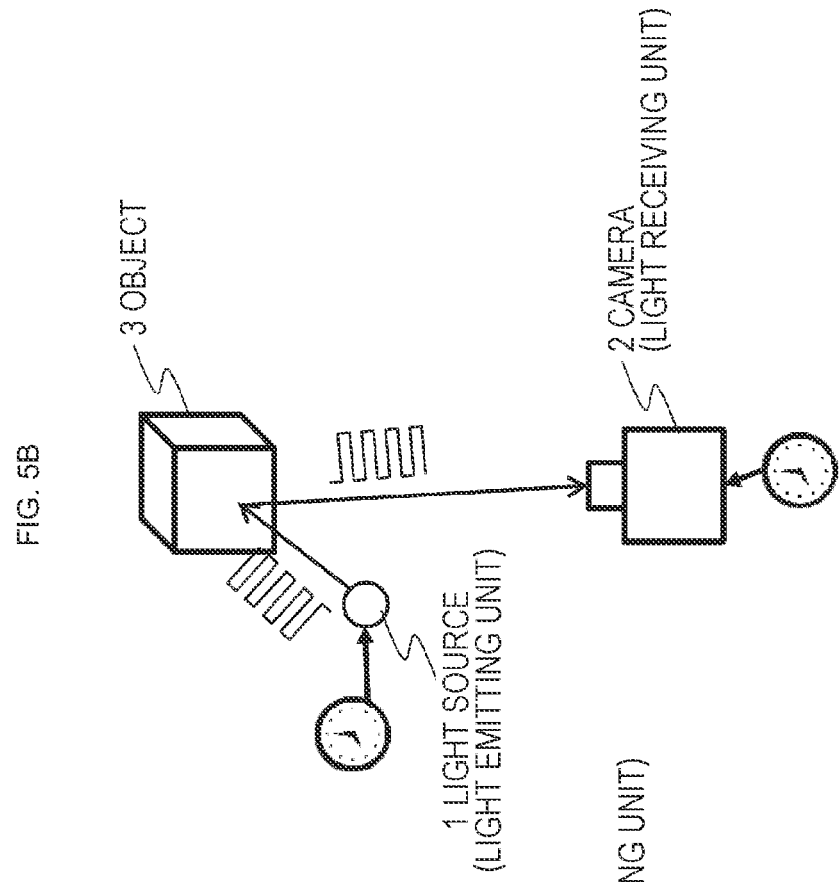
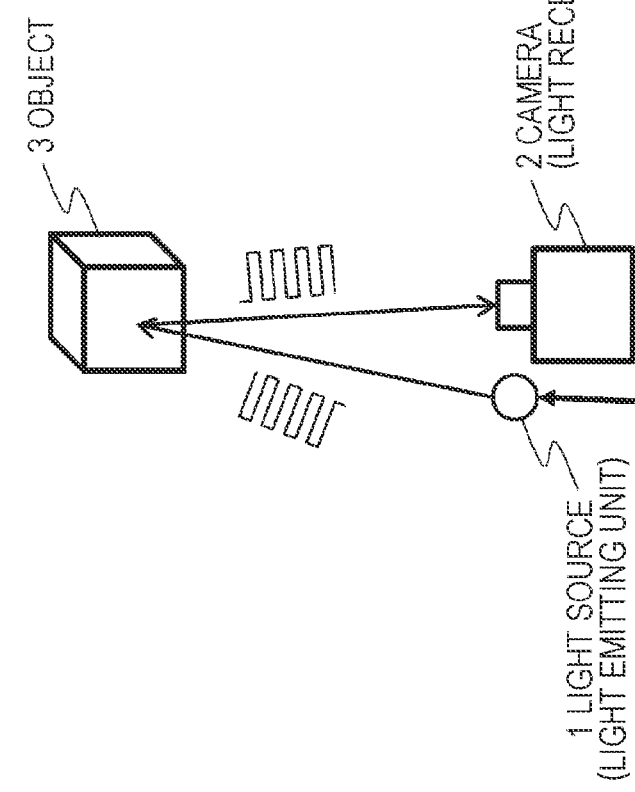

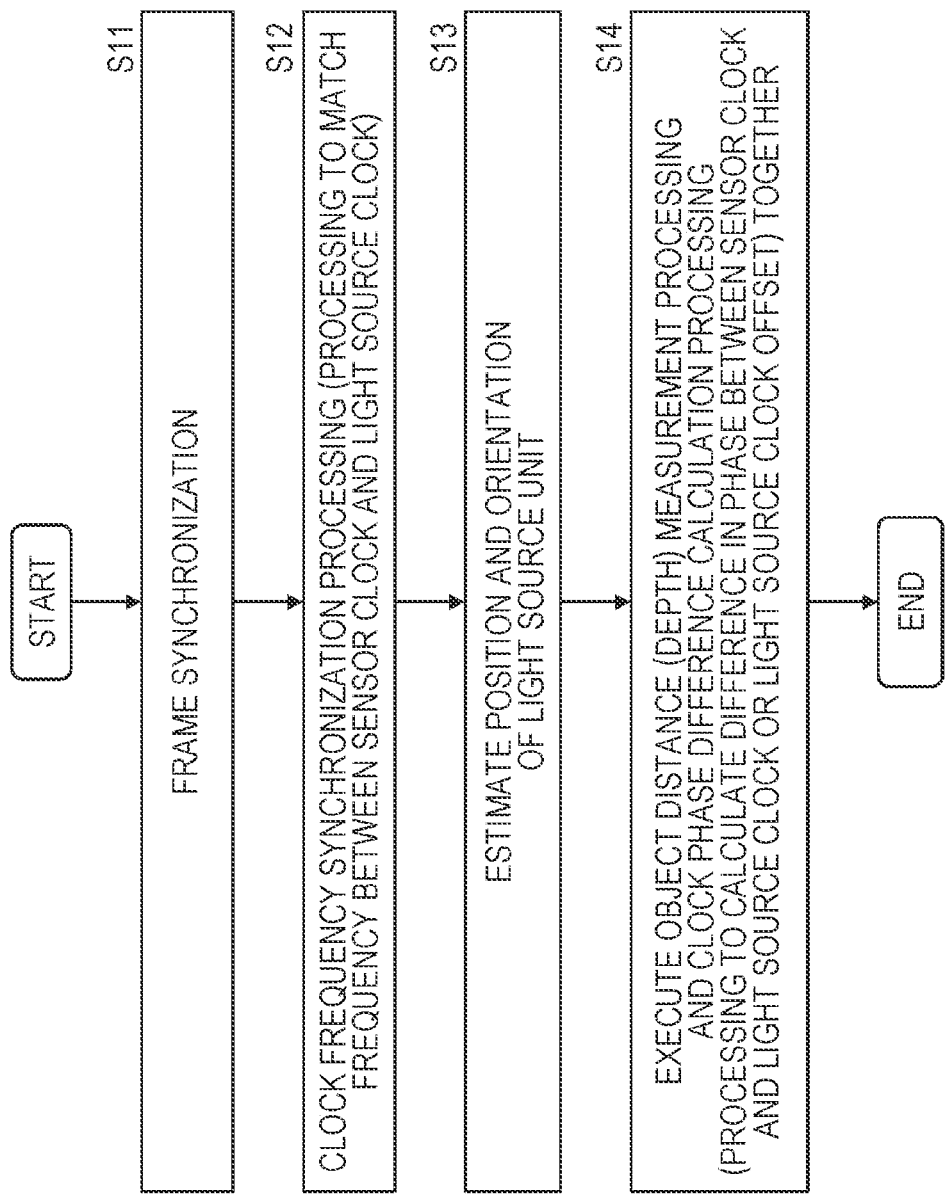

FIG. 22

(A) SIMULTANEOUS EQUATION OF DETERMINING INTERSECTION POINT BETWEEN HYPERBOLOID AND STRAIGHT LINE $$\begin{cases} Obs(\vec{u_D}, \vec{E_1}) - Obs(\vec{u_D}, \vec{E_2}) = |\vec{DE_1}| - |\vec{DE_2}| \Longleftrightarrow \begin{pmatrix} = \text{INDICATE HYPERBOLOID (ONE SHEET) WHERE POSITIONS } \vec{E_1} \text{ AND} \\ \vec{E_2} \text{ OF LIGHT SOURCES a AND b ARE SET AS FOCAL POINTS} \end{pmatrix} \\ \vec{OD} = D\vec{d} \quad \Longleftrightarrow \quad (= \text{INDICATE STRAIGHT LINE}) \end{cases}$$

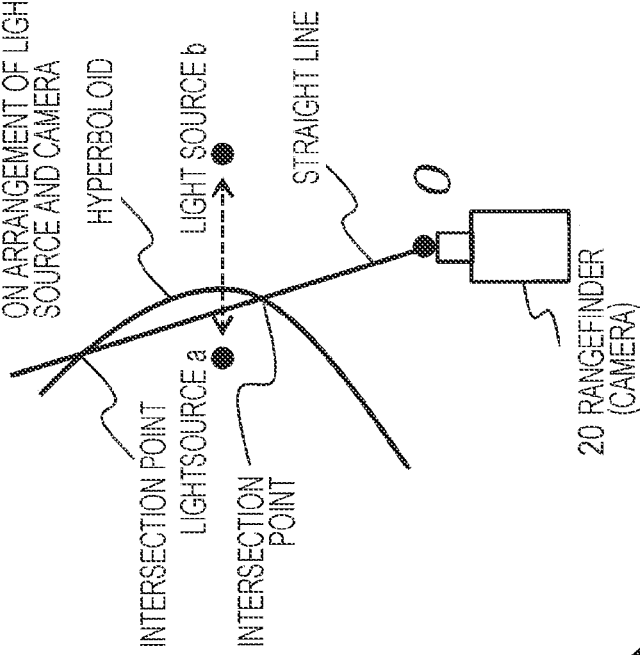

(B1) EXAMPLE 1 OF CALCULATION OF INTERSECTION POINT BETWEEN HYPERBOLOID AND STRAIGHT LINE

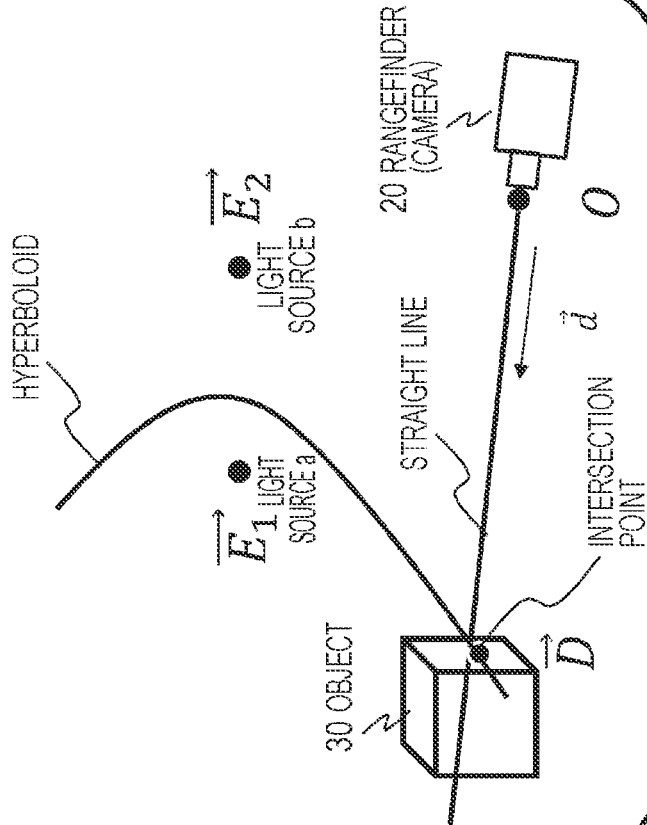

(B2) EXAMPLE 2 OF CALCULATION OF INTERSECTION POINT BETWEEN HYPERBOLOID AND STRAIGHT LINE
POSSIBILITY OF OCCURRENCE OF MULTIPLE SOLUTIONS DEPENDING ON ARRANGEMENT OF LIGHT SOURCE AND CAMERA

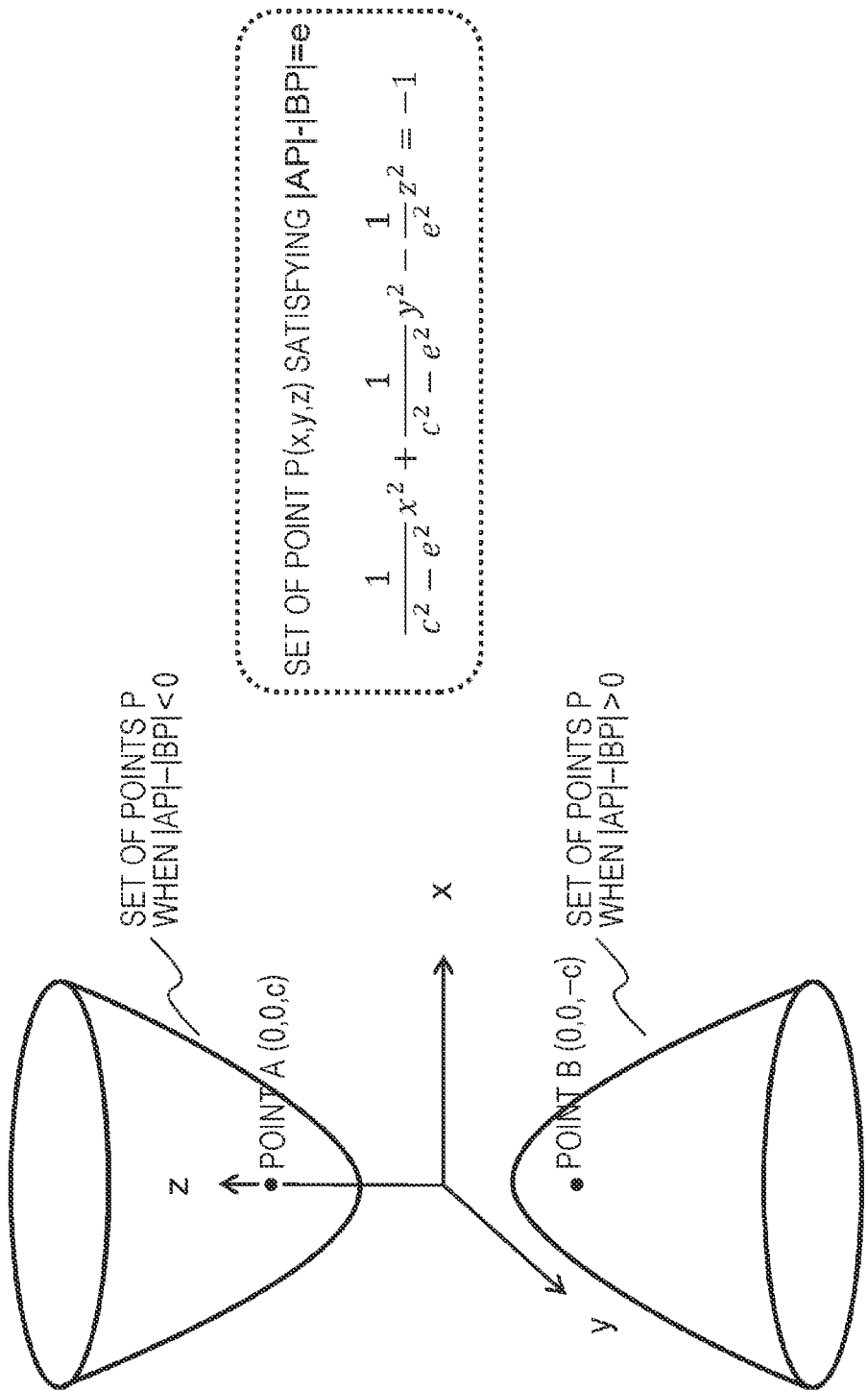

RANGEFINDER, RANGEFINDING SYSTEM, AND RANGEFINDING METHOD

CROSS REFERENCE TO RELATED APPLICATIONS

This application is a U.S. National Phase of International Patent Application No. PCT/JP2019/027353 filed on Jul. 10, 2019, which claims priority benefit of Japanese Patent Application No. JP 2018-148529 filed in the Japan Patent Office on Aug. 7, 2018. Each of the above-referenced applications is hereby incorporated herein by reference in its entirety.

TECHNICAL FIELD

The present disclosure relates to rangefinders, rangefinding systems, rangefinding methods, and programs. In particular, the present disclosure relates to a rangefinder that measures the distance to an object using a time-of-flight (ToF) technique, and a rangefinding system, a rangefinding method, and a program, for implementation thereof.

BACKGROUND ART

The time-of-flight (ToF) technique is known as the technique for measuring the distance to an object or the three-dimensional shape of the object.

The ToF technique is the technique of irradiating an object with light and analyzing the reflected light to measure the distance to the object or the shape of the object.

A rangefinder using the ToF technique employs what is called a ToF camera in which a light-emitting unit (a light source) and a light-receiving unit (camera) are integrated. The rangefinder has a configuration of irradiating an object to be measured (a rangefinding target object) with output light from the light source and receiving the reflected light with a camera.

However, in this configuration, the light output from the light source integrated with the camera follows a round-trip path in which the light reaches the object, is reflected from the object's surface, and returns to the camera side. When the distance from the camera to the object is d, the optical path is 2d that is twice the distance d. Thus, a longer optical path reduces the intensity of the light input to the camera, causing a problem with lower rangefinding accuracy. In particular, in measuring the distance to an object far from the camera, the decrease in measurement accuracy is remarkable.

Patent Document 1 (Japanese Patent Application Laid-open No. 2018-31607), which is an earlier patent application by the same applicant, discloses a device in which the output light of the light source configured independently from and located away from the camera is directly received by the camera to measure the distance from the camera to the light source.

This configuration allows, in the case where the distance between the light source and the camera is d, the output light of the light source also to enter the camera via only the path of the distance d, making it possible to prevent the decrease in measurement accuracy due to the reduction in light intensity described above.

However, the configuration disclosed in Patent Document 1 is based on the assumption that the camera directly observes the light source. Thus, it fails to be used unless the dynamic range of the sensor is wide. For example, direct observation of the light source necessitates short exposure time to avoid saturation but causing a problem of blacking out the surrounding subjects. Besides, it does not teach a solution to the problem caused by the clock deviation between the light source and the camera.

CITATION LIST

Patent Document

Patent Document 1: Japanese Patent Application Laid-Open No. 2018-31607

SUMMARY OF THE INVENTION

Problems to be Solved by the Invention

The present disclosure is made in view of, for example, the problems described above. It is directed to provide a rangefinder, rangefinding system, rangefinding method, and program, capable of preventing a decrease in measurement accuracy due to reduced light intensity even for common objects other than a light source.

Furthermore, one embodiment of the present disclosure places a light-emitting unit (light source) and a light-receiving unit (camera) at separate positions, allowing the light-emitting unit (light source) and the light-receiving unit (camera) to be controlled with individual clocks. Accordingly, it provides a rangefinder, rangefinding system, rangefinding method, and program, allowing for measurement of a distance to an object and three-dimensional shape of the object using the ToF technique by causing the reflected light of the light emitted from the light-emitting unit (light source) onto the object to be directed to the light-receiving unit (camera).

Solutions to Problems

According to a first aspect of the present disclosure, there is provided a rangefinder including:
  a time-of-flight (ToF) sensor configured to receive light reflected from a surface of an object, the reflected light being output from each of a plurality of light sources included in a light source unit; and
  a distance calculation unit configured to analyze an output of the ToF sensor to calculate a distance to the object, in which the ToF sensor has an image capturing timing controlled by a sensor clock and the light source unit has a light source-light emission timing controlled by a light source unit clock, the sensor clock being a clock specific to the rangefinder, different from the light source unit clock.

Further, according to a second aspect of the present disclosure, there is provided a rangefinding system including:
  a light source unit having a plurality of light sources; and
  a rangefinder configured to receive light reflected from a surface of an object, the reflected light being output from each light source of the light source unit,
  in which the rangefinder includes
  a time-of-flight (ToF) sensor configured to receive the reflected light from the object, and
  a distance calculation unit configured to analyze an output of the ToF sensor to calculate a distance to the object,
  in which the light source unit has a light source-light emission timing controlled by a light source unit clock and the ToF sensor of the rangefinder has an image capturing timing controlled by a sensor clock, the light source unit clock and the sensor clock being different independent clocks.

Further, according to a third aspect of the present disclosure, there is provided a rangefinding method executed in a rangefinder, the method including:

a step of receiving, by a time-of-flight (ToF) sensor, light reflected from a surface of an object, the reflected light being output from each of a plurality of light sources included in a light source unit; and a distance calculation step of calculating, by a distance calculation unit, a distance to the object by analyzing an output of the ToF sensor, in which the distance calculation step is a step of calculating the distance to the object by creating, as a plurality of distance calculation formulas for calculating a distance from the plurality of light sources of the light source unit to the rangefinder, the plurality of distance calculation formulas formed by data items (a) to (c) as follows:

(a) data regarding a distance between the rangefinder and the object, (b) data regarding a distance between the object and each light source of the light source unit, and (c) an offset C corresponding to a rangefinding error occurring due to a difference in phase between a sensor clock and a light source clock, and further by creating a difference calculation formula for calculating a difference of the respective distance calculation formulas and by using the created difference calculation formula.

Further, according to a fourth aspect of the present disclosure, there is provided a rangefinding method executed in a rangefinding system including a light source unit having a plurality of light sources and a rangefinder configured to receive light being output from each light source of the light source unit and being reflected from a surface of an object, the method including:

a step of emitting, by the light source unit, light from each light source of the light source unit at a light emission timing defined by a light source unit clock;

a step of executing, by a ToF sensor of the rangefinder, image capturing at an image capturing timing defined by a sensor clock different from the light source unit clock; and a step of calculating, by a distance calculation unit of the rangefinder, a distance to the object by analyzing an output of the ToF sensor.

Further, according to a fifth aspect of the present disclosure, there is provided a program causing a rangefinder to execute rangefinding processing including:

a step of causing a time-of-flight (ToF) sensor to receive light reflected from a surface of an object, the reflected light being output from each of a plurality of light sources included in a light source unit; and a distance calculation step of causing a distance calculation unit to calculate a distance to the object by analyzing an output of the ToF sensor, in which the distance calculation step performs processing of creating, as a plurality of distance calculation formulas for calculating a distance from the plurality of light sources of the light source unit to the rangefinder, the plurality of distance calculation formulas formed by data items (a) to (c) as follows:

(a) data regarding a distance between the rangefinder and the object, (b) data regarding a distance between the object and each light source of the light source unit, and (c) an offset C corresponding to a rangefinding error occurring due to a difference in phase between a sensor clock and a light source clock, and further processing of creating a difference calculation formula for calculating a difference of the respective distance calculation formulas and processing of calculating the distance to the object using the created difference calculation formula.

Note that the program of the present disclosure is, for example, a program accessible as a storage medium or a communication medium provided in a non-transitory computer-readable form to an image processing apparatus or a computer system executable of various program codes. Such a program provided in the non-transitory computer-readable form makes it possible for the processing in accordance with the program to be implemented on the information processing apparatus or the computer system.

Still other objects, features, and advantages of the present invention will become apparent from a detailed description based on embodiments of the present disclosure as described later and accompanying drawings. Note that the term "system" herein refers to a logical component set of a plurality of apparatuses and is not limited to a system in which apparatuses of the respective components are provided in the same housing.

Effects of the Invention

One embodiment of the present disclosure achieves a configuration of controlling a light source unit having a plurality of light sources and a rangefinder (camera) by individual clocks to allow for setting the light sources at optional positions.

Specifically, for example, the output light of a plurality of light sources of the light source unit is reflected from an object's surface, and a ToF sensor captures the reflected light to calculate the distance to the object. A sensor clock that controls the image capturing timing of the ToF sensor is the clock specific to the rangefinder, which is different from a light source unit clock that controls the light emission timing of the light sources of the light source unit. The rangefinder creates a difference calculation formula of a plurality of distance calculation formulas used to calculate the distance from each light source to the rangefinder to calculate the distance to the object using the created difference calculation formula.

The present configuration achieves a configuration of controlling a light source unit having a plurality of light sources and a rangefinder (camera) by individual clocks to allow for setting the light sources at optional positions.

Note that the effects described in the present specification are merely examples and are not limited, and there may be additional effects.

BRIEF DESCRIPTION OF DRAWINGS

FIG. 3 is a diagram illustrated to describe an overview of the rangefinding processing using the ToF technique.

FIG. 4 is a diagram illustrated to describe an overview of the rangefinding processing using the ToF technique.

FIGS. 5A and 5B are diagrams illustrated to describe an overview of the processing executed by a rangefinder of the present disclosure.

FIG. 11 is a diagram illustrating a flowchart for describing the entire sequence of the rangefinding using a rangefinding system of the present disclosure.

FIG. 22 is a diagram illustrated to describe exemplary specific processing in performing offset calculation processing based on a clock phase difference and object distance (depth) calculation processing.

FIG. 23 is a diagram illustrated to describe a hyperboloid.

MODE FOR CARRYING OUT THE INVENTION

Figure 1:
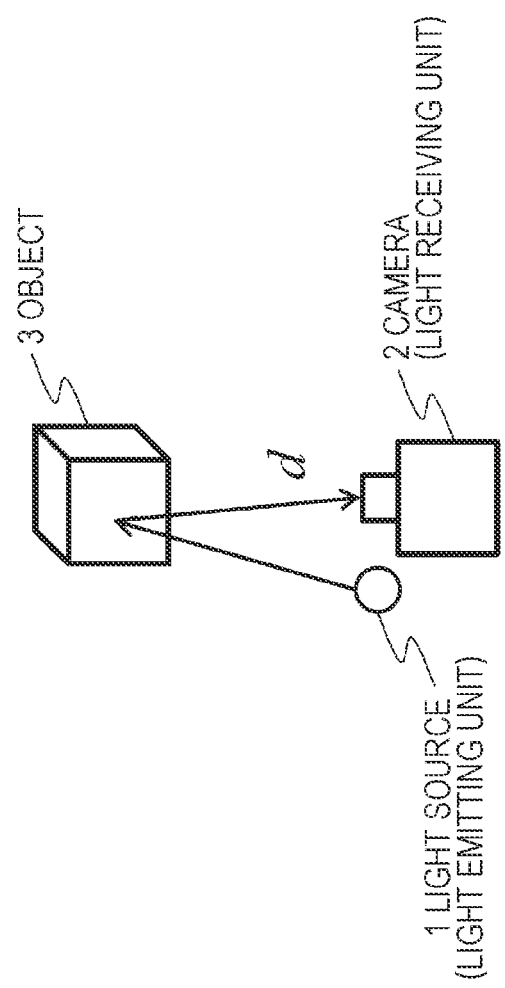
FIG. 1 is a diagram illustrated to describe an overview of the rangefinding processing using the ToF technique.

A description is now in detail given of a rangefinder, a rangefinding system, a rangefinding method, and a program of the present disclosure with reference to the drawings. Moreover, the description is given according to the items described below.

1. Overview of rangefinding processing by ToF technique
2. Overview of processing executed by rangefinder of the present disclosure
3. Sequence of processing executed by rangefinder of the present disclosure
4. Frame synchronization processing
5. Frequency synchronization processing
6. Details of calculation processing of position and orientation of light source unit and specific processing example in performing distance calculation together with position and orientation calculation processing of light source unit
7. Specific processing example in performing offset calculation processing based on clock phase difference and object distance (depth) calculation processing
8. Specific example of object distance (depth) calculation processing in a case of known light source position and light source clock offset 9. Configuration of preventing occurrence of multiple solutions in solutions of simultaneous equation of hyperboloid equation and linear equation
10. Exemplary configuration using multiple light source units
11. Other usage examples of rangefinding system of the present disclosure
12. Exemplary hardware configuration of rangefinder
13. Summary of configuration of the present disclosure

1. Overview of Rangefinding Processing by ToF Technique

The description is now given of an overview of rangefinding processing by the ToF technique.

As described above, the time-of-flight (ToF) technique is one of the techniques for measuring the distance to an object or the object's three-dimensional shape. The ToF technique is the technique of irradiating an object with light and analyzing the reflected light to measure the distance (depth) to the object or the object's shape.

The overview of the distance (depth) measurement processing by the ToF technique is described with reference to FIG. 1 and the subsequent figures. Moreover, although the description below does not particularly mention the three-dimensional shape measurement processing, measuring the distance to the object's surface over the object's entire surface makes it possible to measure the object's three-dimensional shape.

FIG. 1 illustrates a light source (light-emitting unit) 1, a camera (light-receiving unit) 2, and an object 3. The light output from the light source (light-emitting unit) 1 is reflected from the object 3 and incident on the camera (light-receiving unit) 2.

This configuration measures time $\Delta t$ until the output light from the light source 1 is reflected from the object 3 and is incident on the camera 2, allowing a distance (depth) d from the camera 2 to the object 3 to be measured.

The distance d can be calculated according to (Formula 1) as follows:

$$d = (1/2) \times c \times \Delta t \qquad \text{(Formula 1)}$$

where
c is the speed of light.

Moreover, in the figure, the light source 1 and the camera 2 are shown at slightly distant positions for clarity. However, in a common device in the related art, the light emission timing of the light source 1 and the image capturing timing by the camera 2 are controlled by one clock, so the light source 1 and the camera 2 are configured at substantially the same position such as in the same device. Thus, the time $\Delta t$ until the output light from the light source 1 is reflected from the object 3 and is incident on the camera 2 is the time for the light to travel a distance twice the distance (depth) d from the camera 2 to the object 3. This is the reason why "(½)" is multiplied in the formula expressed above for calculating the distance d in (Formula 1).

However, in the configuration illustrated in FIG. 1, the time $\Delta t$ is very short, so a more accurate measurement of the time $\Delta t$ is difficult. Thus, in practice, the difference in time between when the light source 1 emits pulsed light and the camera 2 receives the pulsed light is converted into a phase difference to obtain the distance between them.

This processing is described with reference to FIG. 2.

Figure 2:
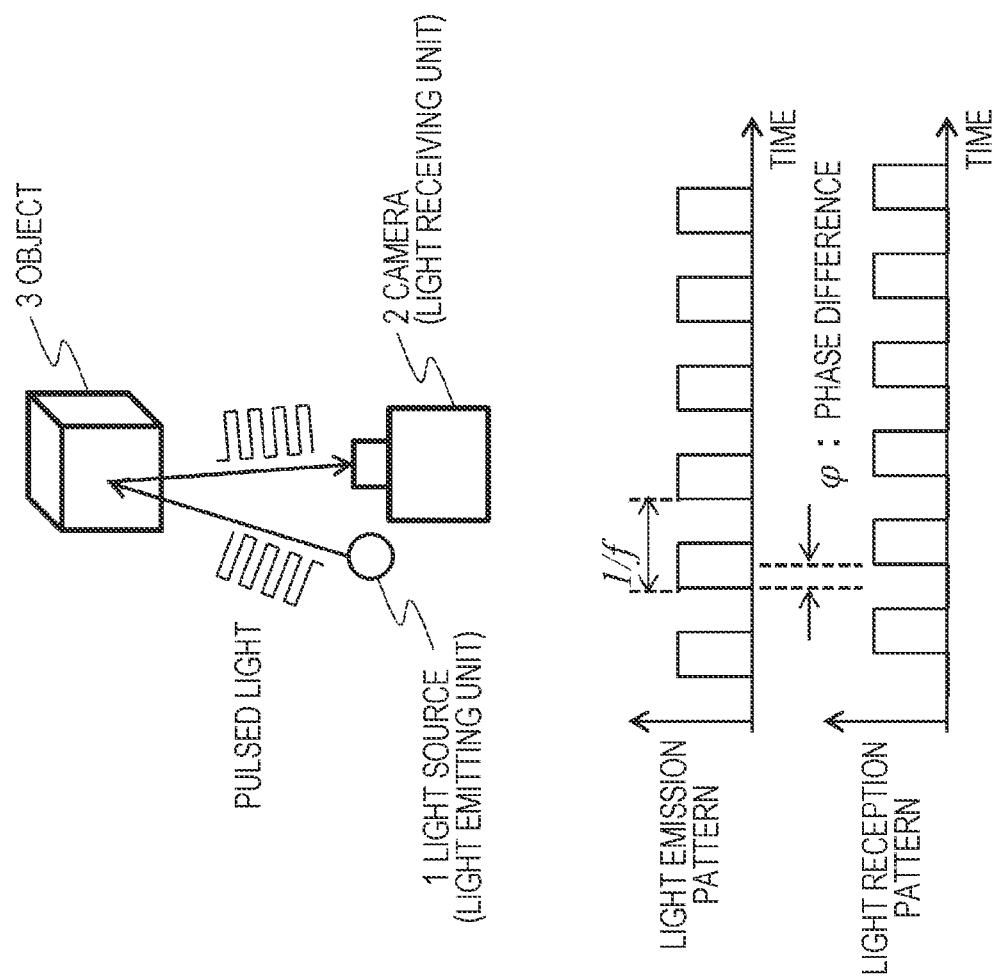
FIG. 2 is a diagram illustrated to describe an overview of the rangefinding processing using the ToF technique.

FIG. 2 illustrates the light source (light-emitting unit) 1, the camera (light-receiving unit) 2, and the object 3, similar to FIG. 1. The light source 1 emits pulsed light, and the camera 2 receives the pulsed light reflected and returned from the object 3.

This configuration allows the difference in time between the pulsed light output from the light source 1 and the pulsed light input to the camera 2 to be converted into a phase difference for observation.

The light source 1 blinks at high speed at the known frequency f [Hz]. In other words, one cycle of the light emission pattern of the light source 1 is 1/f [second]. The camera 2 measures a phase of the light blinking pattern for each pixel. A specific example of this pixel-based phase measurement configuration is described in the subsequent stage with reference to FIG. 3.

For example, it is assumed that the difference in phase between the pulsed light output by the light source 1 and the pulsed light received by the camera 2 is $\varphi$. In this case, time $\Delta t$ until the output light from the light source 1 is reflected from the object 3 and is incident on the camera 2 can be calculated by (Formula 2) as follows.

$$\Delta t = (1/f) \times (\varphi/2\pi) \qquad \text{(Formula 2)}$$

Substituting the time $\Delta t$ calculated by (Formula 2) into (Formula 1) previously described makes it possible to calculate the distance d from the camera 2 (or the light source 1) to the object 3 using (Formula 3) as follows:

$$d = (c\varphi)/4\pi f \qquad \text{(Formula 3)}$$

where
c is the speed of light,
$\varphi$ is the difference between the phase of the pulsed light output from the light source 1 and the phase of the received pulsed light of the camera 2, and
f is the frequency of pulsed light.

The phase calculation configuration of the pulsed light in pixel units in the camera 2 is described with reference to FIG. 3.

The camera 2 described with reference to FIGS. 1 and 2 is a ToF camera different from a normal camera, and each pixel repeats ON/OFF at high speed and accumulates charge only during the ON period.

In measuring the distance to an object using the ToF camera,
the ON/OFF execution timing is sequentially switched, and the accumulated charge at each timing is analyzed. The switching patterns of the ON/OFF execution timing are, for example, four types shown on the left side of FIG. 3 as follows.
(c1) 0-degree phase
(c2) 90-degree phase
(c3) 180-degree phase
(c4) 270-degree phase The phase of 0 degrees of (c1) is set such that ON timing (light reception timing) is the phase of the pulsed light output by the light source 1, that is, the same phase as the light emission pattern of (a) shown on the left side of FIG. 3.

The phase of 90 degrees of (c2) is set such that the ON timing (light reception timing) is 90 degrees behind the pulsed light (light emission pattern of (a)) output by the light source 1.

The phase of 180 degrees of (c3) is set such that the ON timing (light reception timing) is 180 degrees behind the pulsed light (light emission pattern of (a)) output by the light source 1.

The phase of 270 degrees of (c4) is set such that the ON timing (light reception timing) is 270 degrees behind the pulsed light (light emission pattern of (a)) output by the light source 1.

The camera 2 sequentially executes these four types of switching to acquire light-received amounts with the light reception timing changed. In other words, four types of light-received amounts with different accumulation phases and electric charges depending on the light-received amounts are obtained.

For example, the electric charges accumulated in the case where the phase differences of the light-receiving pixels for the light emission patterns are 0 degrees, 90 degrees, 180 degrees, and 270 degrees are assumed to be set to $Q_0$, $Q_{90}$, $Q_{180}$, and $Q_{270}$, respectively.

In this connection, the phase difference φ used to calculate the distance d to the object by applying (Formula 3) described above is the difference in phase between the pulsed light output from the light source 1 and the pulsed light received by the camera 2. This phase difference φ can be calculated on the basis of (Formula 4) as follows.

$$\varphi = \operatorname{Arctan}((Q_{90} - Q_{270})/(Q_{180} - Q_0)) \quad \text{(Formula 4)}$$

The phase difference φ calculated by (Formula 4) above, that is, the phase difference φ between the pulsed light output from the light source 1 and the pulsed light input to the camera 2, is substituted into (Formula 3). Accordingly, it is possible to calculate the distance d from the camera 2 (or the light source 1) to the object 3 from (Formula 3).

Moreover, an image frame captured by the ToF camera as illustrated n FIG. 4, that is, a captured image or accumulated charge of each captured image of phase settings of phase deviation values of 0 degrees, 90 degrees, 180 degrees, and 270 degrees for the light emission pattern (pulse), is herein referred to as a component.

FIG. 4 illustrates image data captured by a camera (ToF camera) according to the time axis shown from left to right.

The captured images with phase settings of the phase deviation values of 0 degrees, 90 degrees, 180 degrees, and 270 degrees for the light emission pattern (pulse) are sequentially and repeatedly captured.

One set of combinations of components with phase settings of 0 degrees, 90 degrees, 180 degrees, and 270 degrees is referred to as a frame.

In other words, one frame has information regarding the accumulated charge of $Q_0$, $Q_{90}$, $Q_{180}$, and $Q_{270}$ of the captured image with phase settings of phase deviation values of 0 degrees, 90 degrees, 180 degrees, and 270 degrees for the light emission pattern (pulse).

Moreover, the time between components is typically set shorter than the time between frames.

2. Overview of Processing Executed by Rangefinder of the Present Disclosure

An overview of the processing executed by a rangefinder of the present disclosure is now described.

As described with reference to FIGS. 1 to 3, in measuring the distance to an object by the ToF technique, it can be necessary to detect a phase difference between the light emission pulse of the light source and the light reception pulse of the camera.

The accurate detection of the phase difference can be necessary to find out the ON/OFF timing of the light emission pulse of the light source and the ON/OFF timing of pixels executed in the camera.

With this view, for example, the ON/OFF timing of the light emission pulse of the light source and the ON/OFF timing of pixels executed in the camera is desirable to be controlled by one clock, i.e., synchronized with each other by one clock.

As illustrated in FIG. 5A, the arrangement in which, for example, the light source 1 and the camera 2 are configured in one device and controlled by a clock signal from one clock, enables the light emission pulse of the light source and the charge accumulation timing of the camera 2 to be synchronized. In other words, it is possible to acquire components of captured images with phase settings of phase deviation values of 0 degrees, 90 degrees, 180 degrees, and 270 degrees for the light emission pattern (pulse).

However, in the arrangement illustrated in FIG. 5A, the light path from the light source 1 to the camera 2 will be twice as long as the distance d to the object 3, that is, 2d, so the light-receiving intensity of the camera 2 is lowered, causing a decrease in the rangefinding accuracy.

The arrangement illustrated in FIG. 5B can be considered to the lowered light-receiving intensity of the camera 2 and the decreased rangefinding accuracy.

In the arrangement illustrated in FIG. 5B, the light source 1 is placed closer to the object 3. Such an arrangement makes it possible to shorten the path until the output light of the light source 1 is reflected from the object 3 and received by the camera 2, enabling improved rangefinding accuracy without lowering the light-receiving intensity of the camera 2.

However, in the case where the light source 1 and the camera 2 are separated in positions from each other as described above and these devices are used as separate devices, the respective devices can be necessary to be controlled by an individual clock signal.

If the light source 1 and the camera 2 are controlled by different clock signals as described above, it is difficult to completely match the control timings of the light source 1 and the camera 2, that is, to synchronize them. If no synchronization is made, components of captured images with phase settings of phase deviation values of 0 degrees, 90 degrees, 180 degrees, and 270 degrees for the light emission pattern (pulse) fail to be acquired accurately.

Moreover, types of synchronization processing that can be necessary to perform accurate rangefinding include a plurality type of synchronization processing as follows.

(1) Frame synchronization processing,
(2) Frequency synchronization processing, and
(3) Phase synchronization processing.

(1) The frame synchronization processing is the synchronization processing for acquiring the light emission timing on the side of the light source 1 for each of the frames or components acquired on the side of the camera 2.

(2) The frequency synchronization processing is the processing for checking and adjusting a frequency deviation between clocks of the light source 1 and the camera 2 to eliminate the frequency deviation. For example, even if the clocks of the light source 1 and the camera 2 are set to 100 MHz, it is often for the clock of the light source 1 to be 100.0001 MHz due to the individual difference between the clocks. Thus, it can be necessary to find out this difference accurately.

(3) The phase synchronization processing is the processing for checking a phase deviation between the clocks of the light source 1 and the camera 2 and adjusting the phases to eliminate the phase deviation.

Figure 6:
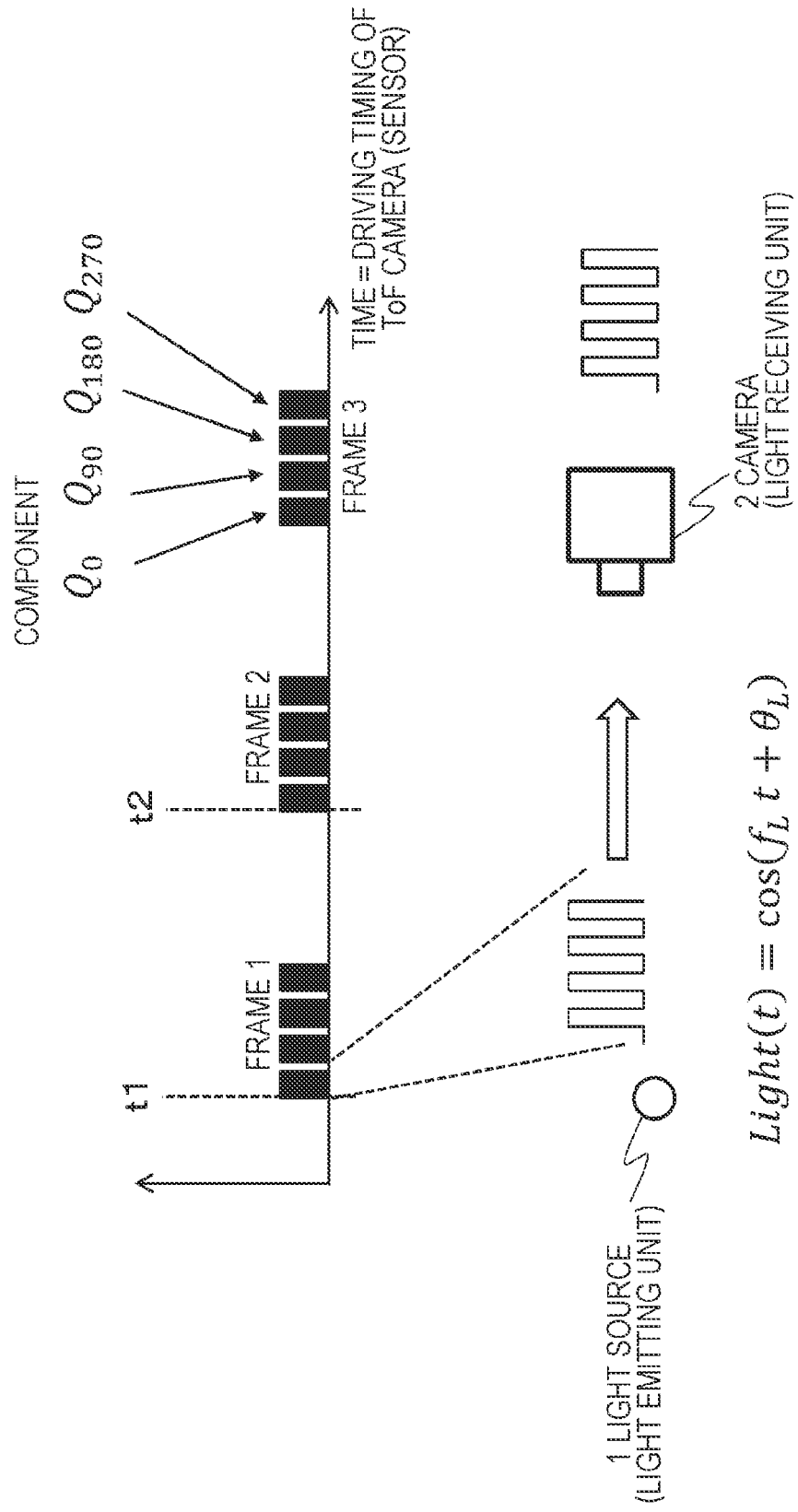
FIG. 6 is a diagram illustrated to describe phase synchronization processing.

For example, as illustrated in FIG. 6, the waveform (Light (t)) of the light source 1 is defined as the sine wave as follows:

$$\text{Light}(t) = \cos(f_L t + \theta_L)$$

The phase synchronization processing can be necessary to estimate the light-emitting start time $t_1$ in addition to $f_L$ and $\theta_L$ of the light source 1 that emits light according to the sine wave mentioned above, as illustrated in FIG. 6.

Figure 7:
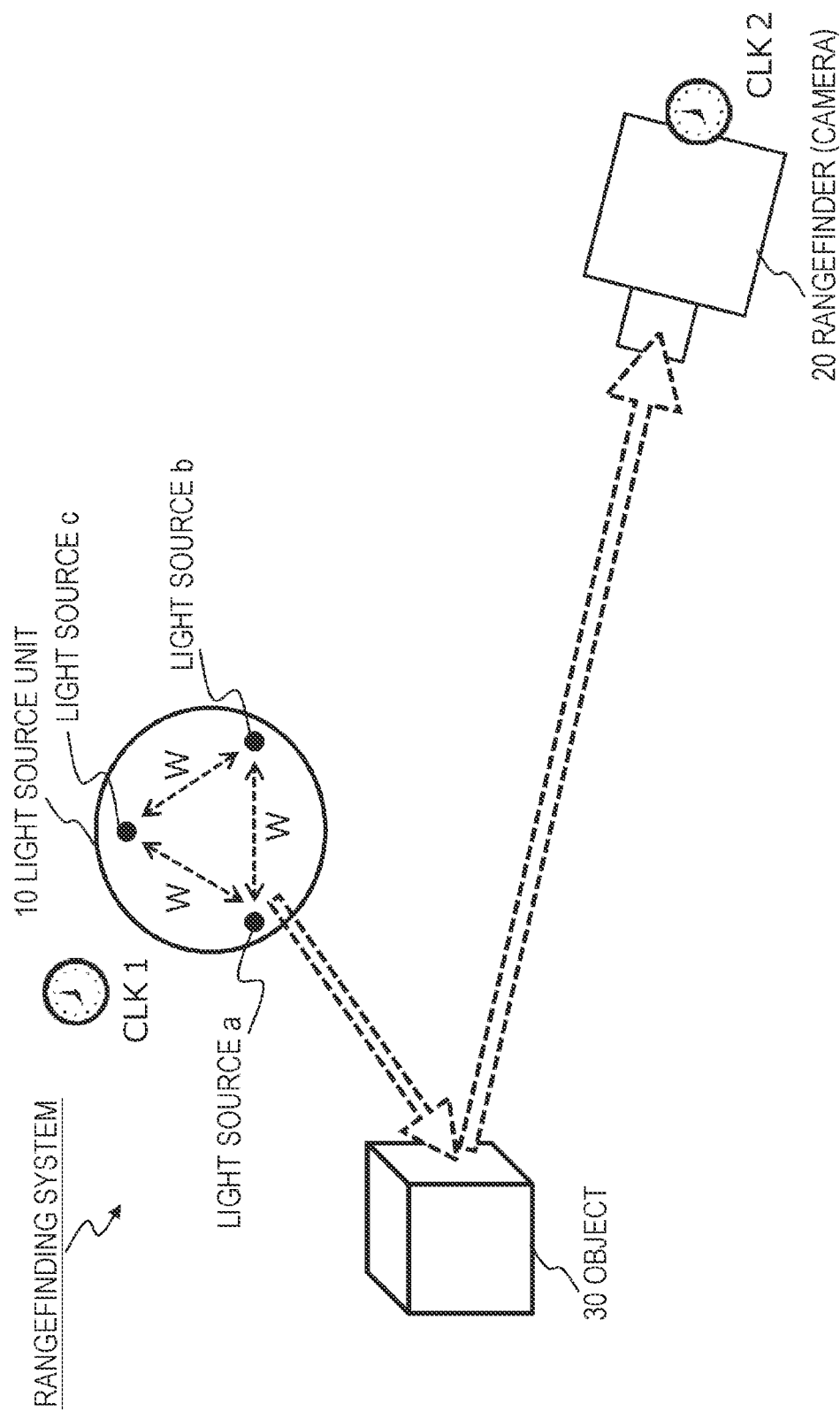
FIG. 7 is a diagram illustrated to describe an exemplary configuration of a rangefinding system of the present disclosure.

FIG. 7 illustrates an exemplary overall configuration of one embodiment of a rangefinding system of the present disclosure. The rangefinding system of the present disclosure is a system in which the light source and the camera can be controlled by individual clocks, similar to the configuration described above with reference to FIG. 5B.

In other words, it is a system enabling the clock used to control the light emission timing of the light source and the clock used to control the image capturing timing of the camera to be separate clocks.

Such a configuration enables the light source to be placed at any position away from the camera. This makes it possible to place the light source closer to an object to be measured for distance.

As a result, the light emitted from the light source is reflected from the object to be measured for distance. The camera that captures the reflected light is capable of capturing the reflected light for which light intensity does not decrease, enabling the achievement of highly accurate rangefinding.

As described above, the system of the present disclosure has a configuration capable of setting an optical path until the output light from the light source is reflected from an object and incident on the camera to be short.

However, in the rangefinding system of the present disclosure, the clock that determines the control timing of the light source (CLK1) and the clock that determines the control timing of the camera (CLK2) are different. Thus, processing considering the deviation between the clocks can be necessary to be performed. This processing is described in in the subsequent stage in detail.

The rangefinding system of the present disclosure illustrated in FIG. 7 includes a light source unit 10 and a rangefinder (camera) 20. Moreover, the rangefinder (camera) 20 measures the distance between an object 30 and the rangefinder (camera) 20. Besides, it is also possible to measure the surface shape of the object 30, that is, the three-dimensional shape of the object 30, in addition to the rangefinding.

As illustrated in FIG. 7, the light source unit 10 has a plurality of light sources a, b, and c. These three light sources are arranged at equidistant intervals (W). The light sources a to c output individual pulsed light rays. The output timing of the pulsed light, that is, the phase, is controlled by a clock signal of one clock (CLK1).

Moreover, in the embodiment illustrated in FIG. 7, the light source unit 10 has three light sources having fixed relative positions. The number of light sources is not limited to three and can include a configuration having three or more light sources such as four and five, or include a configuration having only two depending on the processing.

The description is now given of the configuration and processing using the light source unit 10 having three light sources and the configuration and processing using the light source unit 10 having two light sources.

The configuration and processing using the light source unit 10 having three light sources are now described. The pulsed light output from the three light sources a to c of the light source unit 10 is reflected from the surface of the object 30 and is incident on the rangefinder (camera) 20. The rangefinder (camera) 20 has a ToF sensor similar to the ToF camera described above with reference to FIGS. 2 to 4 and acquires an image in which different light reception timings are set, that is, a frame having a plurality of components.

The control timing of the rangefinder (camera) 20 is executed on the basis of the clock signal output by the camera-specific clock (CLK2).

An exemplary specific configuration of the light source unit 10 is now described with reference to FIG. 8. As described above with reference to FIG. 7, the light source unit 10 includes a plurality of light sources and has a light source unit clock.

Figure 8:
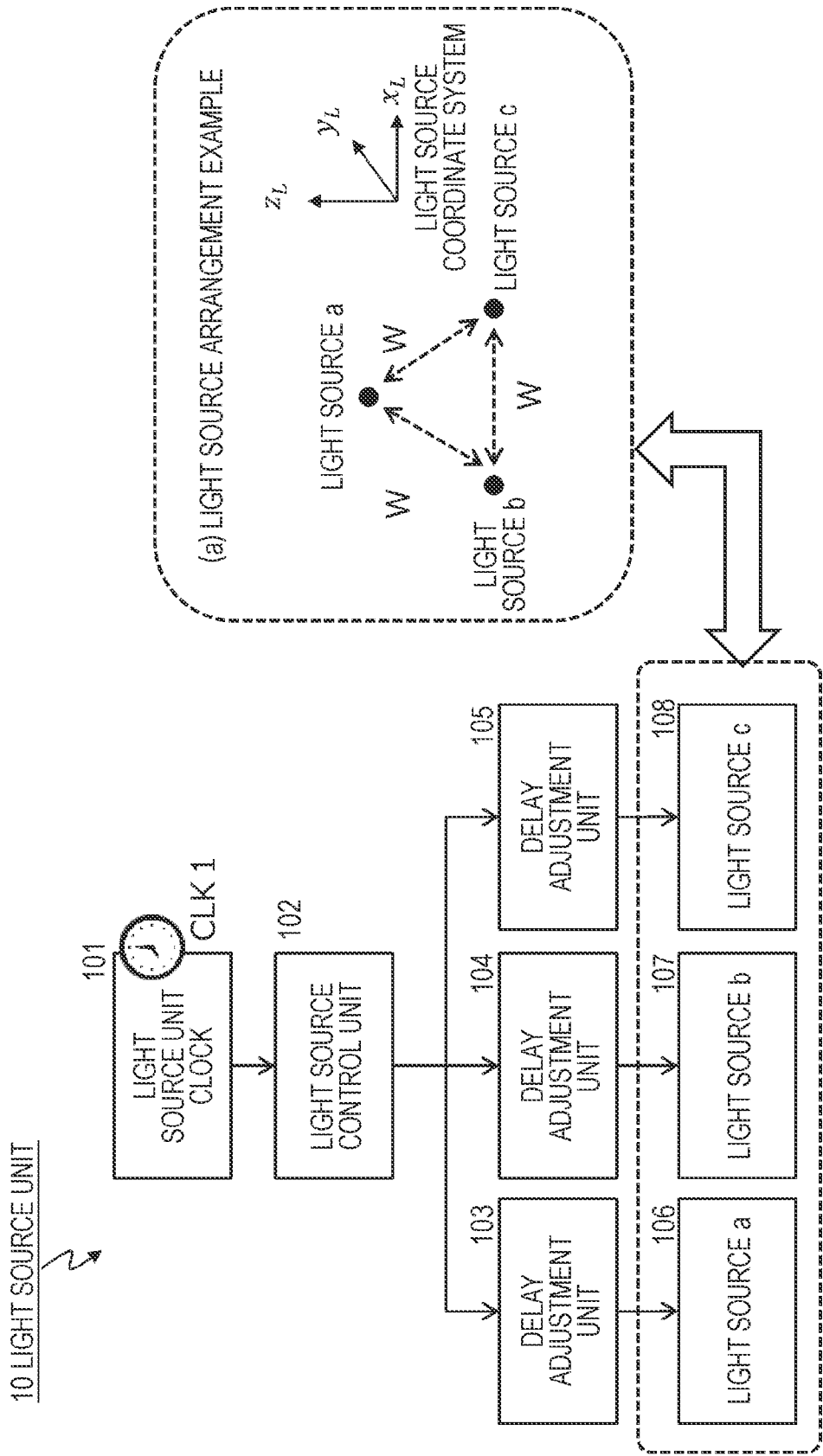
FIG. 8 is a diagram illustrated to describe an exemplary specific configuration of a light source unit.

As illustrated in FIG. 8, the light source unit 10 includes a light source unit clock (CLK1) 101, a light source control unit 102, delay control units 103 to 105 corresponding to light sources, and a plurality of light sources, i.e., a light source a 106, a light source b 107, and a light source c 108. The plurality of light sources a to c is controlled by one light source unit clock 101, so the frequencies of light (pulsed light) emitted from them are the same (or a known multiple).

For example, the frequency setting of the pulsed light output from the light sources a to c in the case where the reference clock is a 10 MHz clock can be set as follows:

(Setting example 1) Pulsed light frequencies of the light sources a to c are all set to 10 MHz, and (Setting example 2) Pulsed light frequencies of the light sources a to c are set to a multiple of the specified value such as 10 MHz, 20 MHz, and 30 MHz, respectively.

For example, such settings described above are possible.

Moreover, the phase of each pulsed light of the light sources a to c also depends on the length of wiring from the clock 101 to the light sources a to c, so it is expected to cause some degree of deviation. Still, such deviation is assumed to be calibrated in advance. It is herein assumed for convenience that the phases of the plurality of light sources a to c are the same, and there is no deviation. Moreover, even when the phases of the respective light sources deviate, it can be calibrated and used in the subsequent stage if the degree of deviation is known.

Further, as illustrated in the arrangement example of light sources in FIG. 8(a), the respective light sources a to c are assumed to have a fixed physical arrangement.

For example, the light sources a to c are fixed to the housing of the light source unit 10 so that the distance between the light sources may be "W". The light source unit 10 has a configuration in which a plurality of light sources is physically fixed.

As illustrated in the arrangement example of the light sources in FIG. 8(a), a light source coordinate system is defined with reference to a given point in the light source unit 10. Component parts in the light source unit are fixed, so the positions of the respective light sources are known in the light source coordinate system.

The light source control unit 102 and the delay adjustment units 103 to 105 adjust the light emission timing of the light sources a to c, that is, the light emission pulse. Moreover, the light source control unit 102 and the delay adjustment units 103 to 105 control the light emission timing of the light sources a to c by the clock supplied from the light source unit clock 101. The delay adjustment units 103 to 105 control the amount of delay in the light emission timing of the light sources a to c and 105 to 108.

Moreover, the light rays from the light sources a to c of the light source unit 10 are controlled individually so that the light rays reach the rangefinder (camera) 20 without interfering with each other. Thus, for example, the driving of the light source is controlled as follows:
(a) Drive light sources in time division,
(b) Set the light emission frequency of each light source differently. For example, the light emission frequency of each light source is set to be different, such as one time, two times, or three times the clock frequency, and
(c) Change a wavelength used by each light source. For example, use the light with different wavelengths such as 850 nm, 905 nm, and 940 nm.

Figure 9:
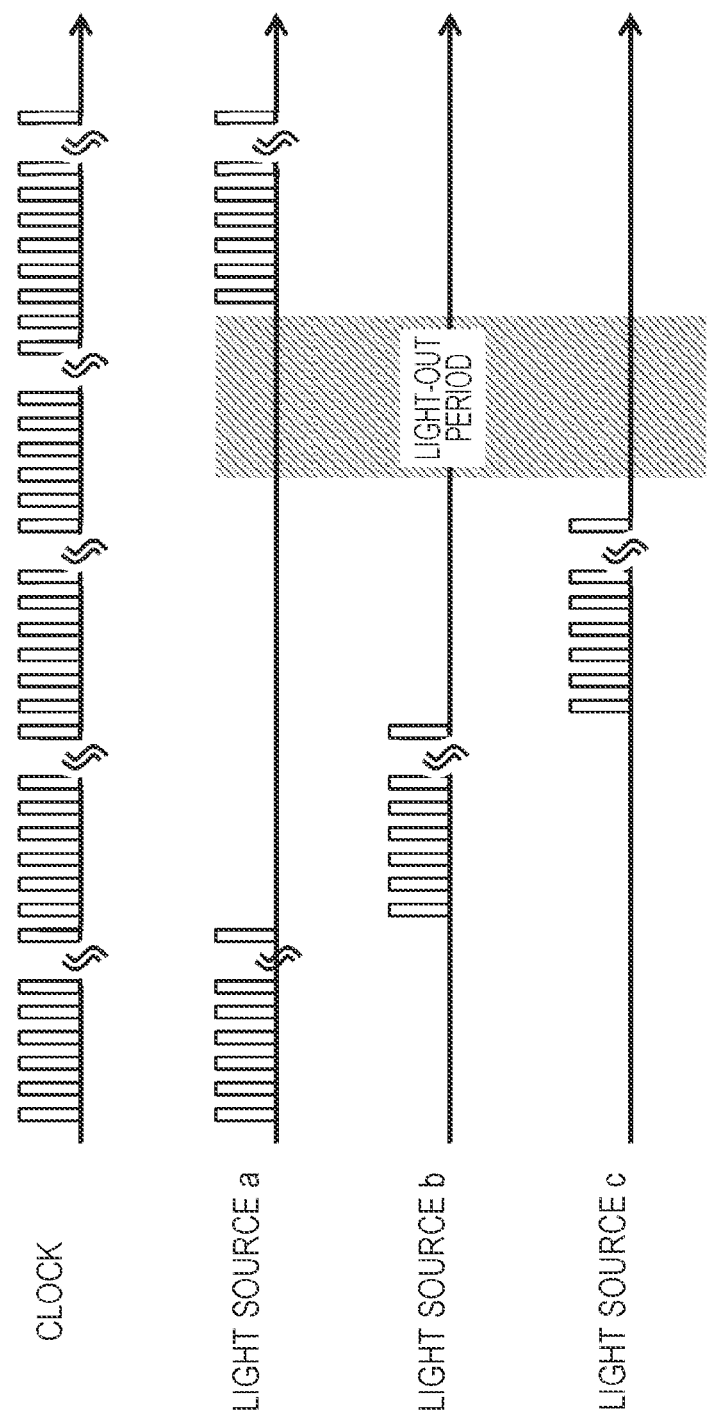
FIG. 9 is a diagram illustrating an example of the light source driving control of each light source that is set to be driven in a time-division manner.

FIG. 9 illustrates an example of the light source driving control upon setting it as "time-division driving of light sources" of the above item (a).

FIG. 9 illustrates an example of the clock and signal supplied from the light source unit clock 101 and the light emission pulses of the light sources a to c.

In the example illustrated in FIG. 9, the light sources a to c are set to emit light rays sequentially by changing the timing at the same frequency and phase with respect to the reference clock (light source unit clock).

Moreover, a light-out period is set so that it is possible to identify which light source is currently emitting. After the lapse of the light-out period, the light sources are caused to emit light rays in the order of the light source a, the light source b, and the light source c. Then, also after a predetermined light-out period, the light emission repeats in the order of the light sources a to c.

The configuration of the rangefinder (camera) 20 is now described in detail with reference to FIG. 10.

Figure 10:
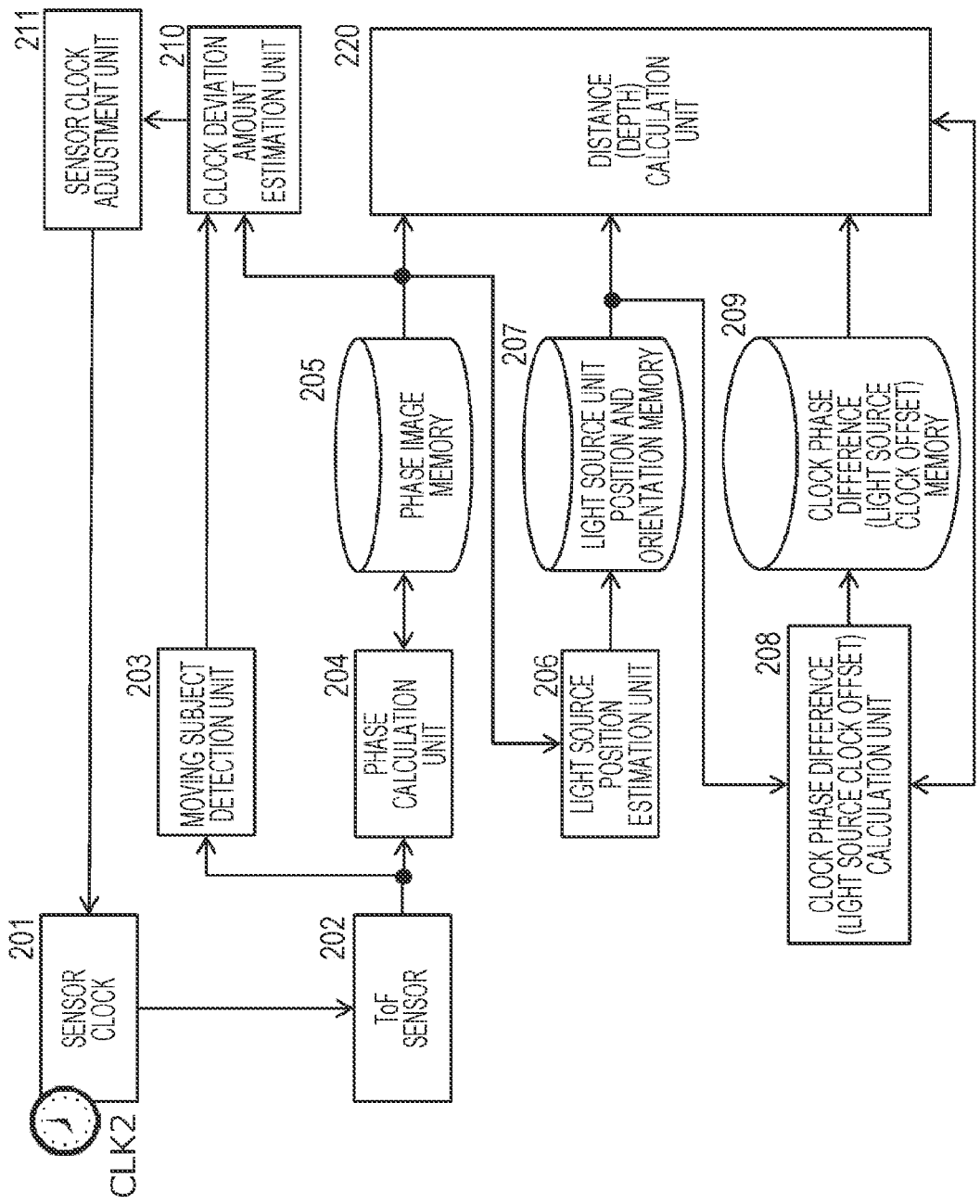
FIG. 10 is a diagram illustrated to describe a specific configuration of a rangefinder (camera).

As illustrated in FIG. 10, the rangefinder (camera) 20 includes a sensor clock 201, a ToF sensor 202, a moving subject detection unit 203, a phase calculation unit 204, a phase image memory 205, a light source position estimation unit 206, a light source unit position and orientation memory 207, a clock phase difference (light source clock offset) calculation unit 208, a clock phase difference (light source clock offset) memory 209, a clock deviation amount estimation unit 210, a sensor clock adjustment unit 211, and a distance (depth) calculation unit 220.

The ToF sensor 202 includes an image sensor similar to the ToF camera described above with reference to FIGS. 2 to 4. In other words, an image in which different light reception timings are set, that is, a frame having a plurality of components, is acquired.

The light reception timing of the ToF sensor 202 is determined by the clock signal output from the sensor clock 201.

A moving subject detection unit 203 detects a moving subject from the image captured by the ToF sensor 202. This processing for the moving subject detection is used in performing the frequency synchronization processing described above, that is, the synchronization processing for modifying the clock deviation between the light source and the ToF sensor. This processing is described in the subsequent stage in detail.

The phase calculation unit 204 calculates the phase difference φ between the light emission pulse and the light reception pulse described above with reference to FIGS. 2 and 3. In this configuration, the light emission pulse is the light emission pulses of the respective light sources a to c of the light source unit 10. The light-receiving pulse is the light-receiving pulse corresponding to the output light of the light sources a to c received by the ToF sensor 202.

The phase image memory 205 has a frame image and phase difference data stored therein. The frame image is formed by a component (phase image) captured by the ToF sensor 202, and the phase difference data is calculated by the phase calculation unit 204.

The light source position estimation unit 206 executes processing for estimating the position and orientation of the light source unit 10, more specifically, for example, three-dimensional position estimation processing of the light sources a to c. The specific processing example is described later.

The light source unit position and orientation memory 207 stores the position and orientation information (information regarding three-dimensional positions of the light sources a to c) of the light source unit 10, estimated by the light source position estimation unit 206.

The clock phase difference (light source clock offset) calculation unit 208 performs processing for calculating the deviation between the sensor clock 201 and the light source unit clock 101, that is, the clock phase difference, and stores the calculated clock phase difference as the clock phase difference (light source clock offset) memory 209. This processing is described later in detail.

The clock deviation amount estimation unit 210 estimates an amount of deviation in frequency between the sensor clock 201 and the light source unit clock 101. The sensor clock adjustment unit 211 adjusts the frequency of the sensor clock 201 on the basis of the amount of deviation between the sensor clock 201 and the light source unit clock 101 that is estimated by the clock deviation amount estimation unit 210. In other words, the clock frequency of the sensor clock 201 and the clock frequency of the light source unit clock 101 are adjusted to eliminate or reduce the deviation between the frequencies. This processing is described later in detail.

Moreover, even if the clock frequency is adjusted, the difference in phase (phase deviation) between the two clocks is difficult to eliminate. In practical rangefinding, processing considering the clock phase difference can be necessary. The clock phase difference (light source clock offset) calculation unit 208 described above calculates this clock phase difference.

The distance (depth) calculation unit 220 calculates the distance (depth) to the object 30 to be measured. The calculated distance is the distance from the rangefinder (camera) 20 to the surface of the object 30.

For this distance calculation, the data stored in the phase image memory 205, the light source unit position and orientation memory 207, and the clock phase difference (light source clock offset) memory 209 are used. In other words, the distance calculation is performed using the data below:

(a) A frame image formed by a component (phase image) captured by the ToF sensor 202 and stored in the phase image memory 205, and the phase difference data calculated by a phase difference calculation unit 204
(b) The position and orientation information (information regarding three-dimensional positions of the light sources a to c) of the light source unit 10, estimated by the light source position estimation unit 206 stored in the light source unit position and orientation memory 207
(c) An offset corresponding to deviation (phase difference) between the sensor clock 201 and the light source unit clock 101 that is stored in the clock phase difference (light source clock offset) memory 209, or an offset corresponding to the amount of error in calculating the distance that occurs due to the phase difference This processing is described later in detail.

3. Sequence of Processing Executed by Rangefinder of the Present Disclosure

The processing sequence executed by the rangefinder (camera) 20 of the present disclosure is now described.

The description is initially given of an overview of the entire sequence of the rangefinding using the rangefinding system of the present disclosure having the configuration illustrated in FIG. 7 with reference to the flowchart illustrated in FIG. 11.

Moreover, the procedure illustrated in FIG. 11 includes four processing steps S11 to S14. The description is initially given of rough processing operations of each step and overall processing procedure. The processing of each step is described in the subsequent stage in detail.

The processing of each step of the flowchart illustrated in FIG. 11 is now described.

(Step S11)

In step S11, the frame synchronization processing is initially executed.

The frame synchronization processing is, as described above with reference to FIG. 6, the synchronization processing for acquiring the light emission timing on the side of the light source for each of the frames or components acquired on the side of the camera.

In step S11, the light emission timing on the side of the light source unit 10 for each of the frames and components acquired on the side of the rangefinder (camera) 20 is acquired.

Moreover, the specific processing is described in the subsequent stage.

(Step S12)

In step S12, the frequency synchronization processing is now executed. This processing is used for checking and adjusting the frequency deviation between the sensor clock used on the side of the rangefinder (camera) 20 and the light source unit clock used on the side of the light source unit 10 to eliminate the deviation in frequencies. This processing can be necessary for the rangefinder (camera) 20 to estimate the frequency of the clock used in the light source unit 10.

(Step S13)

Subsequently, in step S13, the position or orientation of the light source unit 10 is estimated. As described above with reference to FIG. 7, the light source unit 10 includes a plurality of light sources a to c. In step S13, the processing for estimating the position of each of these light sources a to c is performed.

(Step S14)

Subsequently, in step S14, the distance (depth) measurement processing of the object 30 is executed. Specifically, the distance from the rangefinder (camera) 20 to the object 30 is measured.

Moreover, for this processing, the processing is executed for calculating an offset C corresponding to the clock phase difference, that is, a rangefinding error, occurring due to the difference in phase between the sensor clock and the light source clock.

The specific processing operations of these steps S11 to S14 are described in the subsequent stage.

Figure 12B:
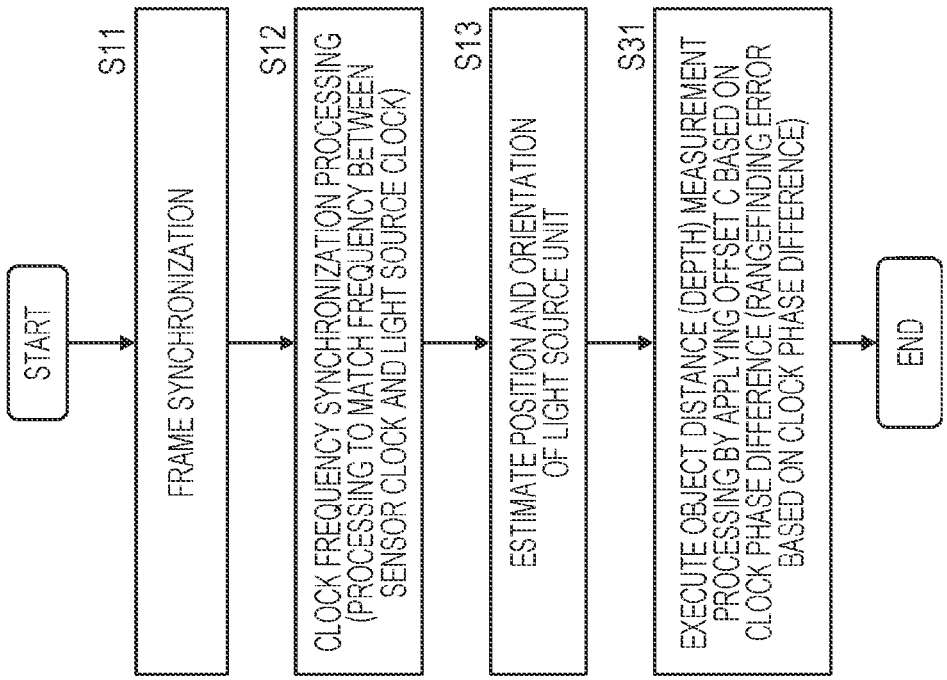
FIGS. 12A and 12B are diagrams illustrating a flowchart for describing the entire sequence of the rangefinding using the rangefinding system of the present disclosure.

Moreover, the procedure illustrated in FIG. 11 is the fundamental procedure of the processing sequence executed by the rangefinder (camera) 20 of the present disclosure. However, the rangefinder (camera) 20 of the present disclosure is capable of calculating the distance (depth) to the object, for example, according to the sequence as shown in FIGS. 12A and 12B, in addition to the processing executed according to the procedure illustrated in FIG. 11.

Figure 12A:
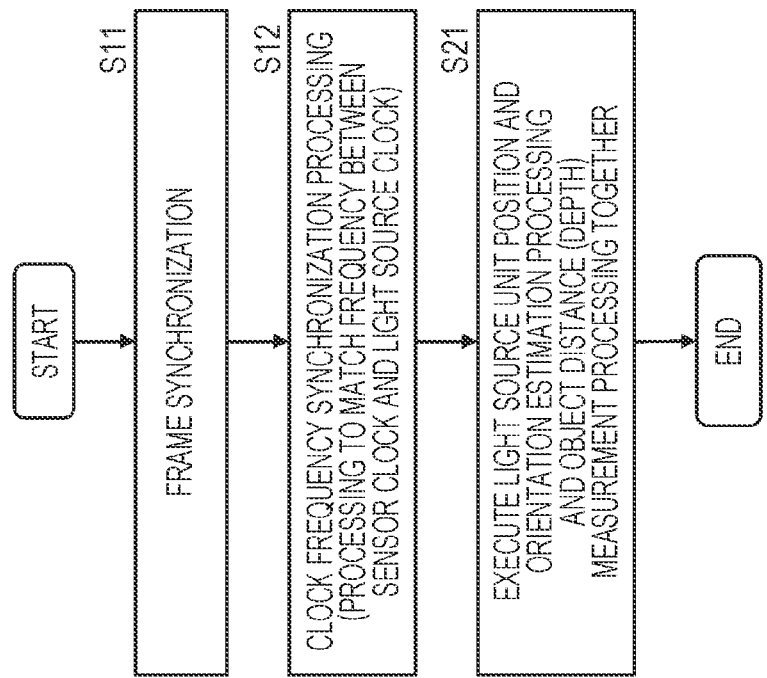

In the procedure illustrated in FIG. 12A, steps S11 to S12 are similar to steps S11 to S12 of the procedure illustrated in FIG. 11.

In the procedure illustrated in FIG. 12A, following the clock frequency synchronization processing in step S12, the processing below is performed in step S21.

(Step S21)

In step S21, the processing for estimating the position and orientation of the light source unit 10 and the calculation processing for the distance to the object, that is, the distance from the rangefinder (camera) 20 to the object 30, are executed in combination together.

The processing of step S21 corresponds to the processing executed by combining the processing of step S13 and the processing of step S14 according to the procedure illustrated in FIG. 11.

Further, in the procedure illustrated in FIG. 12B, steps S11 to S13 are similar to steps S11 to S13 of the procedure illustrated in FIG. 11.

In the procedure illustrated in FIG. 12B, following the position and orientation estimation processing of the light source unit 10 in step S13, the processing described below is performed in step S31.

(Step S31)

In step S31, the processing for measuring the distance (depth) to the object is executed by using the clock phase difference, that is, the offset C based on the phase difference between the sensor clock and the light source clock, specifically, the value of the rangefinding error based on the clock phase difference.

The processing executed according to the procedure illustrated in FIG. 12B is the procedure executed in the case of previously calculating the offset C based on the clock phase difference and storing it in the memory.

The rangefinder (camera) 20 of the present disclosure is capable of calculating the distance (depth) to the object, for example, according to the sequence as shown in FIGS. 12A and 12B, in addition to the processing executed according to the procedure illustrated in FIG. 11.

The processing operations described above are now described.

4. Frame Synchronization Processing

The frame synchronization processing in step S11 described with reference to the flowchart illustrated in FIG. 11 is now described in detail. The frame synchronization processing is a processing in which the light emission timing on the side of the light source unit 10 for each of the frames and components acquired on the side of the rangefinder (camera) 20 is acquired.

Figure 13:
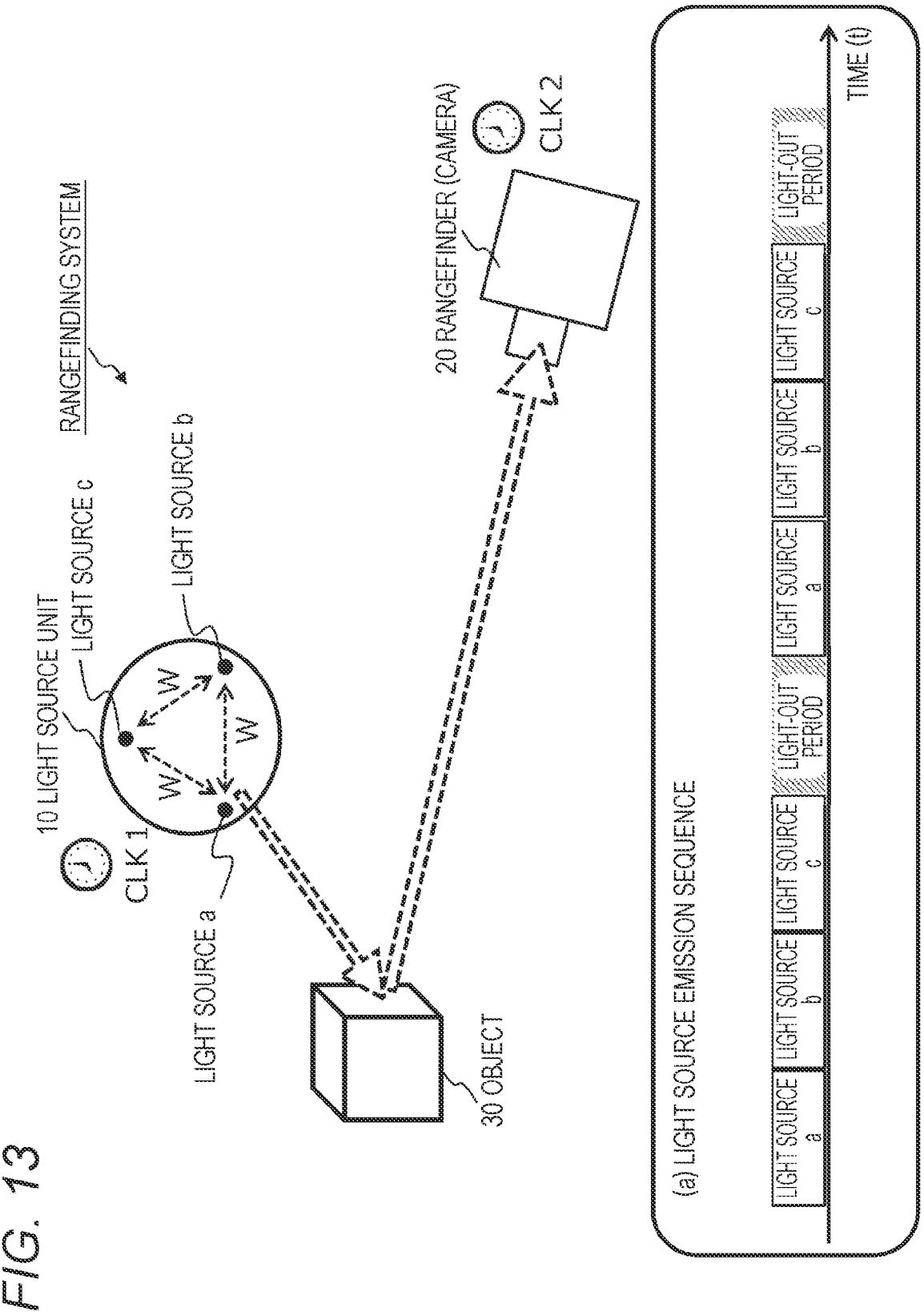
FIG. 13 is a diagram illustrated to describe details of frame synchronization processing.

A specific example of the processing is described with reference to FIG. 13.

As described above with reference to FIG. 9, the three light sources a to c of the light source unit 10 emit light rays sequentially by changing the timing at the same frequency and phase for the light source unit clock that acts as the reference clock. Furthermore, a light-out period is set so that it is possible to identify which light source is currently emitting. After the lapse of the light-out period, the light sources are caused to emit light rays in the order of the light source a, the light source b, and the light source c. Then, also after a predetermined light-out period, the light emission repeats in the order of the light sources a to c.

In this way, in a case where the respective light sources are sequentially light-up in a time-division manner, the rangefinder (camera) 20 can be necessary to identify when and which light source emits light. For this reason, as shown in the lower part of FIG. 13, the light source unit 10 sequentially turns on the light sources with a light-out period at regular intervals.

Moreover, it is assumed that the rangefinder (camera) 20 previously checks the light-up time, light-up order, and length of the light-out period of each light source. The rangefinder (camera) 20 initially detects the first light-out period after the start of image capturing. Once detection of the light-out period is possible, then it is determined which light source is currently lit by considering the periodicity (in the order of light sources, a, b, and c).

The frame synchronization processing of step S11 of the procedure illustrated in FIG. 11 is the processing of determining which output pulsed light of the light source unit 10 is received by the rangefinder (camera) 20.

5. Frequency Synchronization Processing

The frequency synchronization processing in step S12 described with reference to the flowchart illustrated in FIG. 11 is now described in detail.

The processing in step S12 is the frequency synchronization processing. This processing is used for checking and adjusting the frequency deviation between the sensor clock used on the side of the rangefinder (camera) 20 and the light source unit clock used on the side of the light source unit 10 to eliminate the deviation in frequencies. This processing can be necessary for the rangefinder (camera) 20 to estimate the frequency of the clock used in the light source unit 10.

A specific example of this processing is described with reference to FIG. 14.

Figure 14:
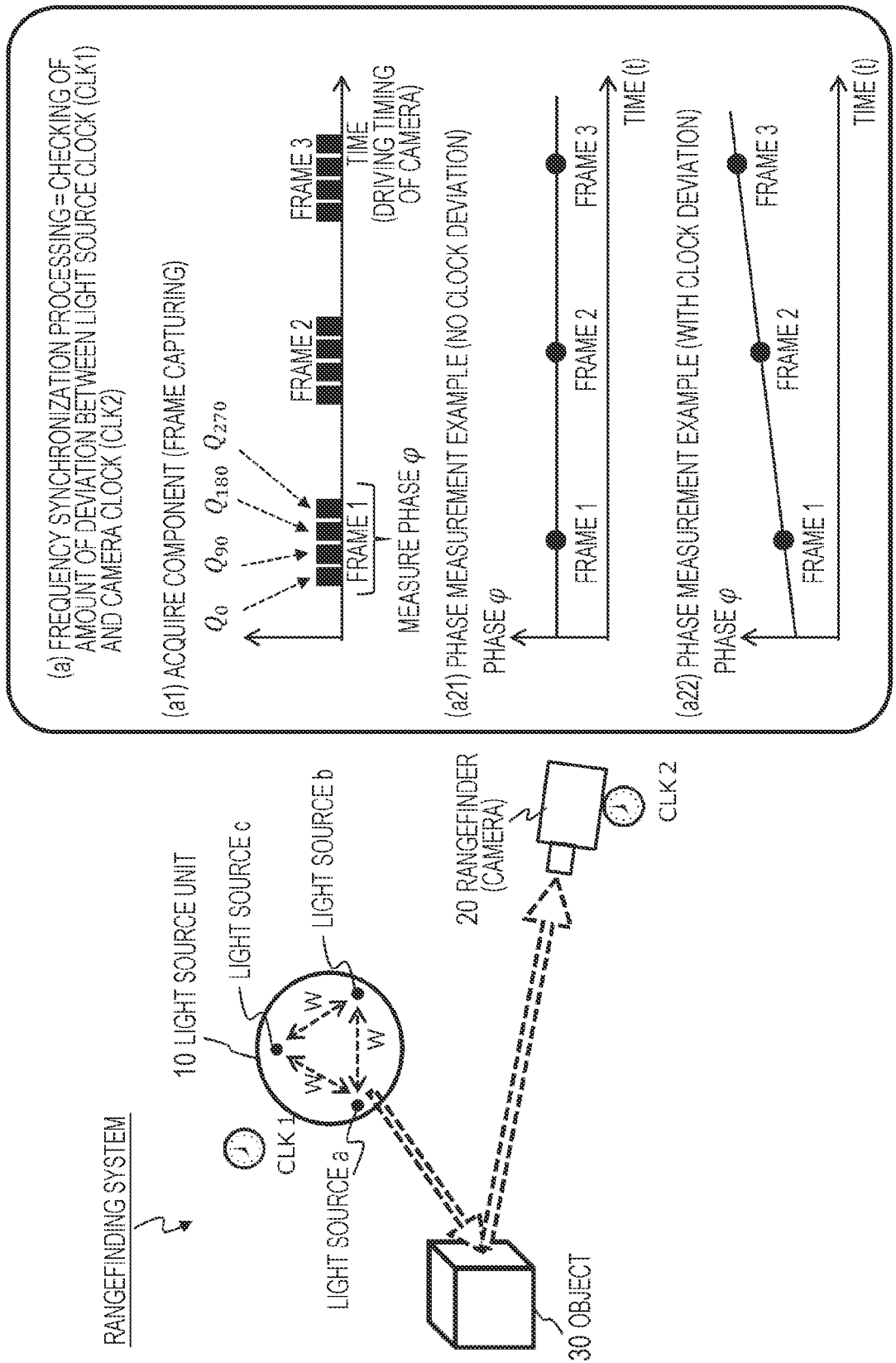
FIG. 14 is a diagram illustrated to describe the processing of estimating a clock frequency.

This processing is used to adjust the sensor clock (CLK2) on the side of the rangefinder (camera) 20 so that the sensor clock (CLK2) on the side of the rangefinder (camera) 20 illustrated in FIG. 14 is synchronized with the light source unit clock (CLK1) on the side of the light source unit 10.

The light source unit 10 has three light sources a to c, but all of them use the same light source unit clock (CLK1), so any one light source can be used as long as it is used for the adjustment. For example, the description is given of exemplary processing using the output light of the light source a.

As illustrated in FIG. 14, the output light from the light source unit 10 (output light of the light source a) is reflected from the object 10 and received by the rangefinder (camera) 20.

The received signal is a frame having the components shown in the diagrammatic part (a1) on the right side of FIG. 14. In other words, it is the frame having components in which the accumulation phases are changed sequentially (0, 90, 180, and 270 degrees) as described above with reference to FIGS. 3 and 4.

Multiple frames having these four components are acquired in a time series.

It is herein assumed that the rangefinder (camera) 20, the light source unit 10, and the object 30 are all in a fixed position having no motion.

In this case, the phase difference cp between the pulsed light output from the light source a of the light source unit 10 and the pulsed light input to the rangefinder (camera) 20 is a difference in phase over time of light traveling the path from the light source unit 10 via the object 10 to the rangefinder (camera) 20.

There is the case where the rangefinder (camera) 20, the light source unit 10, and the object 30 are all in a fixed position having no motion and the sensor clock (CLK2) on the side of the rangefinder (camera) 20 and the light source unit clock (CLK1) on the side of the light source unit 10 match in frequency. In this case, as shown in the diagrammatic part (a21) on the right side of FIG. 14, the phase difference cp between the pulsed light output from the light source a of the light source unit 10 and the pulsed light input to the rangefinder (camera) 20 is expected to be invariant in any frame acquired in a time series.

However, there can be the case where the sensor clock (CLK2) on the side of the rangefinder (camera) 20 and the light source unit clock (CLK1) on the side of the light source unit 10 do not match in frequency. In other words, there is a deviation. In this case, as illustrated in the diagrammatic part (a22) on the right side of FIG. 14, the phase difference φ between the pulse output from the light source a of the light source unit 10 and the light pulse input to the rangefinder (camera) 20 will vary with the progressing of the frames acquired in a time series.

In the case of obtaining the observation data as illustrated in the diagrammatic part (a22) of FIG. 14, the rangefinder (camera) 20 determines that there is a deviation in frequency between the sensor clock (CLK2) on the side of the rangefinder (camera) 20 and the light source unit clock (CLK1) on the side of the light source unit 10. The rangefinder (camera) 20 performs sensor clock adjustment processing to eliminate the deviation.

The detailed sequence of the sensor clock adjustment processing is as follows.

The frequencies of two clocks with deviation are denoted by $f_L$, and $f_S$, where $f_L$, is the light source unit clock frequency, and $f_S$ is the sensor clock frequency.

In this case, the amount of clock deviation between two clocks for T seconds is $$(f_L - f_S)T.$$

In addition, the amount of phase deviation between two clocks for T seconds is $$2\pi(f_L - f_S)T.$$

Furthermore, the amount of phase deviation (Δφ) per unit time (one second) is $$\Delta\varphi = 2\pi(f_L - f_S).$$

The amount of phase deviation (Δφ) per unit time (one second) corresponds to the slope of the graphs illustrated in the diagrammatic parts (a21) and (a22) of FIG. 14.

The data illustrated in the diagrammatic parts (a21) and (a22) of FIG. 14 is obtained as the observation values of the rangefinder (camera) 20. In other words, it is possible to obtain the amount of phase deviation (Δφ) per unit time (one second) on the basis of the observation data.

It is possible to calculate the difference in frequency between two clocks $(f_L - f_S)$ according to the formula described above ($\Delta\varphi = 2\pi(f_L - f_s)$) obtained on the basis of the amount of phase deviation (Δφ) per unit time (one second) obtained from the observation data, as expressed by the following formula.

$$(f_L - f_S) = (\Delta\varphi / 2\pi)$$

The rangefinder (camera) 20 performs processing for eliminating or reducing the deviation in frequency between the sensor clock and the light source unit clock (the frequency synchronization processing) on the basis of the difference in frequency between two clocks calculated according to the formula described above. A frequency f's of a sensor clock newly updated after adjustment is the frequency obtained by the following formula.

$$f's = f_S + (\Delta\varphi/2\pi)$$

As described above, the frequency synchronization processing in step S12 of the procedure of FIG. 11 is executed. Specifically, the adjustment processing for checking the deviation in frequency between the sensor clock used on the side of the rangefinder (camera) 20 and the light source unit clock used on the side of the light source unit 10 to eliminate the deviation in frequency is executed.

The constituent components and processing sequence used to execute the frequency synchronization processing in the rangefinder (camera) 20 are now described with reference to FIGS. 15 and 16.

Figure 15:
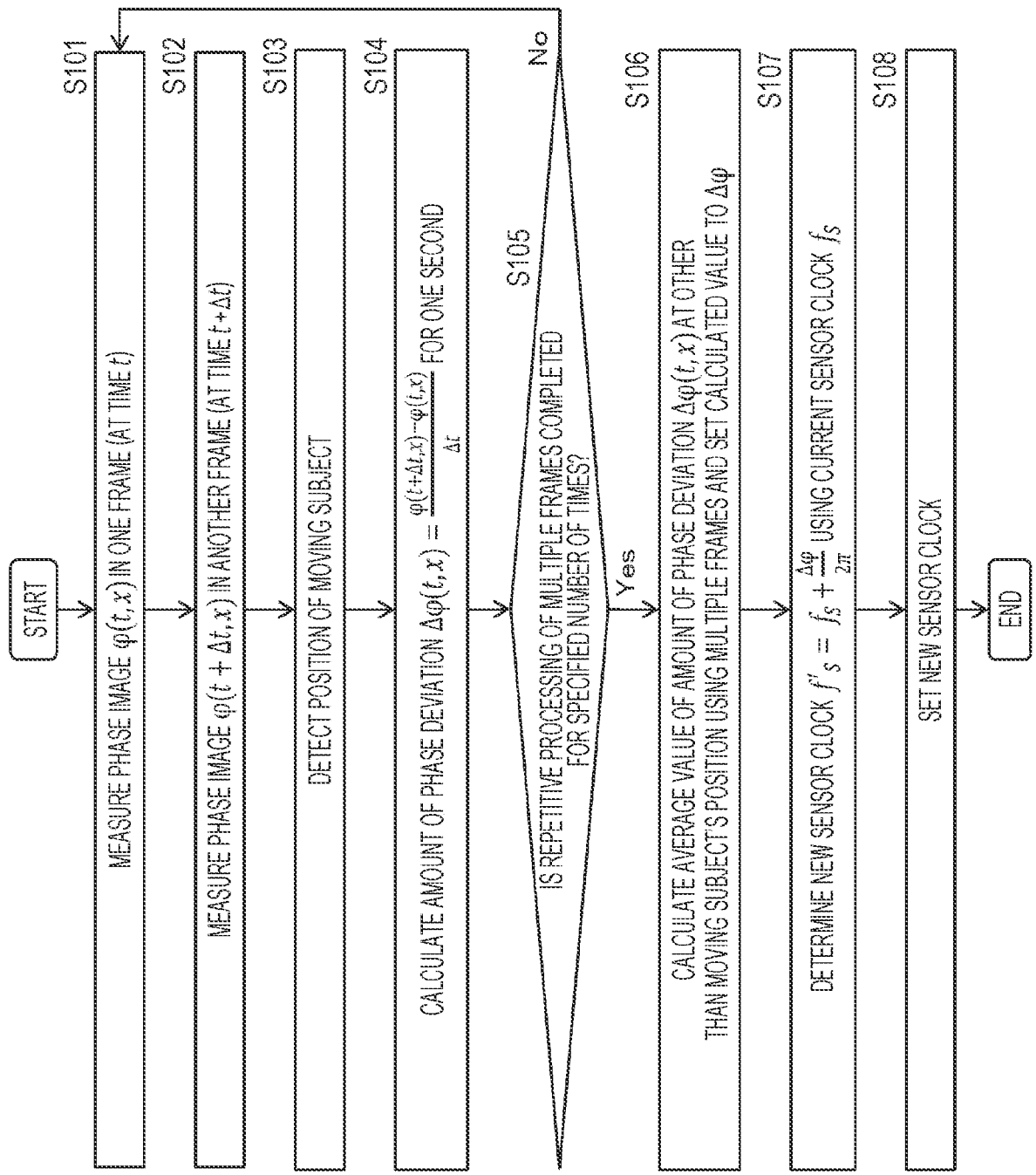
FIG. 15 is a diagram illustrating a flowchart for describing the sequence of frequency synchronization processing in a rangefinder (camera).

FIG. 15 is a flowchart illustrating the processing sequence of frequency synchronization processing.

Figure 16:
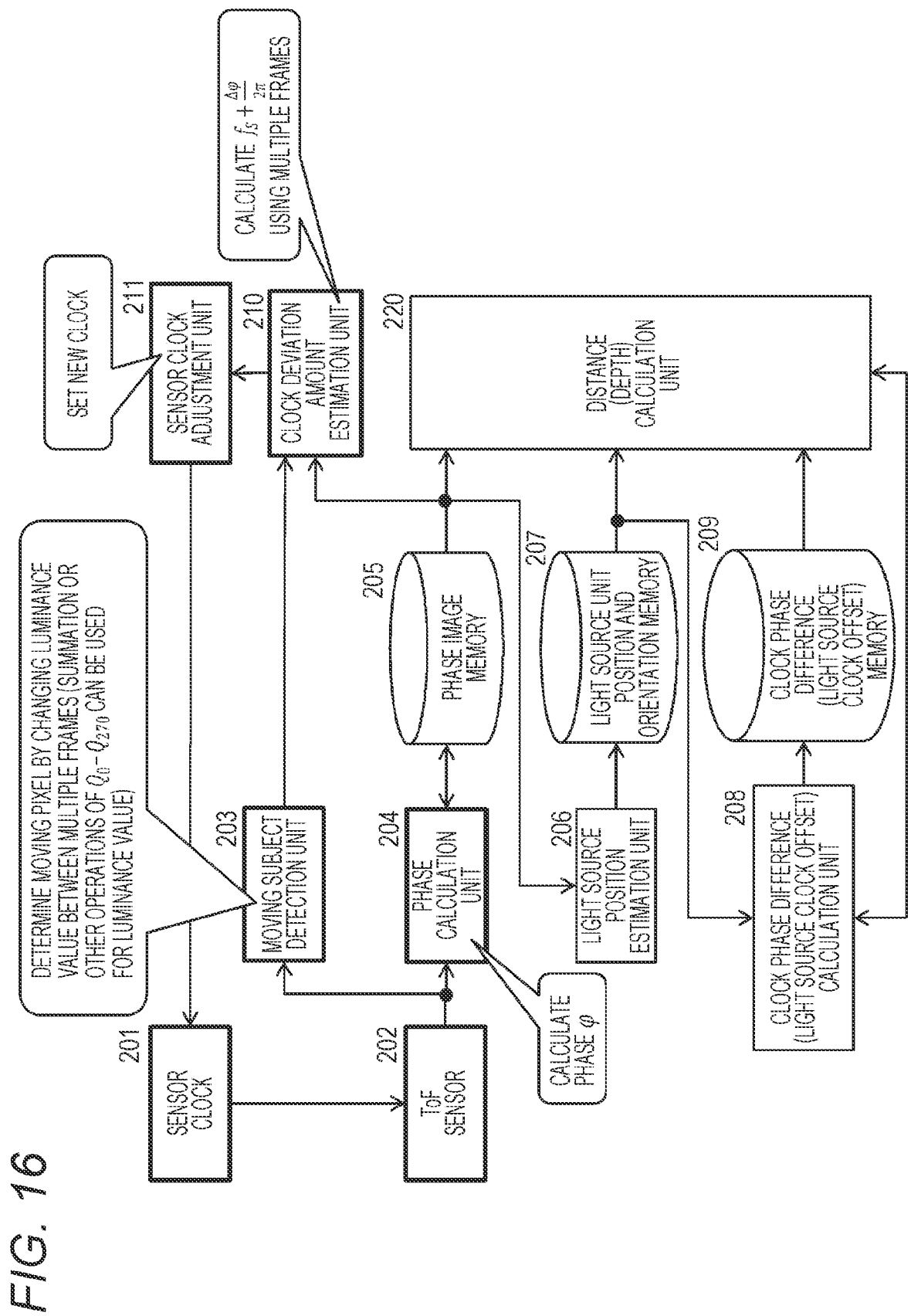
FIG. 16 is a diagram illustrated to describe a constituent component that executes frequency synchronization processing in a rangefinder (camera).

FIG. 16 is a configuration block diagram similar to the configuration of the rangefinder (camera) 20 described above with reference to FIG. 10, and the constituent components used in the frequency synchronization processing are shown with a thick frame.

The processing of each step in the flowchart of FIG. 15 is described with reference to the configuration block diagram illustrated in FIG. 16.

(Step S101)

In step S101, initially, a phase image $\varphi$ (t, x) is measured on the basis of one frame acquired at time t.

This processing is executed, on the basis of one frame input from the ToF sensor 202, by the phase difference calculation unit 204 illustrated in FIG. 16.

This processing corresponds to the processing of acquiring the phase difference $\varphi$ at time t of frame 1 of the diagrammatic part (a21) or (a22) of FIG. 14 described above with reference to FIG. 14. Moreover, x represents the pixel position of the acquired image.

(Step S102)

Subsequently, in step S102, initially, a phase image $\varphi$ (t+$\Delta$t, x) is measured on the basis of one frame acquired at time t+$\Delta$t.

This processing is also executed, on the basis of one frame input from the ToF sensor 202, by the phase difference calculation unit 204 illustrated in FIG. 16.

(Step S103)

Subsequently, in step S103, a moving subject position included in the acquired frame is detected.

This processing is executed in the moving subject detection unit 203 illustrated in FIG. 16.

As described above with reference to FIG. 14, in this frequency synchronization processing, it can be necessary that the light source, the object, and the camera (the ToF sensor) have the fixed relative positions. For example, in the case where the object is moving, accurate frequency synchronization processing fails to be performed even by using the reflected light from the moving object.

The processing of step S103 is performed to remove the captured pixel of such a moving subject from the object to be processed.

(Step S104)

Subsequently, in step S104, the amount of phase deviation $\Delta\varphi$ (t, x) per unit time (one second) is calculated using the phase image $\varphi$ (t, x) and the phase image $\varphi$ (t+$\Delta$t, x) acquired in steps S101 and S102, respectively, on the basis of the following formula.

$$\Delta\varphi(t,x) = (\varphi(t+\Delta t,x) - \varphi(t,x))/\Delta t$$

Moreover, as described above, x represents the pixel position of the acquired image, and the amount of phase deviation $\Delta\varphi$ (t, x) per unit time (one second) is calculated for each pixel position.

This processing is executed in the phase difference calculation unit 204 illustrated in FIG. 16. Moreover, x represents the pixel position of the acquired image.

(Step S105)

Subsequently, in step S105, it is determined whether or not the processing of steps S101 to S104 is completed for the specified number of times as repetitive processing operations of a plurality of frames.

In the case where the specified number of times is not reached, the processing operations of step S101 and subsequent steps are repeated. In the case where the specified number of times is reached, the processing proceeds to step S106.

(Step S106)

Subsequently, in step S106, the pixel-corresponding data of the moving subject position is removed from the amount of phase deviation $\Delta\varphi$ (t, x) for each pixel calculated in step S104, an average value of the amounts of phase deviation $\Delta\varphi$ (t, x) corresponding to a still subject is calculated. This average value is used as the amount of phase deviation ($\Delta\varphi$) per unit time (one second).

This processing is executed in the clock deviation amount estimation unit 210 illustrated in FIG. 16.

Moreover, the reason why the data corresponding to the moving subject pixel is not included is that, when the object is moving as described above, accurate frequency synchronization processing fails to be performed even by using the reflected light from the moving object.

(Step S107)

Subsequently, in step S107, a newly adjusted sensor clock frequency f's in which the current sensor clock frequency $f_S$ substantially matches the frequency of the light source unit clock is calculated according to the following formula.

$$f's = f_S + (\Delta\varphi/2\pi)$$

This processing is executed in the clock deviation amount estimation unit 210 illustrated in FIG. 16.

(Step S108)

In step S108, finally, the adjusted sensor clock frequency f's calculated in step S107 is set to the frequency of the sensor clock.

This processing is executed in the sensor clock adjustment unit 211 illustrated in FIG. 16.

The processing executed according to the above procedure substantially eliminates the deviation in frequency between the sensor clock (CLK2) on the side of the rangefinder (camera) 20 and the light source unit clock (CLK1) on the side of the light source unit 10.

Moreover, in the present embodiment, the clock adjustment unit 211 is provided on the side of the rangefinder (camera) 20 to eliminate or reduce the deviation in frequency between the light source unit clock (CLK1) on the side of the light source unit 10 and the sensor clock (CLK2) on the side of the rangefinder (camera) 20. For example, the clock adjustment unit can be provided on the side of the light source unit 10 to perform the adjustment for eliminating or reducing the deviation in frequency between two clocks on the side of the light source unit 10.

6. Details of Calculation Processing of Position and Orientation of Light Source Unit and Specific Processing Example in Performing Distance Calculation Together with Position and Orientation Calculation Processing of Light Source Unit The position and orientation estimation processing of the light source unit in step S13 described with reference to the flowchart illustrated in FIG. 11 is now described in detail.

Furthermore, in this item, a description is given of a specific example of the processing in step S21 described with reference to the flowchart illustrated in FIG. 12A, that is, the processing of estimating the position and orientation of the light source unit and the distance calculation conjointly.

The processing of the procedure illustrated in FIG. 11 in step S13 is a processing in which the position or orientation of the light source unit 10 is estimated. As described above with reference to FIG. 7, the light source unit 10 includes a plurality of light sources a to c. In step S13, the processing for estimating the three-dimensional position of each of these light sources a to c is performed.

The processing of the procedure illustrated in FIG. 12A in step S21 is a processing for estimating the position and orientation of the light source unit 10 and the calculation processing for the distance to the object, that is, the distance from the rangefinder (camera) 20 to the object 30, are executed in combination together.

The processing of step S21 corresponds to the processing executed by combining the processing of step S13 and the processing of step S14 according to the procedure illustrated in FIG. 11.

The specific example of the processing described above is described with reference to FIG. 17 and other figures.

Figure 17:
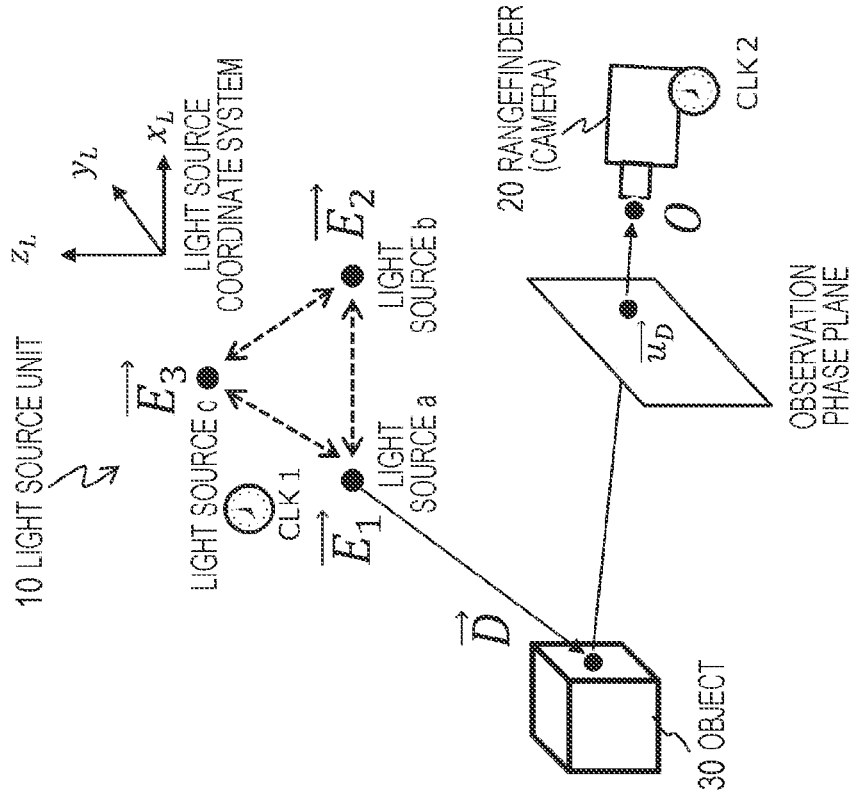
FIG. 17 is a diagram illustrated to describe exemplary specific processing of calculating the position and orientation of the light source unit and calculating the distance to a subject.
Figure 18:
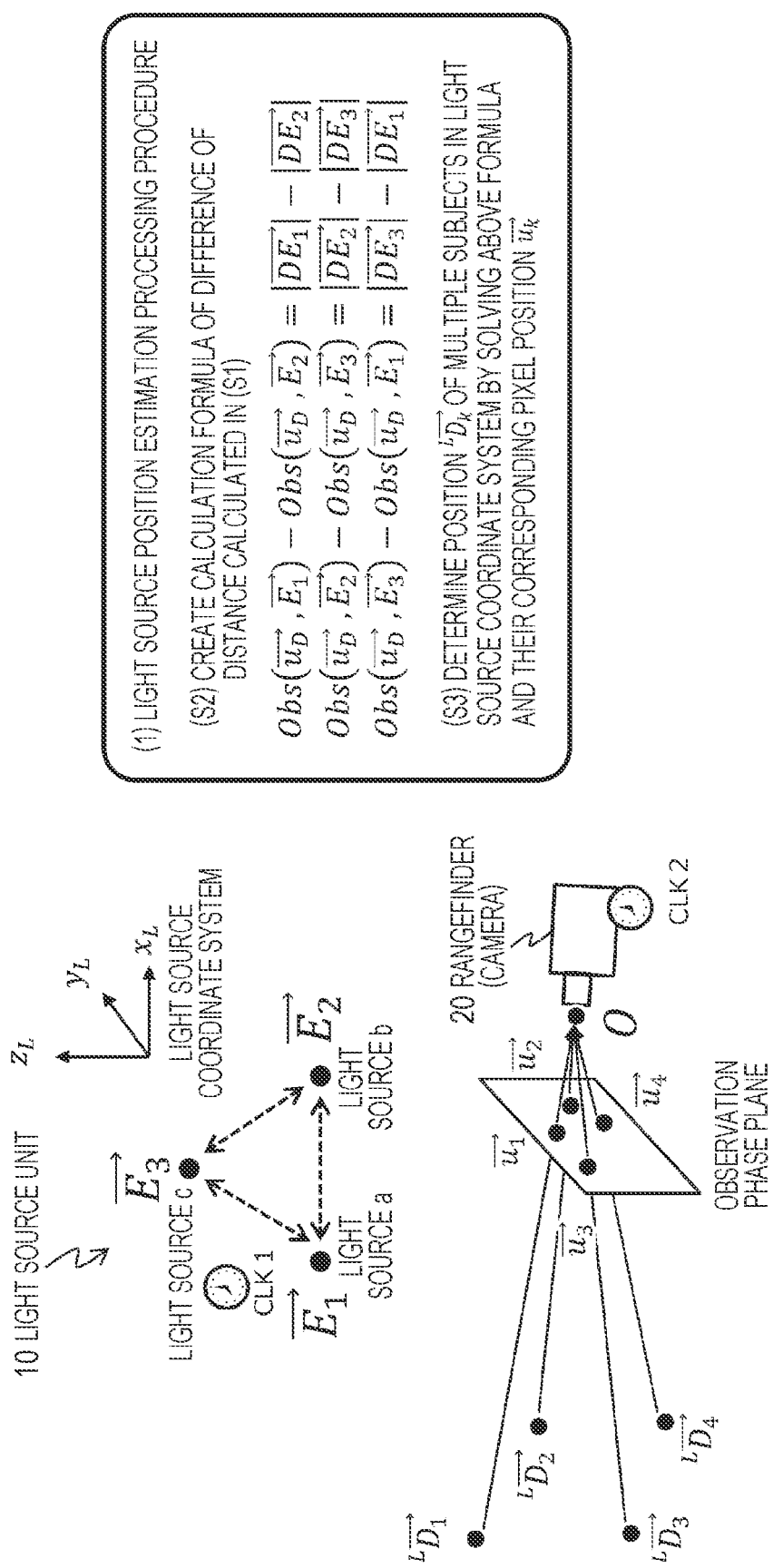
FIG. 18 is a diagram illustrated to describe exemplary specific processing of calculating the position and orientation of the light source unit and calculating the distance to a subject.

FIGS. 17 and 18 are diagrams illustrated to describe the estimation processing procedure of the position and orientation of the light source unit. Moreover, the position and orientation estimation processing of the light source unit is executed under the preconditions below:

(a) Light source coordinate system, which is the coordinate system of the light source unit, is defined, and when it is undefined, define it.

However, the relative position between the light source coordinate system and the camera coordinate system is unknown, (b) Relative position of each light source in the light source unit is known.

In other words, the light source coordinate system knows each light source position, (c) Location of the entire light source unit is unknown, and (d) Clock frequencies of the light source clock and the sensor clock substantially match (adjustment completed) or a deviation is known.

However, the phase deviation remains.

Under these preconditions, the position and orientation estimation processing of the light source unit 10, specifically, the three-dimensional position estimation processing of each of the plurality of light sources provided in the light source unit 10 is performed.

Moreover, the light source position estimation processing is executed in the light source position estimation unit 206 of the rangefinder (camera) 20 illustrated in FIG. 10. The specific configuration of the light source position estimation unit 206 is described in the subsequent stage with reference to FIG. 20.

The light source position estimation unit 206 initially executes the first half (procedure step (S1)) of the light source position estimation processing procedure shown in the descriptive part (1) of FIG. 17.

In other words, in the procedure step (S1), the distance is calculated (a range between the rangefinder (camera) 20 and respective light sources a to c) using the frame acquired on the basis of the light-receiving pulse of the pulse emitted by the respective light sources a to c of the light source unit 10.

The distance between the respective light sources a to c and the rangefinder (camera) 20 is expressed by (Formula 11) below.

[Math. 1]

$$Obs(\vec{u}_D, \vec{E}_1) = |\vec{OD}| + |\vec{DE_1}| + C$$

$$Obs(\vec{u}_D, \vec{E}_2) = |\vec{OD}| + |\vec{DE_2}| + C$$

$$Obs(\vec{u}_D, \vec{E}_3) = |\vec{OD}| + |\vec{DE_3}| + C \quad \text{(Formula 11)}$$

Note that the vector notation parameter in (Formula 11) above (parameters represented with the arrow "→" above each parameter) indicates a vector from the origin of one coordinate system, for example, the light source coordinate system. In addition, the parameters in (Formula 11) above indicate the following:

C is an offset term corresponding to the rangefinding error caused by the phase deviation between clocks of the light source unit 10 and the rangefinder (camera) 20, Obs $(u_D, E_1)$ is the distance observed at pixel position $u_D$ in emitting light by the light source a located at position $E_1$, Obs $(u_D, E_2)$ is the distance observed at pixel position $u_D$ in emitting light by the light source b located at position $E_2$, Obs $(u_D, E_3)$ is the distance observed at pixel position $u_D$ in emitting light by the light source c located at position $E_3$, $u_D = (u_D, v_D)$ is the pixel position where point D is projected,

|OD| is the magnitude (distance) of the vector connecting the rangefinder (camera) 20 and the object 30. Note that O is the origin of the camera coordinate system, which is the coordinate system of the rangefinder (camera) 20, and D is the position where the light from the light source is reflected from the object 30, and

|DEn| is the magnitude (distance) of the vector connecting each light source at a position En and the reflected position at the object 30.

Note that the vector notation is omitted in the description above for the formulas. Moreover, the vector notation is omitted in the description herein.

As described above, in the procedure step (S1), the light source position estimation unit 206 calculates, as three distance calculation formulas from the three light sources a to c provided in the light source unit 10 to the rangefinder (camera) 20, three distance calculation formulas having data mentioned in (a) to (c) below:

(a) Distance data |OD|, between rangefinder and object, (b) Distance data |DEn|, between object and light sources, and (c) Offset C, corresponding to rangefinding error occurring due to difference in phase between sensor clock and light source clock.

Subsequently, the light source position estimation unit 206 executes the second half (procedure step (S2 to S3)) of the light source position estimation processing procedure shown in the descriptive part (1) of FIG. 18.

In other words, in the procedure step (S2), a simultaneous equation of calculation formula for the difference between three distances Obs ($u_D$, $E_1$), Obs ($u_D$, $E_2$), and Obs ($u_D$, $E_3$) calculated in the procedure step (S1) is created, which is the simultaneous equation shown in (Formula 12) below.

[Math. 2]

$$Obs(\vec{u}_D, \vec{E}_1) - Obs(\vec{u}_D, \vec{E}_2) = |\vec{DE}_1| - |\vec{DE}_2|$$

$$Obs(\vec{u}_D, \vec{E}_2) - Obs(\vec{u}_D, \vec{E}_3) = |\vec{DE}_2| - |\vec{DE}_3|$$

$$Obs(\vec{u}_D, \vec{E}_3) - Obs(\vec{u}_D, \vec{E}_1) = |\vec{DE}_3| - |\vec{DE}_1| \quad \text{(Formula 12)}$$

Subsequently, in the procedure step (S3), the simultaneous equations mentioned above are solved to determine a plurality of subject positions $L_{Dk}$ in the light source coordinate system and their corresponding pixel positions $u_k$.

The light sources' positions as viewed from the camera coordinates are unknown, so this equation fails to solve without any modification in the camera coordinate system. However, the light sources' positions in the light source coordinate system are known, so it is possible to solve the equation in the light source coordinate system.

Solving the simultaneous equations shown in Formula 12 above using the light source coordinate system makes it possible to determine a plurality of subject positions $L_{Dk}$ in the light source coordinate system and their corresponding pixel positions $u_k$.

Moreover, in this example, the plurality of subject positions $L_{Dk}$ includes, for example, the respective positions $E_1$, $E_2$, and $E_3$ of the light sources a, b, and c of the light source unit 10 and the surface positions of the object 30.

Moreover, if the correspondence between a plurality of points in a coordinate system and pixel positions projected by the camera is known, it is typically possible to determine the relative position and orientation between the coordinate system and the camera coordinate system.

In other words, solving what is called the perspective-n-point (PnP) problem makes it possible to derive the relative relationship between the light source coordinate system and the camera coordinate system, converting the subject position in the light source coordinate system into the camera coordinate system.

This processing makes it possible to determine the subject position $L_{Dk}$ in the camera coordinate system and its corresponding pixel position $u_k$. Thus, in the camera coordinate system, it is possible to determine the respective positions $E_1$, $E_2$, and $E_3$ of the light sources a, b, and c and their surface positions on the object 30 from the positions of captured pixels of the light sources a to c. The determination of the surface position of the object 30 in the camera coordinate system makes it possible to calculate the distance to the object 30, that is, the distance between the rangefinder (camera) 20 and the object.

The detailed configuration of the light source position estimation unit 206 of the rangefinder (camera) 20 and the processing sequence of the light source position and orientation estimation processing and the subject position calculation processing (i.e., distance calculation processing) are now described with reference to FIGS. 19 and 20.

Figure 19:
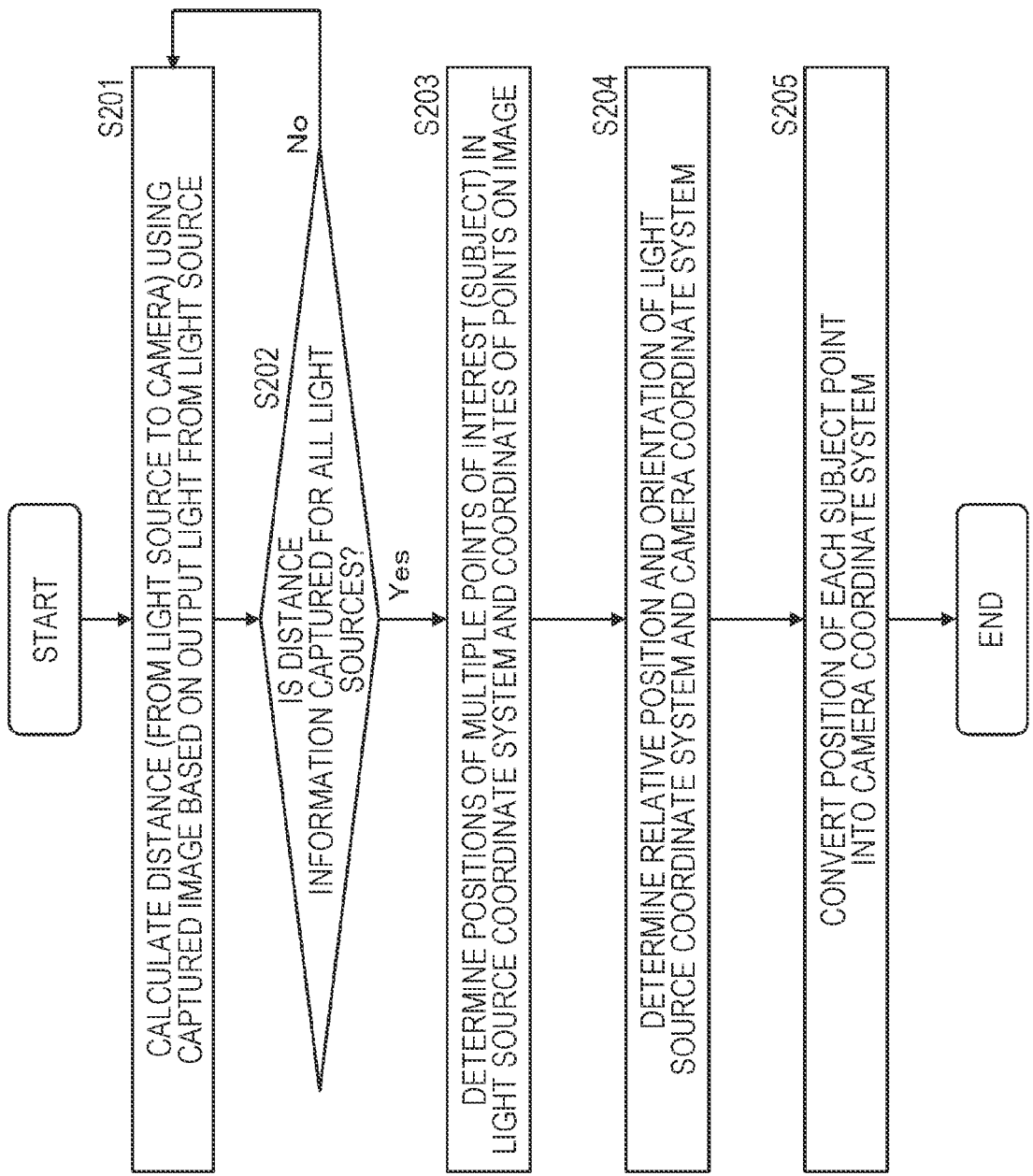
FIG. 19 is a diagram illustrating a flowchart for describing the specific processing sequence of calculating the position and orientation of the light source unit and calculating the distance to a subject.

FIG. 19 is a flowchart illustrated to describe the processing sequence of the light source position and orientation estimation processing and the subject position calculation processing (i.e., distance calculation processing).

Figure 20:
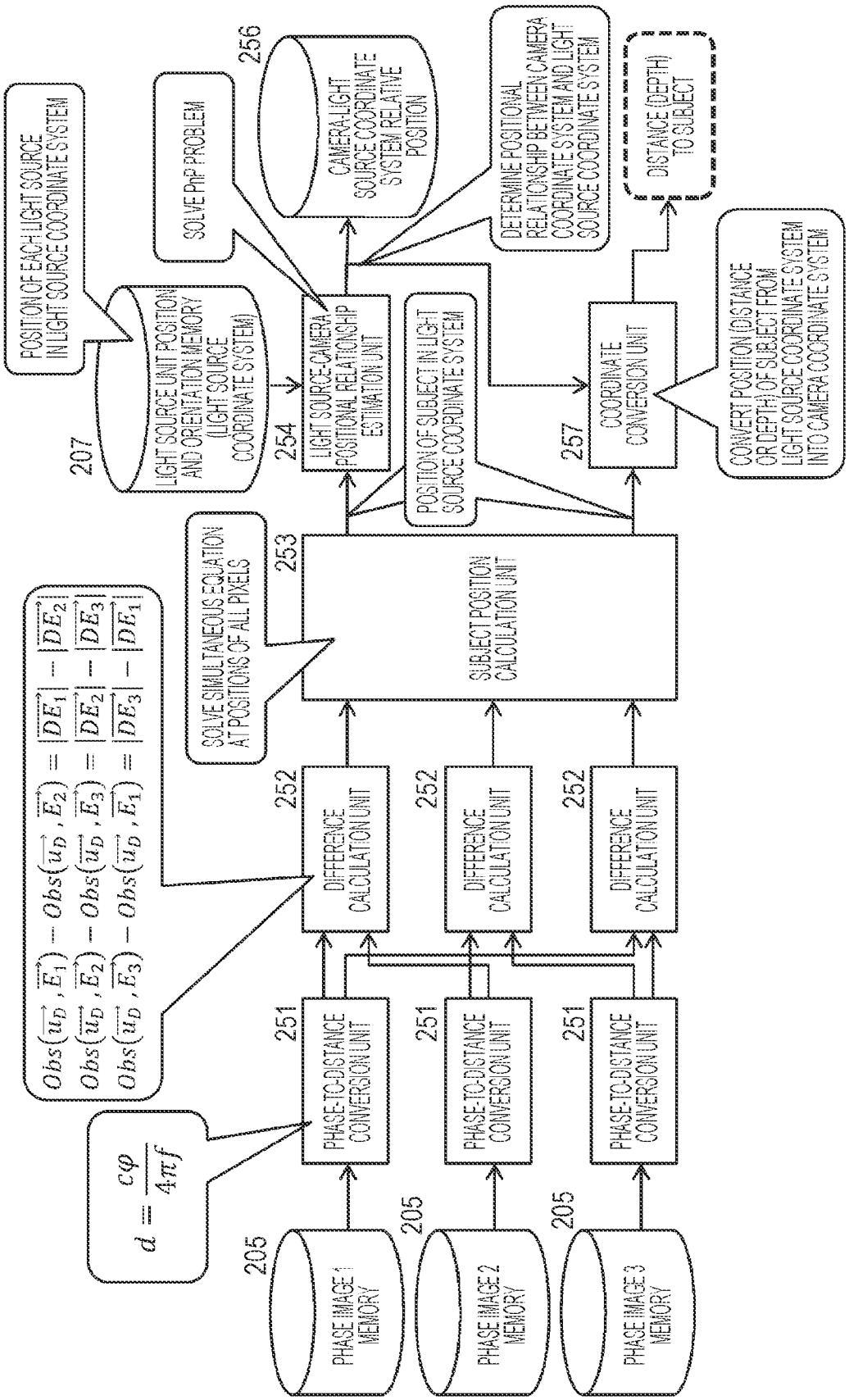
FIG. 20 is a diagram illustrated to describe a constituent component in the rangefinder (camera) used to calculate the position and orientation of the light source unit and calculate the distance to a subject.

FIG. 20 is a diagram illustrating the detailed configuration of the light source position estimation unit 206 of the rangefinder (camera) 20 described above with reference to FIG. 10.

The processing of each step in the flowchart of FIG. 19 is described with reference to the configuration block diagram illustrated in FIG. 20.

(Step S201)

Step S201 initially calculates a distance (the distance between the light sources a to c and the rangefinder (camera) 20) using a frame acquired on the basis of the output light from one light source among the light sources a to c of the light source unit 10, that is, the light-receiving pulse of the emission pulse.

The distance between the respective light sources a to c and the rangefinder (camera) 20 is expressed by (Formula 11) described above.

[Math. 3]

$$Obs(\vec{u}_D, \vec{E}_1) = |\vec{OD}| + |\vec{DE}_1| + C$$

$$Obs(\vec{u}_D, \vec{E}_2) = |\vec{OD}| + |\vec{DE}_2| + C$$

$$Obs(\vec{u}_D, \vec{E}_3) = |\vec{OD}| + |\vec{DE}_3| + C \quad \text{(Formula 11)}$$

As described above, in the procedure step S201, the light source position estimation unit 206 calculates, as three distance calculation formulas from the three light sources a to c provided in the light source unit 10 to the rangefinder (camera) 20, three distance calculation formulas having data mentioned in (a) to (c) below:
(a) Distance data |OD|, between rangefinder and object,
(b) Distance data |DEn|, between object and light sources, and
(c) Offset C, corresponding to rangefinding error occurring due to difference in phase between sensor clock and light source clock.

FIG. 20 is a diagram illustrating the detailed configuration of the light source position estimation unit 206 of the rangefinder (camera) 20. The phase image memories 1 to 3, and 205 correspond to the phase image memory 205 illustrated in FIG. 10 and are illustrated individually in FIG. 20 as memories that store the phase images corresponding to the respective light sources a to c.

The processing of step S201 is executed in a phase-to-distance conversion unit 251 illustrated in FIG. 20.

(Step S202)

Step S202 determines whether or not the acquisition of distance information for all light sources is completed.

When the acquisition of the distance information for all the light sources is not completed, the processing returns to step S201, and the distance information acquisition processing for the light sources to be processed is executed.

If the acquisition of distance information for all the light sources is completed, the processing proceeds to step S203.

(Step S203)

In step S203, the processing for determining the position of a plurality of points of interest (subjects) in the light source coordinate system and the coordinates of the points on the image is performed.

This processing corresponds to the processing (steps S2 to S3) of FIG. 18 described above.

In other words, initially, a simultaneous equation of calculation formulas for the difference between the distances corresponding to the three light sources Obs ($u_D$, $E_1$), Obs ($u_D$, $E_2$), and Obs ($u_D$, $E_3$) calculated in step S201 is created, which is the simultaneous equation shown in (Formula 12) described above.

[Math. 4]

$$Obs(\vec{u}_D, \vec{E}_1) - Obs(\vec{u}_D, \vec{E}_2) = |\vec{DE}_1| - |\vec{DE}_2|$$

$$Obs(\vec{u}_D, \vec{E}_2) - Obs(\vec{u}_D, \vec{E}_3) = |\vec{DE}_2| - |\vec{DE}_3|$$

$$Obs(\vec{u}_D, \vec{E}_3) - Obs(\vec{u}_D, \vec{E}_1) = |\vec{DE}_3| - |\vec{DE}_1| \quad \text{(Formula 12)}$$

Moreover, this difference calculation processing is executed in a difference calculation unit 252 illustrated in FIG. 20.

The difference data calculated by the difference calculation unit 252 is output to a subject position calculation unit 253. The subject position calculation unit 253 solves the simultaneous equation to calculate a plurality of subject positions $L_{Dk}$ in the light source coordinate system and their corresponding pixel positions $u_k$.

As described above with reference to FIG. 18, the light sources' positions as viewed from the camera coordinates are unknown, so this equation fails to solve without any modification in the camera coordinate system. However, the light sources' positions in the light source coordinate system are known, so it is possible to solve the equation in the light source coordinate system.

Solving the simultaneous equations shown in Formula 12 above using the light source coordinate system makes it possible to determine a plurality of subject positions $L_{Dk}$ in the light source coordinate system and their corresponding pixel positions $u_k$.

Moreover, in this example, the plurality of subject positions $L_{Dk}$ includes, for example, the respective positions $E_1$, $E_2$, and $E_3$ of the light sources a, b, and c of the light source unit 10 and the surface positions of the object 30.

(Step S204 to S205)

As described above with reference to FIG. 18, if the correspondence between a plurality of points in a coordinate system and pixel positions projected by the camera is known, it is typically possible to determine the relative position and orientation between the coordinate system and the camera coordinate system.

First, in step S204, solving the perspective-n-point (PnP) problem makes it possible to derive the relative relationship between the light source coordinate system and the camera coordinate system.

This processing is executed in a light source-camera positional relationship estimation unit 254 illustrated in FIG. 20. The light source-camera positional relationship estimation unit 254 obtains the light source coordinate system light source position stored in the light source coordinate system light source position memory 254 to solve the perspective-n-point (PnP) problem to obtain the light source coordinate system. Thus, the light source-camera positional relationship estimation unit 254 derives the relative relationship with the camera coordinate system and stores the result in the camera-light source coordinate system relative position DB 256. This information is output to a coordinate conversion unit 257.

Subsequently, in step S205, the subject position in the light source coordinate system is converted into values in the camera coordinate system. This processing is executed in the coordinate conversion unit 257.

These processing make it possible to determine the subject position $L_{Dk}$ in the camera coordinate system and its corresponding pixel position $u_k$. Thus, in the camera coordinate system, it is possible to determine the respective positions $E_1$, $E_2$, and $E_3$ of the light sources a, b, and c and their surface positions on the object 30 from the positions of captured pixels of the light sources a to c, and to calculate the distance to the object 30, that is, the distance between the rangefinder (camera) 20 and the object.

Moreover, this distance (depth) calculation processing is executed in the distance (depth) calculation unit 220 of the rangefinder (camera) 20 described with reference to FIG. 10.

7. Specific Processing Example in Performing Offset Calculation Processing Based on Clock Phase Difference and Object Distance (Depth) Calculation Processing A description is now given of a specific processing example in the case of performing the processing of step S14 described with reference to the flowchart illustrated in FIG. 11, that is, the offset calculation processing based on the clock phase difference and the object distance (depth) calculation processing.

The processing of the procedure illustrated in FIG. 11 in step S14 is a processing for the distance (depth) measurement processing of the object 30, that is, the processing to measure the distance from the rangefinder (camera) 20 to the object 30. Furthermore, for this processing, the processing is executed for calculating an offset C corresponding to the clock phase difference, that is, a rangefinding error, occurring due to the difference in phase between the sensor clock and the light source clock.

Moreover, this processing can be executed even for the light source unit 10 provided with two light sources. In other words, the light source unit 10 is implementable as long as it includes two or more light sources.

The specific example of the processing described above is described with reference to FIG. 21 and other figures.

The phase difference calculation processing between the clock on the side of the light source unit 10 and the clock on the side of the rangefinder (camera) 20 is executed under the preconditions as follows:

(a) Position of each light source of the light source unit 10 is known in the camera coordinate system, and (b) Light source unit clock of the light source unit 10 and sensor clock on the side of the rangefinder (camera) 20 substantially match in frequency or their frequencies are estimated.

Under these preconditions, the phase difference calculation processing for the clock on the side of the rangefinder (camera) 20 is executed, and further calculates the distance to a subject, such as the object 30.

Moreover, the clock phase difference calculation processing is executed in the clock phase difference (light source clock offset) calculation unit 208 of the rangefinder (camera) 20 illustrated in FIG. 10. The distance calculation is performed in the distance (depth) calculation unit 220.

Moreover, the clock phase difference (light source clock offset) calculation unit 208 calculates the phase difference with the clock on the side of the rangefinder (camera) 20 or the offset C corresponding to the rangefinding error based on the phase difference. The distance (depth) calculation unit 220 applies this offset C to calculate the distance to the object 30.

The offset C is the offset C corresponding to an error amount in calculating the distance based on the phase difference between the sensor clock 201 and the light source unit clock 101 and has the similar value to the offset C of (Formula 11) used in the procedure step (S1) described above with reference to FIG. 17.

It is possible to execute the phase difference calculation processing with the clock on the side of the rangefinder (camera) 20 and the subject distance calculation processing of the object 30 or the like using only the light emission pulses from the two light sources of the light source unit 10.

As described above, this processing is executable not only in the configuration in which the light source unit 10 has three light sources but also in the configuration having only two light sources.

Figure 21:
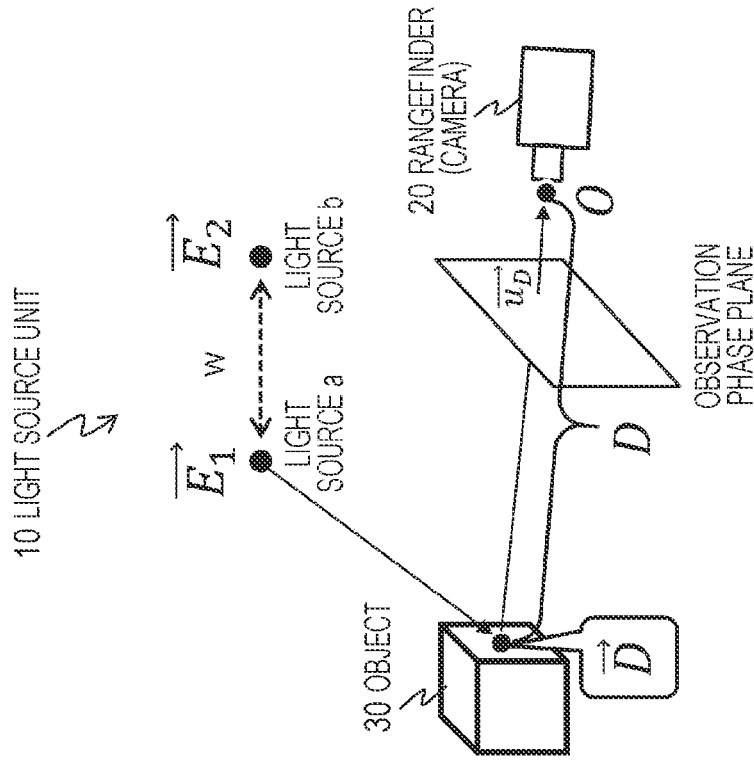
FIG. 21 is a diagram illustrated to describe exemplary specific processing in performing offset calculation processing based on a clock phase difference and object distance (depth) calculation processing.

FIG. 21 illustrates only the two light sources a and b of the light source unit 10.

The two light sources are the light source a located at position $E_1$ and the light source b located at position $E_2$. Moreover, the positions are assumed to be acquired in the camera coordinate system having an origin O at the position of the rangefinder (camera) 20 illustrated in FIG. 21.

The diagrammatic part on the right side of FIG. 21 shows an overview of "(1) distance (depth) calculation processing" executed by the clock phase difference (light source clock offset) calculation unit 208 and the distance (depth) calculation unit 220.

At first, in the procedure step (S1), the distance is calculated (a range between the rangefinder (camera) 20 and respective light sources a and b) using the frame acquired on the basis of the light-receiving pulse of the pulse emitted by the two light sources a and b of the light source unit 10.

The distance between the respective light sources a and b and the rangefinder (camera) 20 is expressed by (Formula 21) below.

[Math. 5]

$$Obs(\vec{u}_D, \vec{E}_1) = |\vec{OD}| + |\vec{DE}_1| + C$$

$$Obs(\vec{u}_D, \vec{E}_2) = |\vec{OD}| + |\vec{DE}_2| + C \quad \text{(Formula 21)}$$

Note that the vector notation parameter in (Formula 21) above (parameters represented with the arrow "→" above each parameter) indicates a vector from the origin of one coordinate system, for example, the camera coordinate system. In addition, the parameters in (Formula 21) above indicate the following:

C is an offset term corresponding to the rangefinding error caused by the phase deviation between clocks of the light source unit 10 and the rangefinder (camera) 20, Obs ($u_D$, $E_1$) is the distance observed at pixel position $u_D$ in emitting light by the light source a located at position $E_1$, Obs ($u_D$, $E_2$) is the distance observed at pixel position $u_D$ in emitting light by the light source b located at position $E_2$, $u_D = (u_D, v_D)$ is the pixel position where point D is projected,

|OD| is the magnitude (distance) of the vector connecting the rangefinder (camera) 20 and the object 30. Note that 0 is the origin of the camera coordinate system, which is the coordinate system of the rangefinder (camera) 20, and D is the position where the light from the light source is reflected from the object 30, and

|DEn| is the magnitude (distance) of the vector connecting each light source at a position En and the reflected position at the object 30.

Note that the vector notation is omitted in the description above for the formulas.

As described above, in the procedure step (S1), the distance (depth) calculation unit 220 calculates, as two distance calculation formulas from the two light sources a and b provided in the light source unit 10 to the rangefinder (camera) 20, two distance calculation formulas having data mentioned in (a) to (c) below:
(a) Distance data |OD|, between rangefinder and object,
(b) Distance data |DEn|, between object and light sources, and
(c) Offset C, corresponding to rangefinding error occurring due to difference in phase between sensor clock and light source clock.

Subsequently, in the procedure step (S2), a calculation formula for a difference between two distances Obs ($u_D$, $E_1$) and Obs ($u_D$, $E_2$) calculated in the procedure step (S1) is created, which is the difference calculation formula expressed as Formula 22 below.

[Math. 6]

$$Obs(\vec{u}_D, \vec{E}_1) - Obs(\vec{u}_D, \vec{E}_2) = |\vec{DE}_1| - |\vec{DE}_2| \quad \text{(Formula 22)}$$

The creation of this difference calculation formula makes it possible to eliminate the offset term C included in the distance calculation formula created in the procedure step (S1), that is, the offset term C corresponding to the rangefinding error caused by the phase deviation between clocks of the light source unit 10 and the rangefinder (camera) 20.

Subsequently, in the procedure step (S3), the distance to the object 30, that is, the distance D between the rangefinder (camera) 20 and the object 30, is calculated.

In this processing, initially, a unit vector d in the direction of a vector OD from the origin O of the rangefinder (camera) 20 to the surface D of the object 30 is determined, and the Formula 23 below is created.

[Math. 7]

$$\vec{OD} = D\vec{d} \quad \text{(Formula 23)}$$

(Formula 23) is a linear equation formed by a line connecting the rangefinder (camera) 20 and the object 30.

In this way, in the procedure step (S3), the distance (depth) calculation unit 220 creates
(d) a linear equation formed by a line connecting the rangefinder (camera) 20 and the object 30.

Subsequently, the position (x,y,z) of the surface D of the object 30 is calculated by using (Formula 23) and the distance difference calculation formula (Formula 22) previously created in the procedure step (S2), the distance D is calculated on the basis of the position (x,y,z).

The processing of the procedure steps S1 to S3 can be summarized as follows.

In the procedure step (S1), the distance (depth) calculation unit 220 generates, as two distance calculation formulas from the at least two light sources provided in the light source unit 10 to the rangefinder (camera) 20, two distance calculation formulas having data mentioned in (a) to (c) below:
(a) Distance data, between the rangefinder and the object,
(b) Distance data, between the object and light sources of the light source unit, and
(c) Offset C, corresponding to rangefinding error occurring due to difference in phase between sensor clock and light source clock.

Furthermore, in the procedure step (S2), one difference calculation formula for calculating the difference between the distance calculation formulas is created.

Furthermore, in the procedure step (S3), (d) a linear equation determined by a line connecting the rangefinder and the object is created, and the difference calculation formula and the linear equation are solved as simultaneous equations to calculate the distance between the rangefinder (camera) 20 and the object 30.

This processing is described with reference to FIG. 22.

The distance difference calculation formula (Formula 22) created in the procedure step (S2) corresponds to an equation indicating one side of a two-sheet hyperboloid with the respective positions $E_1$ and $E_2$ of the light sources a and b as focal points. It is herein referred to as a hyperboloid for the sake of simplicity.

On the other hand, (Formula 23) created in the procedure step (S3) corresponds to an equation indicating a straight line connecting the origin O of the rangefinder (camera) 20 and the surface D of the object 30.

As illustrated in the descriptive part (A) of FIG. 22, two equations of the difference calculation formula (Formula 22) corresponding to the hyperboloid equation and (Formula 23) corresponding to the linear equation are solved as a simultaneous equation. Thus, it is possible to calculate a point satisfying the two equations, that is, an intersection point, as illustrated in the diagrammatic part (B1) of FIG. 22.

As illustrated in the diagrammatic part (B1) of FIG. 22, this intersection point is the position (x,y,z) of the surface position D of the object 30.

In this way, two equations of the difference calculation formula (Formula 22) corresponding to the hyperboloid equation and (Formula 23) corresponds to a linear equation are solved as simultaneous equations. Thus, it is possible to calculate the position (x,y,z) of the surface D of the object 30. This position (x,y,z) is a coordinate indicating the position of the camera coordinate system. It is possible to calculate the distance D from the origin O of the camera coordinate system on the basis of the position (x,y,z).

Moreover, as illustrated in the diagrammatic part (B2) of FIG. 22, there is a possibility that two intersection points will be detected as the intersection point caused by the difference calculation formula (Formula 22) corresponding to the hyperboloid equation and (Formula 23) corresponding to the linear equation. It is typically difficult to identify which one is the right position. However, this problem can be avoided by changing the relative position of the camera and light source (described later). Alternatively, by attaching a light-shielding plate or the like to the respective point light sources and projecting light only in the direction of the camera (or the direction opposite to the camera), it is possible to identify which one of multiple solutions is the right position.

In general, given that the distances from points A and B to a point P are represented by |AP| and |BP|, the set of points P having constant |AP|−|BP| is a part of the hyperboloid. In other words, the above-mentioned difference calculation formula (Formula 22) is a formula indicating a part of the hyperboloid.

For example, given that the coordinates of the point A are (0,0,c), the coordinates of the point B are (0,0,−c), and |AP|−|BP| equal to 2e as illustrated in FIG. 23, the points P satisfy (Formula 24) below.

[Math. 8]

$$\frac{1}{c^2-e^2}x^2 + \frac{1}{c^2-e^2}y^2 - \frac{1}{e^2}z^2 = -1 \quad \text{(Formula 24)}$$

Moreover, an illustration represented by (Formula 24) above is divided into two curved surfaces in the +z direction and the −z direction in the figure showing the hyperboloid in FIG. 23. This is because the same formula as (Formula 24) can be obtained even in the case of |AP|−|BP|=−2e. If the sign of |AP|−|BP| is known, one of them is specified.

The difference calculation formula (Formula 22) described above is also equivalent to this problem, so the illustration represented by (Formula 22) is one sheet of the hyperboloid (two-sheet hyperboloid).

In this way, the distance (depth) calculation unit 220 solves two equations of the difference calculation formula (Formula 22) corresponding to the hyperboloid equation and (Formula 23) corresponding to the linear equation as simultaneous equations and calculates the position (x,y,z) of the surface D of the object 30. Furthermore, the distance (depth) calculation unit 220 calculates the distance D from the origin O of the camera coordinate system on the basis of the calculated position (x,y,z).

Figure 24:
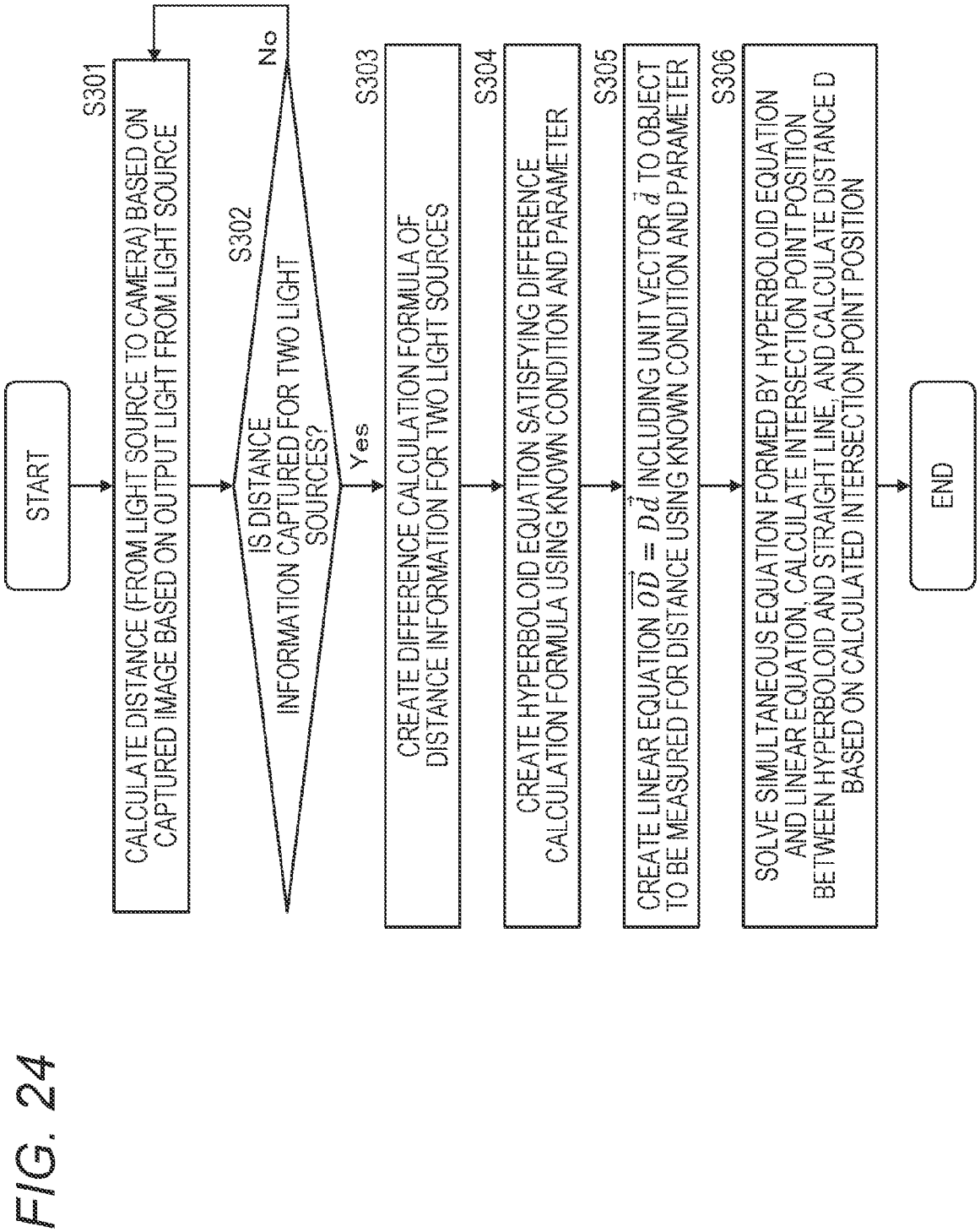
FIG. 24 is a diagram illustrating a flowchart for describing the specific processing sequence in performing offset calculation processing based on a clock phase difference and object distance (depth) calculation processing.
Figure 25:
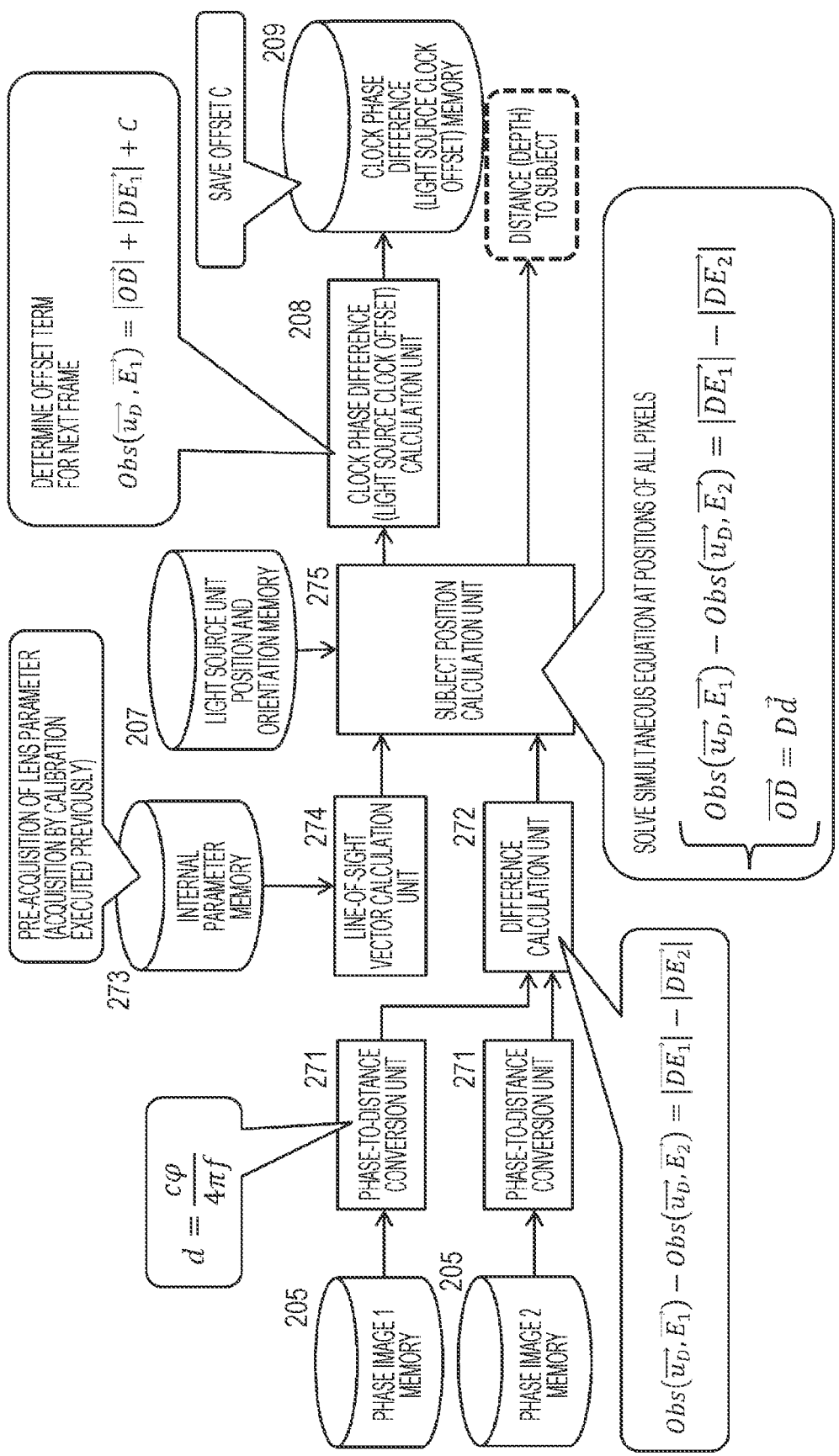
FIG. 25 is a diagram illustrated to describe a constituent component in a rangefinder (camera) used to perform offset calculation processing based on a clock phase difference and object distance (depth) calculation processing.

With reference to FIGS. 24 and 25, a description is now given of the detailed configuration of the clock phase difference (light source clock offset) calculation unit 208 and the distance (depth) calculation unit 220 of the rangefinder (camera) 20. The description is also given of the processing sequence of the clock phase difference calculation processing and the subject position calculation processing (i.e., distance calculation processing).

FIG. 24 is a flowchart illustrated to describe the clock phase difference calculation processing and the subject position calculation processing (i.e., distance calculation processing).

FIG. 25 is a diagram illustrating the detailed configuration of the clock phase difference (light source clock offset) calculation unit 208 and the distance (depth) calculation unit 220 of the rangefinder (camera) 20 described above with reference to FIG. 10.

In the constituent components illustrated in FIG. 25, a phase-to-distance conversion unit 271 to a subject position calculation unit 275, other than the clock phase difference (light source clock offset) calculation unit 208, are constituent components of the distance (depth) calculation unit 220. An internal parameter memory 273 is a memory in the rangefinder (camera) 20 that is accessible by the distance (depth) calculation unit 220 and stores, for example, camera parameters or the like obtained by camera calibration processing executed in advance.

The processing of each step in the flowchart of FIG. 24 is described with reference to the configuration block diagram illustrated in FIG. 25.

(Step S301)

Step S301 initially calculates a distance (the distance between the light sources and the rangefinder (camera) 20) using a frame acquired on the basis of the output light from any one light source among the two light source a or b of the light source unit 10, that is, the light-receiving pulse of the emission pulse.

The processing of step S301 is executed in a phase-to-distance conversion unit 271 illustrated in FIG. 25.

(Step S302)

Step S302 determines whether or not the acquisition of distance information for two light sources is completed.

When the acquisition of the distance information for the two light sources is not completed, the processing returns to step S301, and the distance information acquisition processing for the light sources to be processed is executed.

If the acquisition of distance information for the two light sources is completed, the processing proceeds to step S303.

In the case where the acquisition of distance information of the two light sources is determined to be completed in the processing of step S302, the distance information of a formula expressed by (Formula 21) below is obtained as the distance calculation formula between the two light sources and the rangefinder (camera) 20.

[Math. 9]

$$Obs(\vec{u}_D, \vec{E}_1) = |\vec{OD}| + |\vec{DE}_1| + C$$

$$Obs(\vec{u}_D, \vec{E}_2) = |\vec{OD}| + |\vec{DE}_2| + C \quad \text{(Formula 21)}$$

FIG. 25 is a diagram illustrating the detailed configuration of both the clock phase difference (light source clock offset) calculation unit 208 and the distance (depth) calculation unit 220 of the rangefinder (camera) 20. The phase image memories 1 to 2, and 205 correspond to the phase image memory 205 illustrated in FIG. 10 and are illustrated individually in FIG. 25 as memories that store the phase images corresponding to the respective light source a and b.

(Step S303)

Subsequently, in the procedure step (S303), a calculation formula for a difference between two distances Obs ($u_D$, $E_1$) and Obs ($u_D$, $E_2$) calculated corresponding to the respective light source is created, which is the difference calculation formula expressed as (Formula 22) described above.

[Math. 10]

$$Obs(\vec{u}_D, \vec{E}_1) - Obs(\vec{u}_D, \vec{E}_2) = |\vec{DE}_1| - |\vec{DE}_2| \quad \text{(Formula 22)}$$

Moreover, this difference calculation processing is executed in a difference calculation unit 272 illustrated in FIG. 25.

The difference data calculated by the difference calculation unit 272 is output to the subject position calculation unit 275.

(Step S304)

Subsequently, in step S304, a hyperboloid equation that satisfies the difference calculation formula created in step S303 is created using the known conditions and parameters.

As described earlier, the difference calculation formula (Formula 22) described above is a formula indicating a part of the hyperboloid. In other words, given that the coordinates of the point A are (0,0,c), the coordinates of the point B are (0,0,−c), and |AP|−|BP| equal to 2e as illustrated in FIG. 23, the points P satisfy (Formula 24) described above. The illustration represented by (Formula 24) is divided into two curved surfaces in the +z direction and the −z direction in the figure showing the hyperboloid in FIG. 23.

This is because the same formula as (Formula 24) can be obtained even in the case of |AP|−|BP|=−2e. If the sign of |AP|−|BP| is known, one of them is specified.

The difference calculation formula (Formula 22) described above is also equivalent to this problem, so the illustration represented by (Formula 22) is one sheet of the hyperboloid (two-sheet hyperboloid).

In step S304, a hyperboloid equation that satisfies the difference calculation formula created in step S303 is created using the known conditions and parameters described above.

This processing is executed in the subject position calculation unit 275 illustrated in FIG. 25.

(Step S305)

Subsequently, in step S305, the unit vector d in the direction of the vector OD from the rangefinder (camera) 20 to the surface D of the object 30 is obtained using known conditions and parameters. A linear equation including the unit vector d, i.e., the linear equation indicated in (Formula 23) described above, is created.

Moreover, given that the pixel positions in which points (x,y,z) on a certain space are projected on the camera are (u, v), the positional relationships between them are typically defined as indicated (Formula 25) below.

[Math. 11]

$$u = f\frac{x}{z} + c_u$$
$$v = f\frac{y}{z} + c_v \quad \text{(Formula 25)}$$

Moreover, f, cv, and cu are lens parameters (internal parameters) that can be obtained in advance, and are stored in the internal parameter memory 273 illustrated in FIG. 25.

On the other hand, if the pixel positions (u, v) projected on the camera are given, it is possible to estimate the line-of-sight direction (line-of-sight vector) observed at the pixel positions can be estimated. In other words, Formula 26 below is obtained.

[Math. 12]

$$\begin{pmatrix} x \\ y \\ z \end{pmatrix} \propto \begin{pmatrix} \frac{u - c_u}{f} \\ \frac{v - c_v}{f} \\ 1 \end{pmatrix} \quad \text{(Formula 26)}$$

Solving (Formula 26) above makes it possible to determine the unit vector d corresponding to the line-of-sight vector in the direction of the vector OD.

With this processing, the unit vector d in the direction of the vector OD from the rangefinder (camera) 20 to the surface D of the object 30 is obtained. A linear equation including the unit vector d, i.e., the linear equation indicated in (Formula 23) described below, is created.

[Math. 13]

$$\vec{OD} = D\vec{d} \quad \text{(Formula 23)}$$

Moreover, this processing is executed in a line-of-sight vector calculation unit 274 and the subject position calculation unit 275 illustrated in FIG. 25.

[Step S306]

In step S306, finally, the simultaneous equations formed by the hyperboloid equations created in steps S303 to S304 and the linear equations created in step S305 are solved. The intersection-point position between the hyperboloid and the straight line is calculated. The distance D from the rangefinder (camera) 20 to the surface of the object 30 is calculated on the basis of the calculated intersection-point position.

This processing calculates the intersection-point position between the hyperboloid and the straight line, which is described above with reference to FIG. 22. In other words, it is the processing for acquiring the difference calculation formula corresponding to the hyperboloid equation (Formula 22), the formula corresponding to the linear equation (Formula 23), and simultaneous equations formed by the two equations.

[Math. 14]

$$Obs(\vec{u}_D, \vec{E}_1) - Obs(\vec{u}_D, \vec{E}_2) = |\vec{DE}_1| - |\vec{DE}_2| \quad \text{(Formula 22)}$$

$$\vec{OD} = D\vec{d} \quad \text{(Formula 23)}$$

By solving as the simultaneous equations, the position (x,y,z) of the surface D of the object 30 is calculated. This position (x,y,z) is a coordinate indicating the position of the camera coordinate system. It is possible to calculate the distance D from the origin O of the camera coordinate system on the basis of the position (x,y,z).

The processing of step S306 is executed in the subject position calculation unit 275 illustrated in FIG. 25.

In this way, it is possible to calculate the distance to the object 30.

Moreover, although not shown in the procedure, in executing the distance calculation processing, the clock phase difference (light source clock offset) calculation unit 208 illustrated in FIG. 25 further calculates the distance calculation formulas created in steps S301 to S302. In other words, the clock phase difference (light source clock offset) calculation unit 208 calculates the offset C included in the distance calculation formula of (Formula 21) below, that is, the value of the rangefinding error occurring due to the difference in phase between the sensor clock and the light source clock. The clock phase difference (light source clock offset) calculation unit 208 stores the results in the clock phase difference (light source clock offset) memory 209.

[Math. 15]

$$Obs(\vec{u}_D, \vec{E}_1) = |\vec{OD}| + |\vec{DE}_1| + C$$

$$Obs(\vec{u}_D, \vec{E}_2) = |\vec{OD}| + |\vec{DE}_2| + C \quad \text{(Formula 21)}$$

The value of the offset C is a fixed value, so it can be used in the subsequent distance calculation processing.

Moreover, the position and distance of the object 30 are calculated by the processing according to the procedure illustrated in FIG. 24 and the position of the light source is also acquired. Thus, it is possible to calculate the value of the offset C using the distance calculation formula of (Formula 21) above from these values.

Moreover, if the value of the offset C can be calculated, the difference in phase between the sensor clock and the light source clock can also be calculated on the basis of the value of the offset C. The calculated phase difference is stored in the clock phase difference (light source clock offset) memory 209, together with the value of the offset C.

8. Specific Example of Object Distance (Depth) Calculation Processing in a Case of Known Light Source Position and Light Source Clock Offset Next, The description is now given of specific example of object distance (depth) calculation processing in a case of known light source position and light source clock offset.

This processing corresponds to the processing of step S31 of the flowchart illustrated in FIG. 12B.

The processing illustrated in FIG. 12B in step S31 is a processing for measuring the distance (depth) to the object is executed by using the clock phase difference, that is, the offset C based on the phase difference between the sensor clock and the light source clock, specifically, the value of the rangefinding error based on the clock phase difference. As described above, the processing executed according to the procedure illustrated in FIG. 12B is the procedure executed in the case of previously calculating the offset C based on the clock phase difference and storing it in the memory.

In other words, for example, this processing is the distance calculation processing performed after the clock phase difference (light source clock offset) calculation unit 208 stores the value of the offset C in the clock phase difference (light source clock offset) memory 209, in the processing described with reference to FIGS. 21 to 25 described above.

Moreover, as described above, the offset C corresponds to the value of the rangefinding error that occurs due to the difference in phase between the sensor clock and the light source clock.

The specific example of the processing described above is described with reference to FIG. 26 and other figures.

Figure 26:
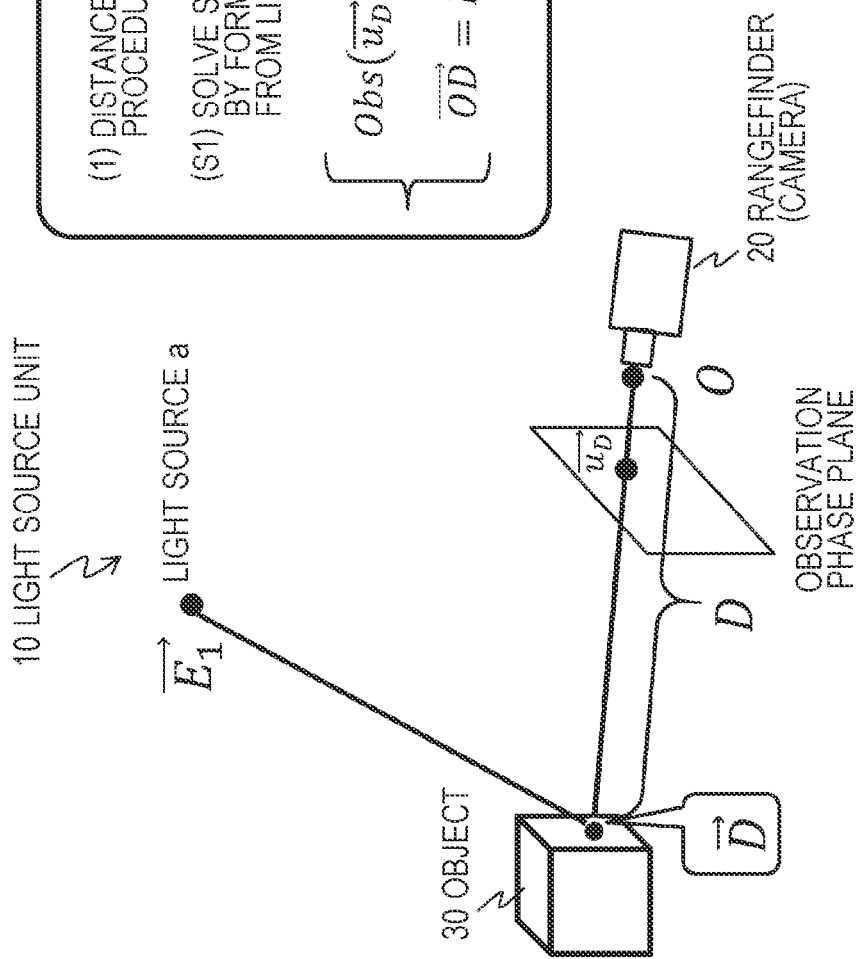
FIG. 26 is a diagram illustrated to describe exemplary specific object distance (depth) calculation processing in a case where a light source position and light source clock offset is known.

In this processing, the distance (depth) calculation unit 220 calculates the distance to the object 30 by solving the simultaneous equations of the two formulas shown on the right side of FIG. 26.

In other words, it is the simultaneous equation indicated in (Formula 31) below.

[Math. 16]

$$Obs(\vec{u}_D, \vec{E}_1) = |\vec{OD}| + |\vec{DE}_1| + C$$

$$\vec{OD} = D\vec{d} \quad \text{(Formula 31)}$$

The simultaneous equations of Formula 31 above are formed by two formulas of the distance calculation formula between the light source a and the rangefinder (camera) 20 and the linear equation including the unit vector d in the direction of the vector OD from the rangefinder (camera) 20 to the surface of the object 30.

The distance calculation formula between the light source a and the rangefinder (camera) 20 is the same as the formula included in (Formula 11) and (Formula 21) described above.

Obs ($u_D$, $E_1$) is the distance observed at pixel position up in emitting light by the light source a located at position $E_1$.

$u_D = (u_D, v_D)$ is the pixel position where point D is projected.

In addition, C is an offset term and corresponds to the value of the rangefinding error that occurs due to the difference in phase between the sensor clock and the light source clock. In this processing example, the value of this offset C is known.

The linear equation including the unit vector d is the same equation as (Formula 23) described above.

Figure 27:
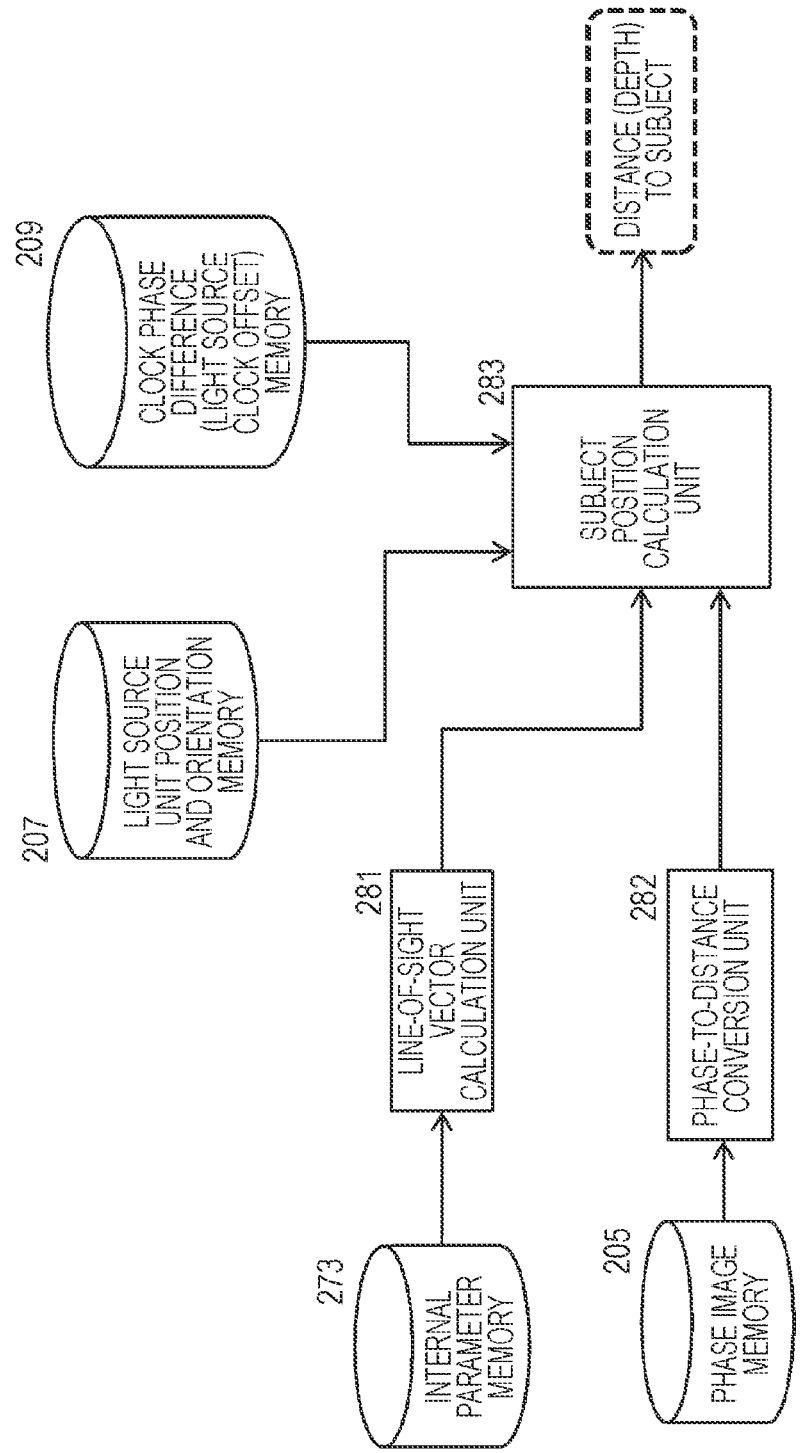
FIG. 27 is a diagram illustrated to describe a constituent component in a rangefinder (camera) used to perform object distance (depth) calculation processing in the case where a light source position and light source clock offset is known.

FIG. 27 is a diagram illustrating the detailed configuration of the distance (depth) calculation unit 220 that executes the processing described above. A description is given the processing for creating these simultaneous equations and the processing executed by the distance (depth) calculation unit 220 for solving the simultaneous equations to calculate the distance to the object 30 with reference to FIG. 27.

A phase-to-distance conversion unit 282 initially calculates a distance (the distance between the light source and the rangefinder (camera) 20) using a frame acquired on the basis of the output light from one light source from the light source a of the light source unit 10, that is, the light-receiving pulse of the emission pulse.

This calculation formula is the distance calculation formula for calculating Obs ($u_D$, $E_1$) of (Formula 31) above. Moreover, the offset C included in this distance calculation formula is the value of the rangefinding error that occurs due to the difference in phase between the sensor clock and the light source clock and is the known value stored in the clock phase difference (light source clock offset) memory 209 illustrated in FIG. 27.

On the other hand, a line-of-sight vector calculation unit 281 and a subject position calculation unit 283 obtains the unit vector d in the direction of the vector OD from the rangefinder (camera) 20 to the surface D of the object 30 using known conditions and parameters. A linear equation including the unit vector d, i.e., the linear equation included in (Formula 31) above, is created.

This processing is the same as the processing of step S305 of the procedure described above with reference to FIG. 24.

Subsequently, the subject position calculation unit 283 solves a simultaneous equation formed by a distance calculation formula created by the phase-to-distance conversion unit 282 and a linear equation including the unit vector d, that is, the simultaneous equation of (Formula 31) described above, and obtains the three-dimensional position of the surface D of the object 30 to calculate the distance D from the origin O of the camera coordinate system. Moreover, the light source position information used in these processing operations is acquired from the light source unit position and orientation memory 207. The value of the offset C is acquired from the clock phase difference (light source clock offset) memory 209.

9. Configuration of Preventing Occurrence of Multiple Solutions in Solutions of Simultaneous Equation of Hyperboloid Equation and Linear Equation Next, the description is now given of configuration of preventing occurrence of multiple solutions in solutions of simultaneous equation of hyperboloid equation and linear equation.

As described earlier with reference to FIG. 22, as the processing for determining the distance of the object 30, the processing for solving the simultaneous equations below and calculating an intersection point of the hyperboloid and the straight line is described above.

[Math. 17]

$$Obs(\vec{u_D}, \vec{E_1}) - Obs(\vec{u_D}, \vec{E_2}) = |\vec{DE_1}| - |\vec{DE_2}| \quad \text{(Formula 22)}$$

$$\vec{OD} = D\vec{d} \quad \text{(Formula 23)}$$

In other words, (Formula 22) and (Formula 23) form the simultaneous equations. (Formula 22) is the difference calculation formula of the distance calculation formula from the two light sources. (Formula 23) is the linear equation determined by a line connecting the rangefinder (camera) 20 and the object 30, that is, the linear equation including the unit vector d in the direction of the vector OD from the origin O of the rangefinder (camera) 20 to the surface D of the object 30.

As described with reference to the descriptive part (A) of FIG. 22, two equations of the difference calculation formula (Formula 22) corresponding to the hyperboloid equation and (Formula 23) corresponding to the linear equation are solved as a simultaneous equation.

Thus, it is possible to calculate a point satisfying the two equations, that is, an intersection point, as illustrated in the diagrammatic part (B1) of FIG. 22.

As illustrated in the diagrammatic part (B1) of FIG. 22, this intersection point is the position (x,y,z) of the surface position D of the object 30.

Thus, two equations of the difference calculation equation (Formula 22) corresponding to the hyperboloid equation and (Formula 23) corresponds to a linear equation are solved as simultaneous equations. Thus, it is possible to calculate the position (x,y,z) of the surface D of the object 30. This position (x,y,z) is a coordinate indicating the position of the camera coordinate system. It is possible to calculate the distance D from the origin O of the camera coordinate system on the basis of the position (x,y,z).

However, as illustrated in the diagrammatic part (B2) of FIG. 22, two intersection points caused by the difference calculation formula (Formula 22) corresponding to the hyperboloid equation and (Formula 23) corresponding to the linear equation will be detected, that is, there is a possibility that a plurality of solutions, what is called multiple solutions, can occur in the simultaneous equations.

A description is now given of the arrangement restriction of a subject used to prevent the occurrence of such multiple solutions, that is, an object to be measured for distance.

Figure 28:
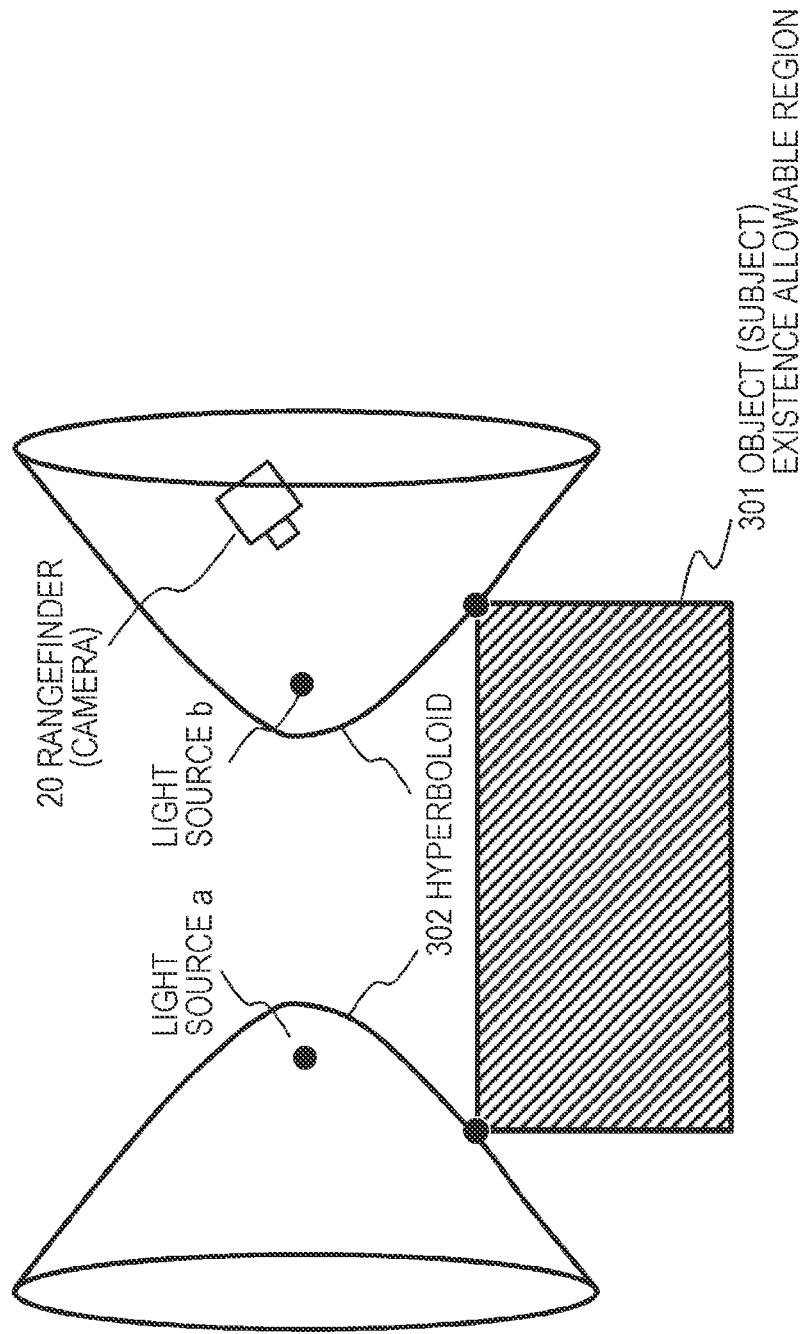
FIG. 28 is a diagram illustrated to describe an exemplary configuration of preventing the occurrence of multiple solutions in a solution of simultaneous equations of a hyperboloid equation and a linear equation.

FIG. 28 is a diagram illustrating an example of the arrangement restrictions of the object 30 used to prevent the occurrence of multiple solutions.

As illustrated in FIG. 28, an object (subject) existence allowable region 301 of a subject, that is, an object to be measured for distance, is defined in advance.

Subsequently, the hyperboloid 302 tangent to the endpoint of the object (subject) existence allowable region 301 is determined. In this event, the surface where the hyperboloid 302 is tangent to the endpoint of the object (subject) existence allowable region 301 and the absolute value of k defined by the following formula (Formula 41) is the maximum value is calculated.

[Math. 18]

$$|\vec{DE_1}| - |\vec{DE_2}| = k \quad \text{(Formula 41)}$$

The value k calculated by (Formula 41) above corresponds to the difference between the distance between the object 30 and the light source a and the distance between the object 30 and the light source b.

The camera, that is, the rangefinder (camera) 20, is arranged at a position as shown in the figure in the inner region of the hyperboloid defined by this condition.

Such arrangement makes it possible to create a setting in which multiple solutions are prevented from occurring in the simultaneous equations formed by the difference calculation formula (Formula 22) corresponding to the hyperboloid equation and (Formula 23) corresponding to the linear equation, that is, two intersection points are prevented from being detected.

Figure 29:
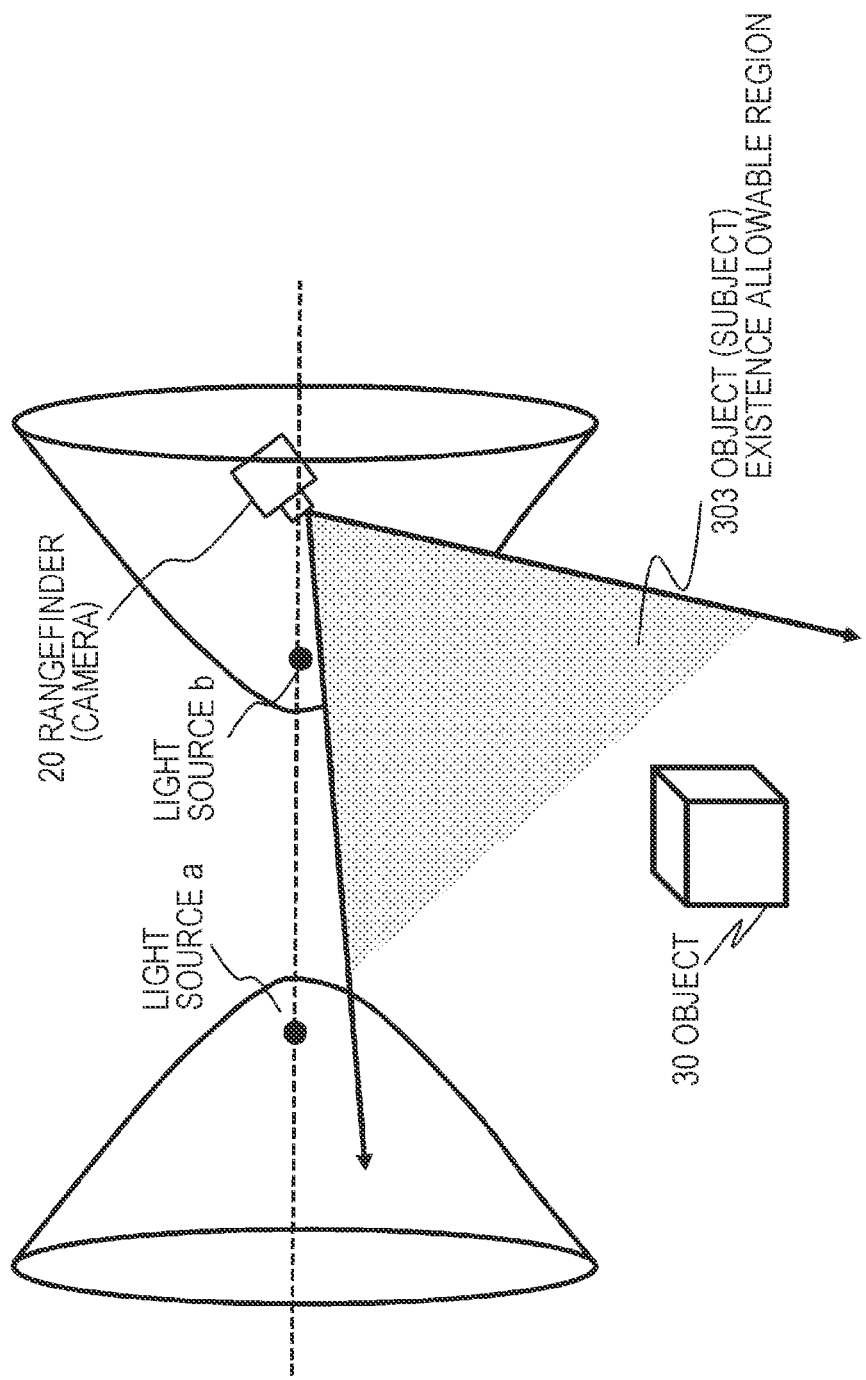
FIG. 29 is a diagram illustrated to describe an exemplary configuration of preventing the occurrence of multiple solutions in a solution of simultaneous equations of a hyperboloid equation and a linear equation.

FIG. 29 is an example of setting conditions different from FIG. 28 to prevent multiple solutions from occurring in the simultaneous equations.

The example illustrated in FIG. 29 is an example of the arrangement restriction in which the light sources a and b and the camera, i.e., the rangefinder (camera) 20 are arranged to satisfy the conditions as follows:

(Condition A) Arrange light sources a and b and a camera, that is, the rangefinder (camera) 20 in a straight line, and (Condition B) Tilt the optical axis (shooting direction) of the rangefinder (camera) 20 from the straight line described above.

The arrangement of the light sources and the rangefinder (camera) 20 satisfying these conditions A and B makes it possible to create a setting in which multiple solutions are prevented from occurring in the simultaneous equations formed by the difference calculation formula (Formula 22) corresponding to the hyperboloid equation and (Formula 23) corresponding to the linear equation, that is, two intersection points are prevented from being detected.

For example, it is possible to arrange the object 30 to be measured for distance in an object (subject) existence allowable region 303 illustrated in FIG. 29.

10. Exemplary Configuration Using Multiple Light Source Units

An exemplary configuration using a plurality of light source units is now described. The rangefinding system of the present disclosure has technical features that the light source unit can be configured independently of the rangefinder (camera).

Figure 30:
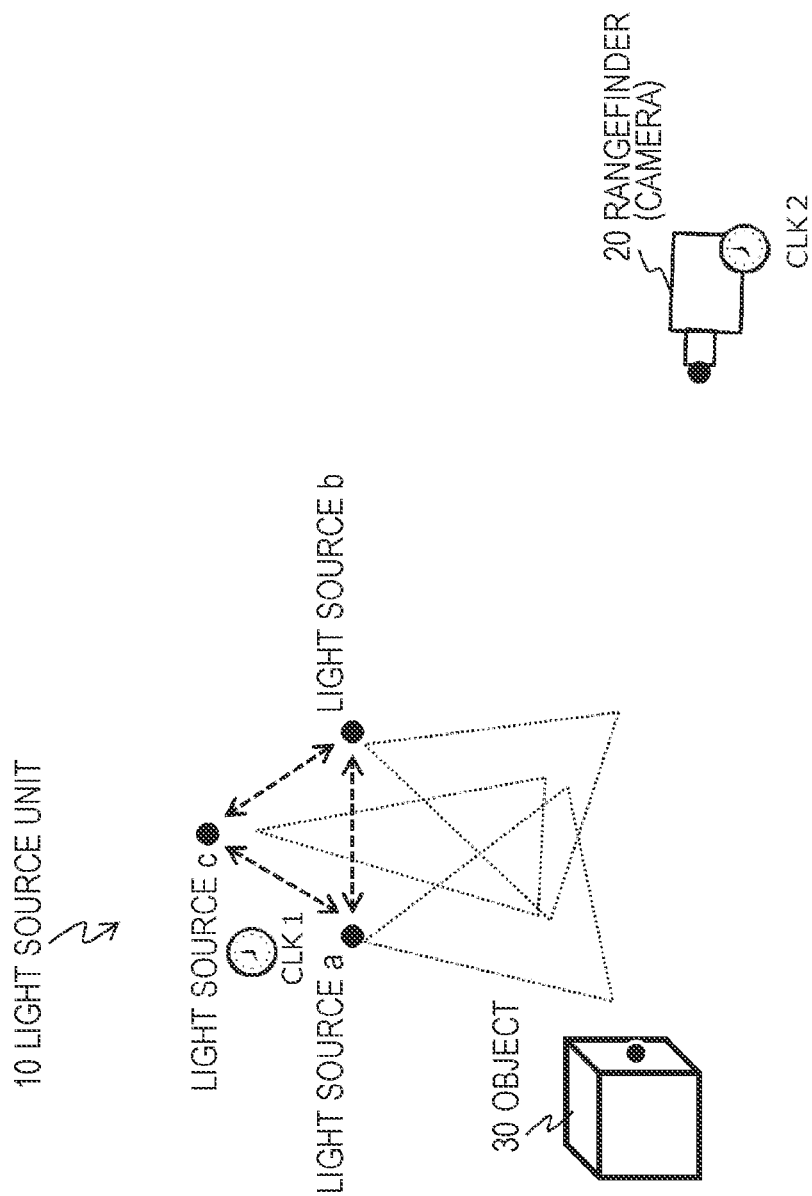
FIG. 30 is a diagram illustrated to describe characteristics of the rangefinding system of the present disclosure.

In other words, as illustrated in FIG. 30, it is possible to control the light source unit 10 under a clock different from that of the rangefinder (camera) 20, configure the light source unit independently of the rangefinder (camera), and place the light source unit 10 at any position.

Thus, it is possible to place the light source unit 10 near the object 30 to be measured for distance, shortening the optical path until the light from each light source of the light source unit 10 is reflected from the surface of the object 30 and is incident on the sensor (ToF sensor) of the rangefinder (camera) 20. This configuration makes it possible for the sensor (ToF sensor) of the rangefinder (camera) 20 to receive high-intensity light, improving the detection accuracy.

Moreover, the light rays from the light sources a to c of the light source unit 10 are controlled individually so that the light rays reach the rangefinder (camera) 20 without interfering with each other. Thus, for example, the driving of the light source is controlled as follows:

(a) Drive light sources in time division,
(b) Set the light emission frequency of each light source differently. For example, the light emission frequency of each light source is set to be different, such as one time, two times, or three times the clock frequency, and
(c) Change a wavelength used by each light source. For example, use the light with different wavelengths such as 850 nm, 905 nm, and 940 nm.

Figure 31:
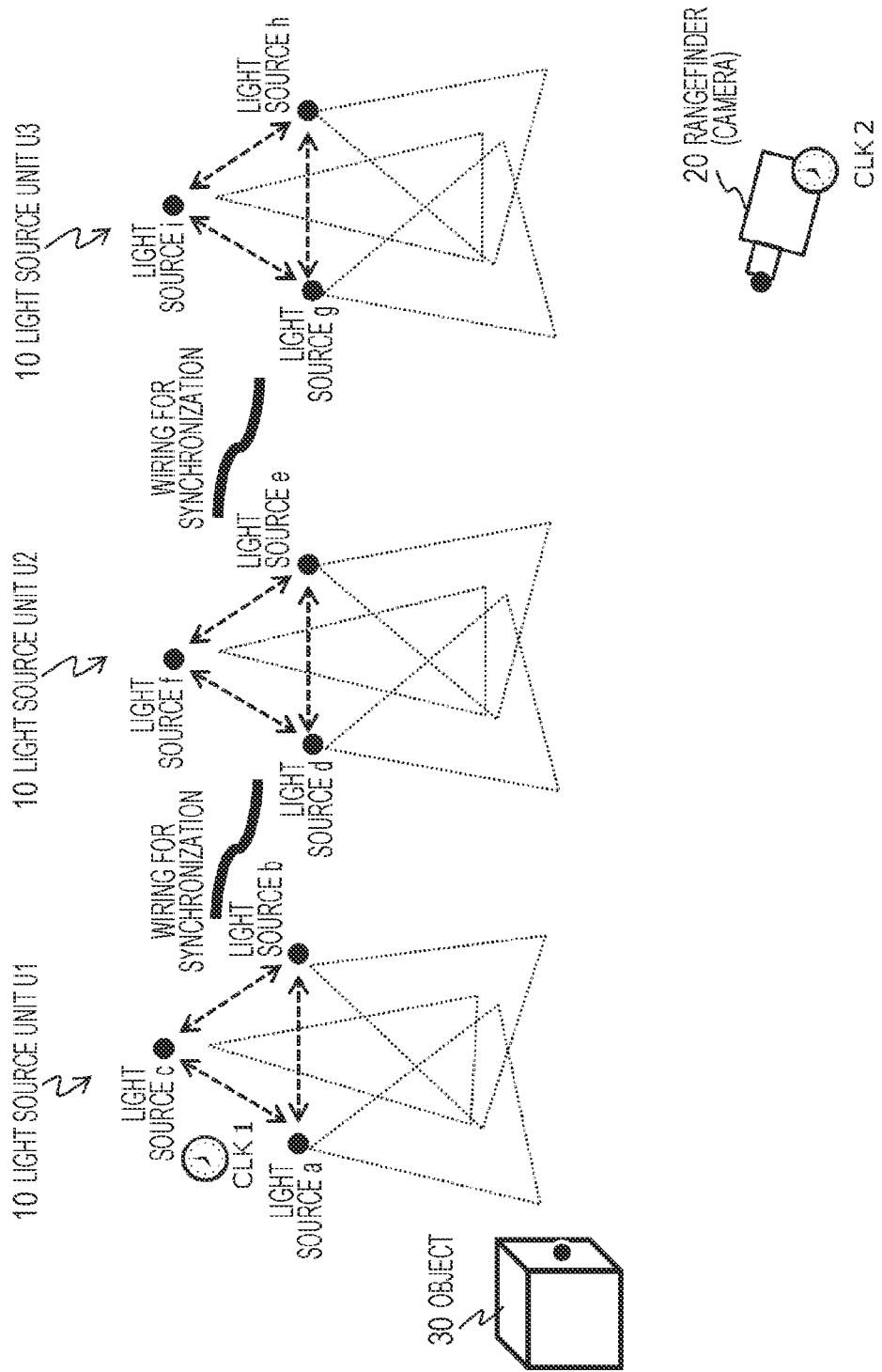
FIG. 31 is a diagram illustrated to describe an exemplary configuration using a plurality of light source units.

The use of such characteristics resulting in the configuration illustrated in FIG. 31 makes it possible, for example, to achieve a configuration in which distances are measurable for various objects arranged in a wide space.

In other words, as illustrated in FIG. 31, a plurality of light source units U1 to U3 is linked together and connected with wirings for synchronization, so the light emission of them is controlled by one clock.

The light source units U1 to U3 are connected with wirings for synchronization, and the light emission of them is controlled at a timing specified under the control of one clock.

However, the light sources a to i of each of the light source units are controlled individually so that the light rays reach the rangefinder (camera) 20 without interfering with each other. Specifically, for example, the driving of the light source is controlled as follows:

(a) Drive light sources in time division,
(b) Set the light emission frequency of each light source differently. For example, the light emission frequency of each light source is set to be different, such as one time, two times, or three times the clock frequency, and
(c) Change a wavelength used by each light source. For example, use the light with different wavelengths such as 850 nm, 905 nm, and 940 nm.

Such a configuration makes it possible to accurately measure the distances of various objects placed in a colored space. A specific usage example is illustrated in FIG. 32.

Figure 32:
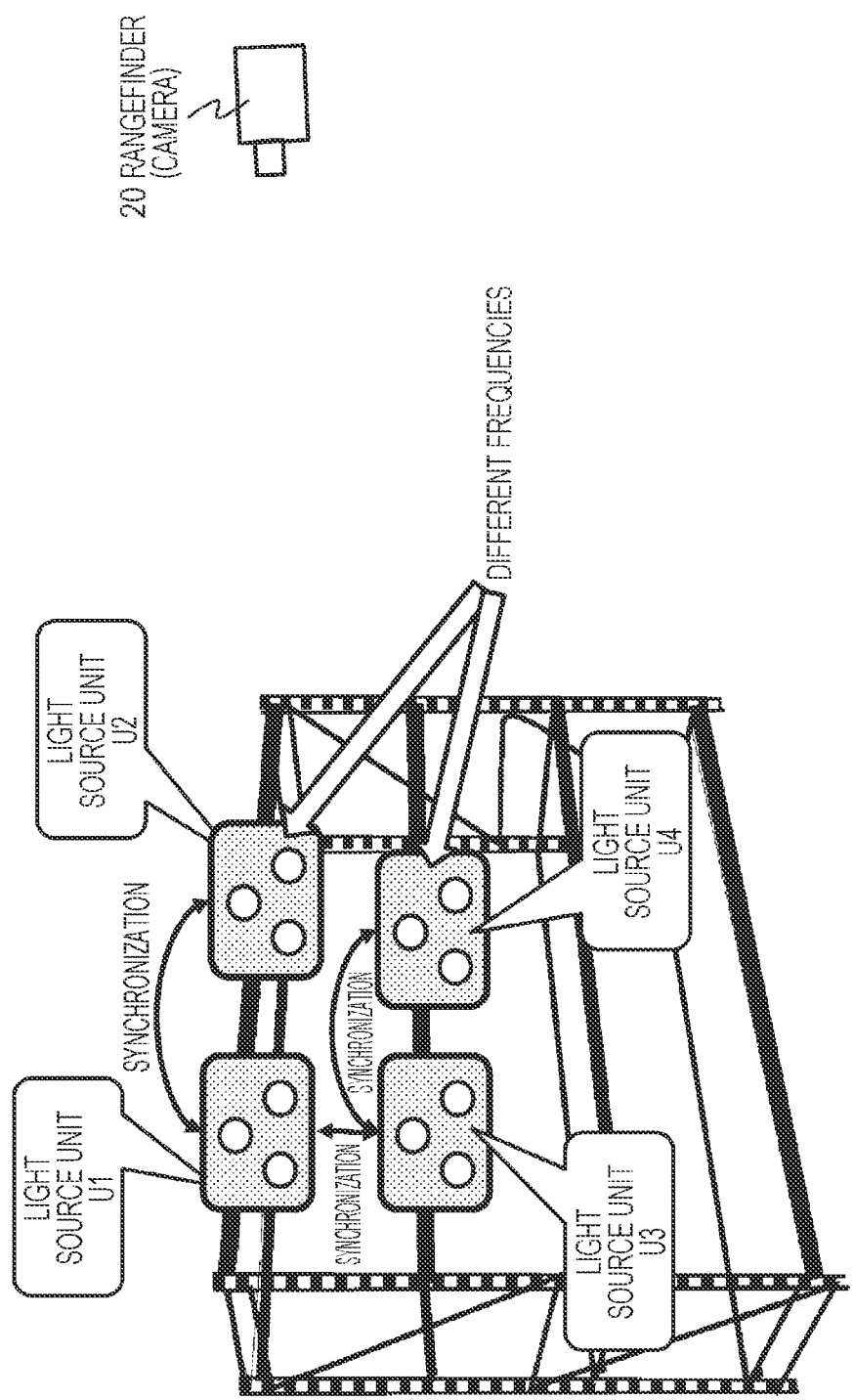
FIG. 32 is a diagram illustrated to describe an exemplary configuration using a plurality of light source units.

FIG. 32 illustrates, for example, a plurality of light source units arranged on a shelf in a warehouse. The respective light source units are connected wirings for synchronization and are under the control of one clock.

Different articles are placed on each shelf, and the light from the light source is reflected from the surface of each article and incident on the ToF sensor of the rangefinder (camera) 20. The ToF sensor calculates the distance on the basis of the highest intensity light in the input light. Such a configuration makes it possible to measure the distance to each object at various positions in a wide space with high accuracy.

11. Other Usage Examples of Rangefinding System of the Present Disclosure

Next, the description is given of other usage examples of rangefinding system of the present disclosure.

Figure 33:
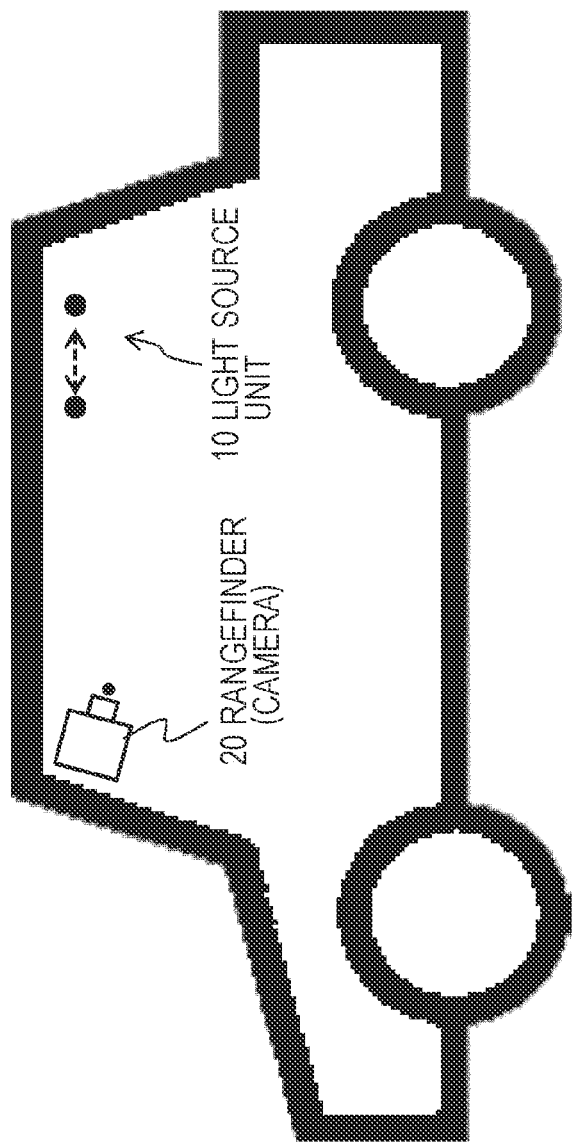
FIG. 33 is a diagram illustrated to describe a usage example of the rangefinding system of the present disclosure.

FIG. 33 illustrates a configuration in which the light source unit 10 and the rangefinder (camera) 20 are installed inside a vehicle.

This rangefinder is, for example, a device that is capable of detecting the posture or the like of the driver.

For example, it can be used for the emergency stop of the vehicle in the case where the driver is in a position that leans against the steering wheel due to a sudden illness.

The output light of the light source unit 10 is applied to the driver's head or the like, and its reflected light is captured by the rangefinder (camera) 20 to detect the driver's posture. When a posture different from the normal posture of the driver is detected, it is possible to take measures such as outputting an alarm or making an emergency stop of the vehicle.

Figure 34:
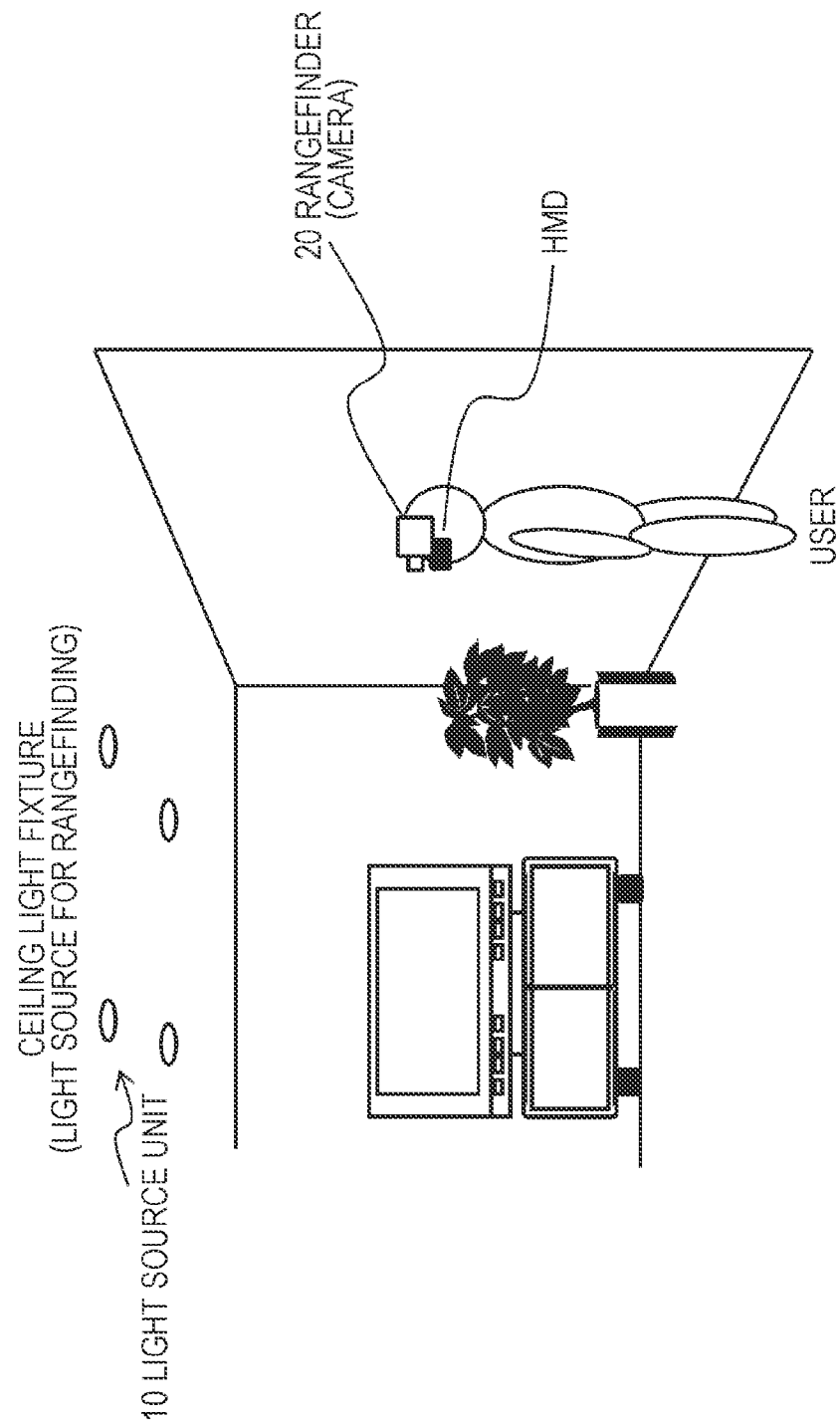
FIG. 34 is a diagram illustrated to describe a usage example of the rangefinding system of the present disclosure.

FIG. 34 illustrates a setting in which a user in the living room is wearing a head-mounted display (HMD) and is enjoying the game while viewing a virtual reality (VR) image.

The HMD displays a real-world view captured by the camera and a virtual image such as, for example, animation, by combining them.

An image such as animation is necessary to be displayed and moved by combining it with various objects existing in the actual captured image.

For example, the animation animal moves on the floor of the living room, the side of the TV, or the like shown in the figure.

The display of such a VR image on the HMD is necessary to accurately measure the distance to an actual object.

The system of the present disclosure is used for this rangefinding. For example, a ceiling light fixture shown in the figure is used as the light source unit 10 of the system of the present disclosure, and the rangefinder (camera) 20 of the present disclosure is built in the HMD worn by the user.

Such a system enables the rangefinder (camera) 20 on the side of the HMD to analyze the reflected light of the output light from the light source unit 10 configured as the ceiling light fixture and to accurately measure the distance to various objects such as the floor, television, and foliage plants in the living room. The use of the distance information for virtual object display control in the HMD makes it possible to output a highly accurate VR image.

Figure 35:
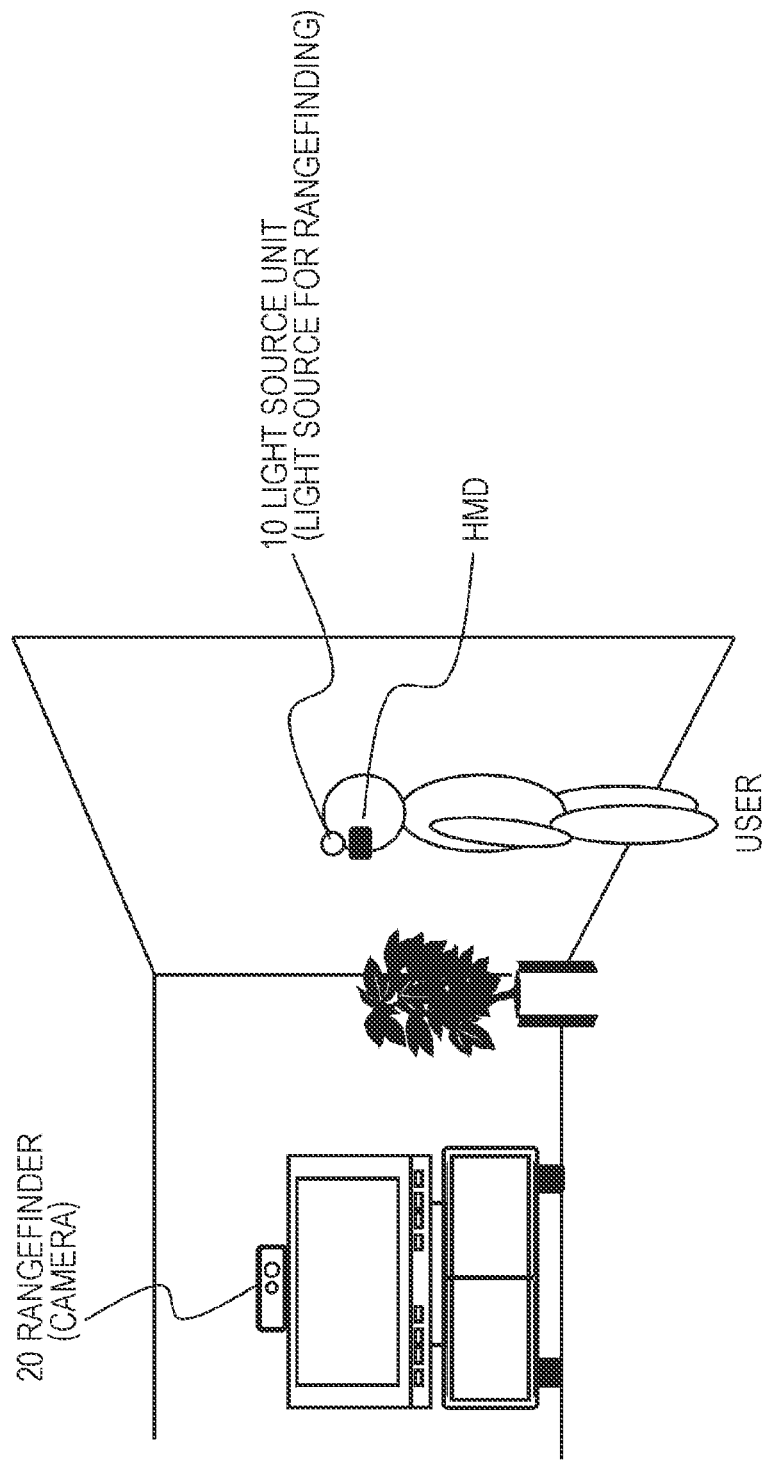
FIG. 35 is a diagram illustrated to describe a usage example of the rangefinding system of the present disclosure.

Moreover, in the example illustrated in FIG. 34, the description is given of the exemplary configuration in which the rangefinder (camera) 20 is incorporated into the HMD. However, for example, as illustrated in FIG. 35, the rangefinder (camera) 20 can be configured separately from the HMD. In the example illustrated in FIG. 35, the rangefinder (camera) 20 is placed on the television, and the light source unit 10 is provided on the side of the HMD.

Such a configuration enables the light from the light source incorporated into the HMD on the user's side to be reflected from various objects in the living room and the reflected light to be incident on the ToF sensor in the rangefinder (camera) 20 on the television. Thus, it is possible to analyze the light-receiving signal to measure the distance of each object. The rangefinding information is transmitted to the HMD or the television via, for example, Wi-Fi or the like, and a VR image using the rangefinding information is output to the HMD or the television.

Figure 36:
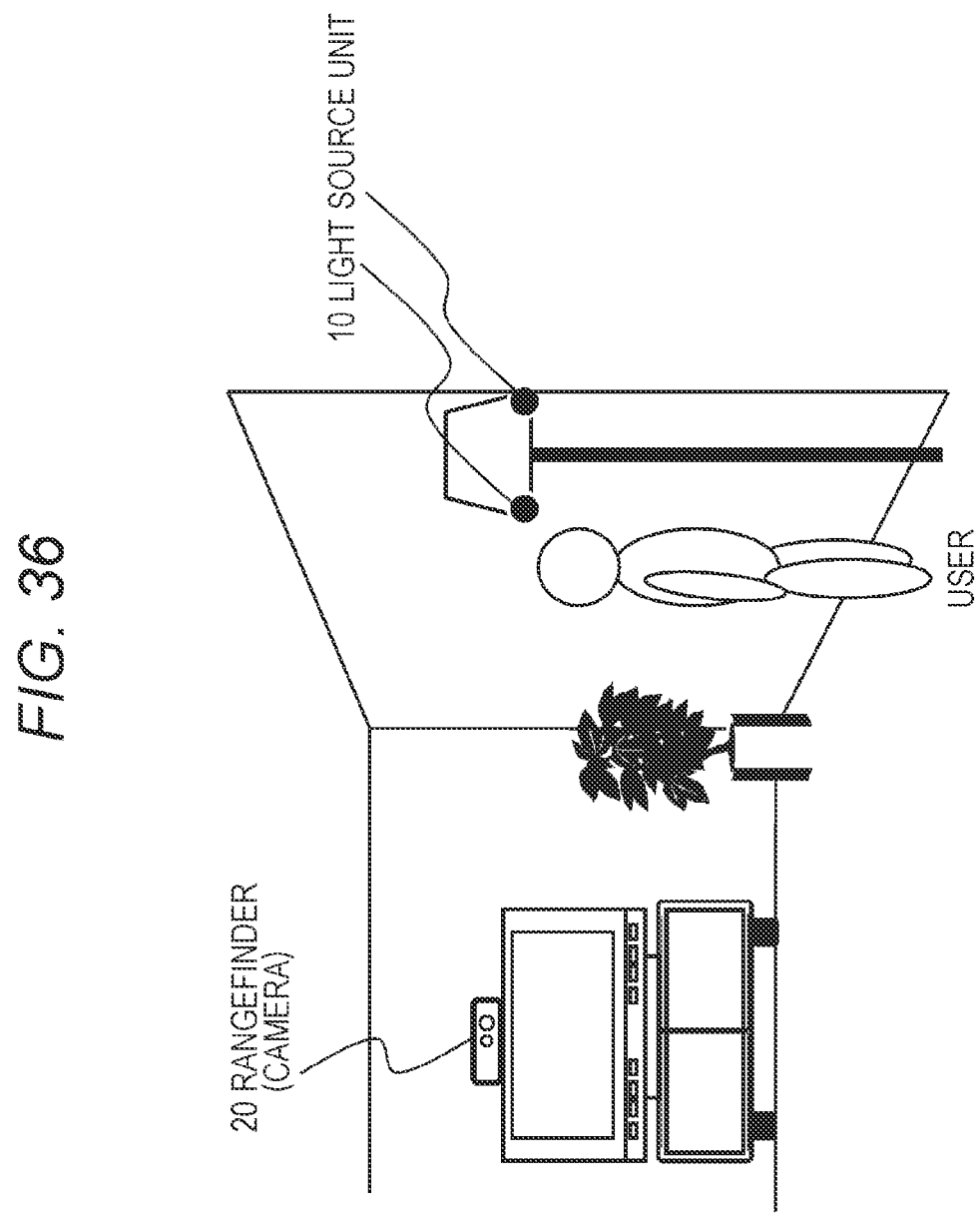
FIG. 36 is a diagram illustrated to describe a usage example of the rangefinding system of the present disclosure.

The exemplary arrangement of the light source unit 10 and the rangefinder (camera) 20 can have various configurations. For example, as illustrated in FIG. 36, the light source unit 10 can be arranged on a floor lamp placed in the living room.

Figure 37:
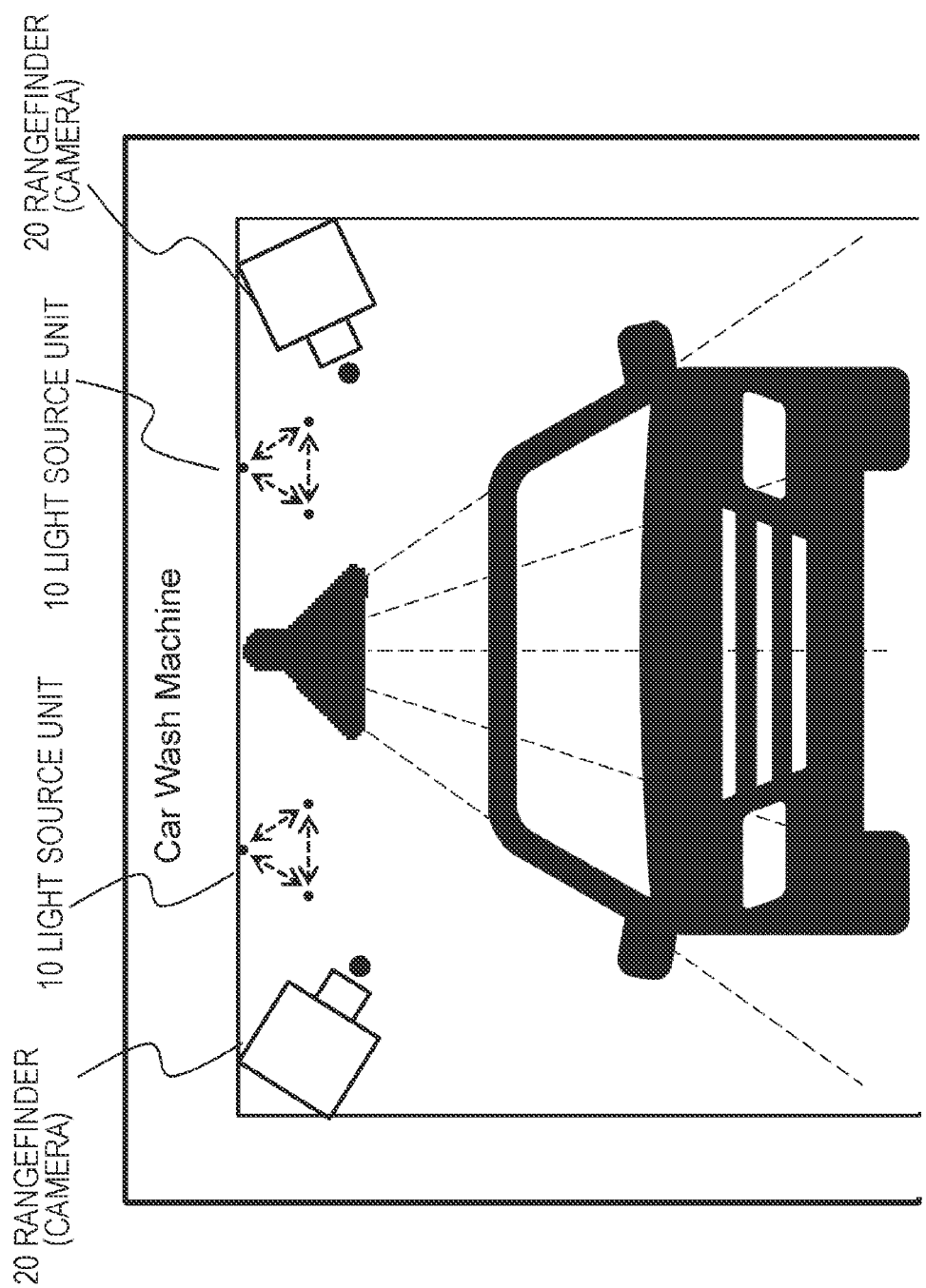
FIG. 37 is a diagram illustrated to describe a usage example of the rangefinding system of the present disclosure.

As another usage example of the rangefinding system of the present disclosure, for example, a usage example of a car wash machine is illustrated in FIG. 37.

The car wash machine can be necessary to measure the position of the car to be washed accurately to perform the optimum washing processing.

For that purpose, the rangefinding system of the present disclosure can be used. The light source unit 10 and the rangefinder (camera) 20 are arranged on the ceiling and side surfaces of the car wash machine.

This configuration causes the light from the light source unit 10 to be reflected from the vehicle's surface and incident on the ToF sensor of the light source unit 10. The analysis of the reflected light makes it possible to accurately measure the distance to the vehicle surface, allowing for optimal control of water pressure adjustment, cleaning agent injection amount, or the like, thereby achieving more efficient cleaning.

12. Exemplary Hardware Configuration of Rangefinder

A description is now given of an exemplary hardware configuration of the rangefinder will be described with reference to FIG. 38.

Figure 38:
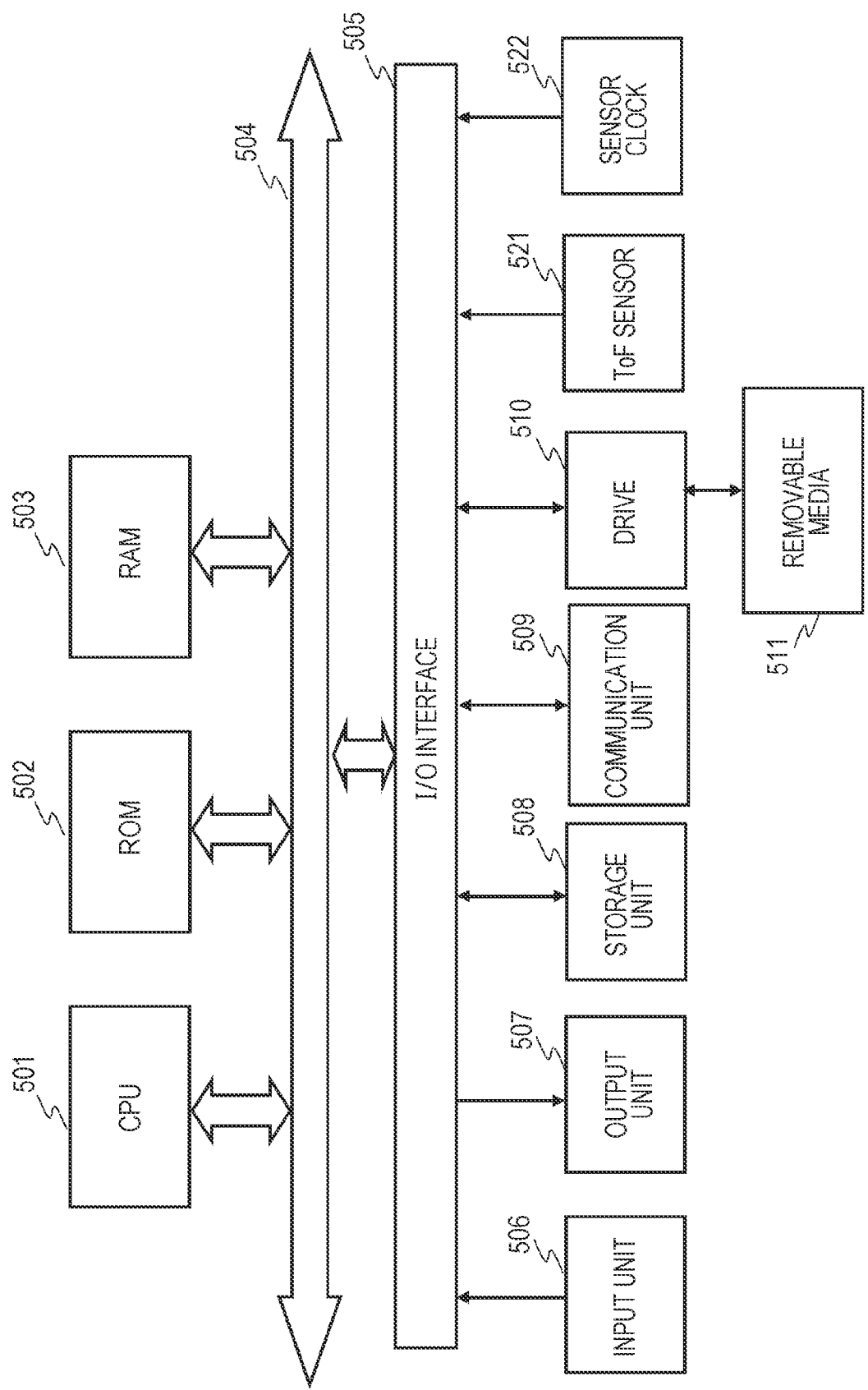
FIG. 38 is a diagram illustrated to describe an exemplary hardware configuration of the rangefinder of the present disclosure.

Moreover, FIG. 38 is a diagram illustrating an exemplary configuration of hardware available as the rangefinder described in the embodiments mentioned above.

A central processing unit (CPU) 501 functions as a data processing unit that executes various processes in accordance with programs stored in a read-only memory (ROM) 502 or a storage unit 508. For example, the processing according to the sequence described in the above-described embodiments is performed. The program to be executed by the CPU 501, data, and the like are stored in a random access memory (RAM) 503. The CPU 501, the ROM 502, and the RAM 503 are mutually connected via a bus 504.

The CPU 501 is connected to an input/output interface 505 via the bus 504. An input unit 506 including any of various switches, a keyboard, a mouse, a microphone, or the like, an output unit 507 including a display, a speaker, or the like, are connected to the input/output interface 505.

The CPU 501 executes various processes in response to an instruction input from the input unit 506, and outputs processing results to, for example, the output unit 507.

The storage unit 508 connected to the input/output interface 505 is configured using, for example, a hard disk and the like, and stores a program to be executed by the CPU 501 and various types of data. The communication unit 509 functions as a data communication transceiver unit via a network such as the Internet, a local area network, and furthermore as a transceiver unit for a broadcast wave, and communicates with an external device.

A drive 510 connected to the input/output interface 505 drives removable media 511 such as a magnetic disk, an optical disk, a magneto-optical disk, and a semiconductor memory such as a memory card, and executes data recording or reading.

A ToF sensor 521 detects the object reflection light of the light output from the light source. A sensor clock 522 is used as a clock to control the light reception timing of the ToF sensor 521.

13. Summary of Configuration of the Present Disclosure

The embodiments of the present disclosure have been described in detail with reference to the specific embodiments. However, it is self-evident that those skilled in the art can make modifications and substitutions of the embodiments within a scope not departing from a gist of the present disclosure. In other words, the present invention has been disclosed in the form of exemplification, and should not be interpreted restrictively. In order to determine the gist of the present disclosure, the scope of claims should be taken into consideration.

Moreover, the technology disclosed in the specification herein may include the following configuration.

(1) A rangefinder including:
a time-of-flight (ToF) sensor configured to receive light reflected from a surface of an object, the reflected light being output from each of a plurality of light sources included in a light source unit; and
a distance calculation unit configured to analyze an output of the ToF sensor to calculate a distance to the object,
in which the ToF sensor has an image capturing timing controlled by a sensor clock and the light source unit has a light source-light emission timing controlled by a light source unit clock, the sensor clock being a clock specific to the rangefinder, different from the light source unit clock.

(2) The rangefinder according to (1), further including:
a sensor clock adjustment unit configured to perform control of eliminating or reducing a deviation in frequency between the sensor clock and the light source unit clock.

(3) The rangefinder according to (2), further including:
a clock deviation amount estimation unit configured to calculate an amount of the deviation in frequency between the sensor clock and the light source unit clock,
in which the sensor clock adjustment unit
adjusts a frequency of the sensor clock depending on the amount of deviation in frequency estimated by the clock deviation amount estimation unit.

(4) The rangefinder according to any one of (1) to (3), further including:
a light source position estimation unit configured to analyze a position of each light source of the light source unit.

(5) The rangefinder according to (4), in which the light source position estimation unit
creates, as three distance calculation formulas for calculating a distance from at least three light sources provided in the light source unit to the rangefinder,
the three distance calculation formulas formed by data items (a) to (c) as follows:
(a) data regarding a distance between the rangefinder and the object,
(b) data regarding a distance between the object and each light source of the light source unit, and
(c) an offset C corresponding to a rangefinding error occurring due to a difference in phase between the sensor clock and the light source clock.

(6) The rangefinder according to (5), further including:
a distance calculation unit configured to calculate the distance between the rangefinder and the object by creating three difference calculation formulas for calculating a difference of the respective distance calculation formulas and solving the created three difference calculation formulas as a simultaneous equation.

(7) The rangefinder according to (6), in which the difference calculation formula is
a formula that does not include the offset C corresponding to the rangefinding error occurring due to the difference in phase between the sensor clock and the light source clock.

(8) The rangefinder according to any one of (1) to (7), further including:
a distance calculation unit configured to calculate a distance between the rangefinder and the object by creating, as two distance calculation formulas for calculating a distance from at least two light sources provided in the light source unit to the rangefinder,
the two distance calculation formulas formed by data items (a) to (c) as follows:
(a) data regarding the distance between the rangefinder and the object,
(b) data regarding a distance between the object and each light source of the light source unit, and
(c) an offset C corresponding to a rangefinding error occurring due to a difference in phase between the sensor clock and the light source clock,
further by creating one difference calculation formula for calculating a difference of the respective distance calculation formulas, and
further by creating
(d) a linear equation determined by a line connecting the rangefinder and the object and
by solving the difference calculation formula and the linear equation as a simultaneous equation.

(9) The rangefinder according to (8), in which the difference calculation formula is
an equation that defines a hyperboloid using positions of two light sources of the light source unit as focal points, and
the distance calculation unit
calculates an intersection point between the hyperboloid defined by the difference calculation formula and the linear equation as a position of the object.

(10) A rangefinding system including:
a light source unit having a plurality of light sources; and
a rangefinder configured to receive light reflected from a surface of an object, the reflected light being output from each light source of the light source unit,
in which the rangefinder includes
a time-of-flight (ToF) sensor configured to receive the reflected light from the object, and
a distance calculation unit configured to analyze an output of the ToF sensor to calculate a distance to the object, and
the light source unit has a light source-light emission timing controlled by a light source unit clock and the ToF sensor of the rangefinder has an image capturing timing controlled by a sensor clock, the light source unit clock and the sensor clock being different independent clocks.

(11) The rangefinding system according to (10), in which the light source unit includes the plurality of light sources having a fixed relative position.

(12) The rangefinding system according to (10) or (11), in which the light source unit includes three or more light sources having a fixed relative position.

(13) The rangefinding system according to any one of (10) to (12), in which the rangefinding system includes
a plurality of light source units, each having the plurality of light sources, and
the plurality of light sources provided in the plurality of light source units has a light emission timing controlled by one light source unit clock.

(14) The rangefinding system according to any one of (10) to (13), in which
the plurality of light sources of the light source unit and the rangefinder are arranged on one straight line, and
the rangefinder captures input light from a direction different from a direction of the straight line with the ToF sensor.

(15) The rangefinding system according to any one of (10) to (14), further including:
a clock adjustment unit provided in at least one of the light source unit or the rangefinder, the clock adjustment unit being configured to perform control of eliminating or reducing a deviation in frequency between the sensor clock and the light source unit clock.

(16) A rangefinding method executed in a rangefinder, the method including:
a step of receiving, by a time-of-flight (ToF) sensor, light reflected from a surface of an object, the reflected light being output from each of a plurality of light sources included in a light source unit; and
a distance calculation step of calculating, by a distance calculation unit, a distance to the object by analyzing an output of the ToF sensor,
in which the distance calculation step is
a step of calculating the distance to the object by creating, as a plurality of distance calculation formulas for calculating a distance from the plurality of light sources of the light source unit to the rangefinder,
the plurality of distance calculation formulas formed by data items (a) to (c) as follows:
(a) data regarding a distance between the rangefinder and the object,
(b) data regarding a distance between the object and each light source of the light source unit, and
(c) an offset C corresponding to a rangefinding error occurring due to a difference in phase between a sensor clock and a light source clock, and further by creating a difference calculation formula for calculating a difference of the respective distance calculation formulas and by using the created difference calculation formula.

(17) A rangefinding method executed in a rangefinding system including a light source unit having a plurality of light sources and a rangefinder configured to receive light being output from each light source of the light source unit and being reflected from a surface of an object, the method including:
a step of emitting, by the light source unit, light from each light source of the light source unit at a light emission timing defined by a light source unit clock;
a step of executing, by a ToF sensor of the rangefinder, image capturing at an image capturing timing defined by a sensor clock different from the light source unit clock; and
a step of calculating, by a distance calculation unit of the rangefinder, a distance to the object by analyzing an output of the ToF sensor.

(18) A program causing a rangefinder to execute rangefinding processing including:
a step of causing a time-of-flight (ToF) sensor to receive light reflected from a surface of an object, the reflected light being output from each of a plurality of light sources included in a light source unit; and
a distance calculation step of causing a distance calculation unit to calculate a distance to the object by analyzing an output of the ToF sensor,
in which the distance calculation step performs
processing of creating, as a plurality of distance calculation formulas for calculating a distance from the plurality of light sources of the light source unit to the rangefinder,
the plurality of distance calculation formulas formed by data items (a) to (c) as follows:
(a) data regarding a distance between the rangefinder and the object,
(b) data regarding a distance between the object and each light source of the light source unit, and
(c) an offset C corresponding to a rangefinding error occurring due to a difference in phase between a sensor clock and a light source clock, and
further processing of creating a difference calculation formula for calculating a difference of the respective distance calculation formulas and processing of calculating the distance to the object using the created difference calculation formula.

Further, the series of processing described in the specification can be executed by hardware, software, or a complex configuration of the both. In a case where the processing is executed using software, it is possible to execute the processing by installing a program recording a processing sequence on a memory in a computer built into dedicated hardware or by installing a program in a general-purpose computer that can execute various processes. For example, the program can be recorded in a recording medium in advance. In addition to installing on a computer from the recording medium, it is possible to receive a program via a network, such as a local area network (LAN) and the Internet, and install the received program on a recording medium such as a built-in hard disk.

Note that various processes described in the specification not only are executed in a time-series manner according to the description but also may be executed in parallel or separately depending on the processing performance of an apparatus that executes the process or need. Furthermore, the term "system" in the present specification refers to a logical set configuration of a plurality of apparatuses, and is not limited to a system in which apparatuses of the respective configurations are provided in the same housing.

INDUSTRIAL APPLICABILITY

As described above, one embodiment of the present disclosure achieves a configuration of controlling a light source unit having a plurality of light sources and a rangefinder (camera) by individual clocks to allow for setting the light sources at optional positions.

Specifically, for example, the output light of a plurality of light sources of the light source unit is reflected from an object's surface, and a ToF sensor captures the reflected light to calculate the distance to the object. A sensor clock that controls the image capturing timing of the ToF sensor is the clock specific to the rangefinder, which is different from a light source unit clock that controls the light emission timing of the light sources of the light source unit. The rangefinder creates a difference calculation formula of a plurality of distance calculation formulas used to calculate the distance from each light source to the rangefinder to calculate the distance to the object using the created difference calculation formula.

The present configuration achieves a configuration of controlling a light source unit having a plurality of light sources and a rangefinder (camera) by individual clocks to allow for setting the light sources at optional positions.

REFERENCE SIGNS LIST

1 Light source
2 Camera (light-receiving unit)
3 Object
10 Light source unit
20 Rangefinder (camera)
30 Object
101 Light source unit clock
102 Light source control unit
103 to 105 Delay control unit
106 to 108 Light sources a to c
201 Sensor clock
202 ToF sensor
203 Moving subject detection unit
204 Phase calculation unit
205 Phase image memory
206 Light source position estimation unit
207 Light source unit position and orientation memory
208 Clock phase difference (light source clock offset) calculation unit
209 Clock phase difference (light source clock offset) memory
210 Clock deviation amount estimation unit
211 Sensor clock adjustment unit
220 Distance (depth) calculation unit
251 Phase-to-distance conversion unit
252 Difference calculation unit
253 Subject calculation unit
254 light source-position and orientation memory
256 Camera-light source coordinate system relative position DB
257 Coordinate conversion unit
271 Phase-to-distance conversion unit
272 Difference calculation unit
273 Internal parameter memory
274 Line-of-sight vector calculation unit 275 Subject position calculation unit
281 Line-of-sight vector calculation unit
282 Phase-to-distance conversion unit
283 Subject position calculation unit
301, 302 Object (subject) existence allowable region
501 CPU
502 ROM
503 RAM
504 Bus
505 Input/output interface
506 Input unit
507 Output unit
508 Storage unit
509 Communication unit
510 Drive
511 Removable media
521 ToF sensor
522 Sensor clock

The invention claimed is:

1. A rangefinder, comprising:
a time-of-flight (ToF) sensor configured to receive light reflected from a surface of an object, wherein the reflected light is output from each of a plurality of light sources included in a light source unit;
a sensor clock configured to control an image capture timing of the ToF sensor, wherein
the sensor clock is a clock specific to the rangefinder,
the light source unit has a light source-light emission timing controlled by a light source unit clock, and
the sensor clock is different from the light source unit clock; and
a distance calculation unit configured to:
analyze an output of the ToF sensor;
calculate a distance between the rangefinder and the object based on two distance calculation formulas, wherein
the two distance calculation formulas calculate a distance from at least two light sources of the plurality of light sources included in the light source unit to the rangefinder,
the two distance calculation formulas are based on first data related to the distance between the rangefinder and the object, second data related to a distance between the object and each light source of the plurality of light sources included in the light source unit, and an offset C that corresponds to a rangefinding error, and
the rangefinding error occurs based on a difference in phase between the sensor clock and the light source unit clock;
create one difference calculation formula to calculate a difference of a first distance calculation formula and a second distance calculation formula of the two distance calculation formulas;
create a linear equation based on a line that connects the rangefinder and the object; and
solve the difference calculation formula and the linear equation as a first simultaneous equation.

2. The rangefinder according to claim 1, further comprising:
a sensor clock adjustment unit configured to control elimination or reduction of a deviation in frequency between the sensor clock and the light source unit clock.

3. The rangefinder according to claim 2, further comprising:
a clock deviation amount estimation unit configured to calculate an amount of the deviation in the frequency between the sensor clock and the light source unit clock,
wherein the sensor clock adjustment unit is further configured to adjust a frequency of the sensor clock based on the amount of the deviation in the frequency estimated by the clock deviation amount estimation unit.

4. The rangefinder according to claim 1, further comprising:
a light source position estimation unit configured to analyze a position of each light source of the plurality of light sources included in the light source unit.

5. The rangefinder according to claim 4, wherein the light source position estimation unit is further configured to
create three distance calculation formulas to calculate a distance from at least three light sources of the plurality of light sources included in the light source unit to the rangefinder, wherein
the three distance calculation formulas are based on the first related to the distance between the rangefinder and the object, the second data related to the distance between the object and each light source of the plurality of light sources included in the light source unit, and the offset C that corresponds to the rangefinding error.

6. The rangefinder according to claim 5, wherein the distance calculation unit is further configured to:
calculate the distance between the rangefinder and the object based on three difference calculation formulas, wherein
the three difference calculation formulas calculate a difference of the first distance calculation formula, the second distance calculation formula, and a third distance calculation formula of the three distance calculation formulas; and
solve the three difference calculation formulas as a second simultaneous equation.

7. The rangefinder according to claim 6, wherein a difference calculation formula of the three difference calculation formulas is a formula that excludes the offset C that corresponds to the rangefinding error that occurs based on the difference in the phase between the sensor clock and the light source unit clock.

8. The rangefinder according to claim 1, wherein
the one difference calculation formula is an equation that defines a hyperboloid that uses positions of two light sources of the plurality of light sources included in the light source unit as focal points, and
the distance calculation unit is further configured to calculate an intersection point between the hyperboloid defined by the one difference calculation formula and the linear equation as a position of the object.

9. A rangefinding system, comprising:
a light source unit that comprises:
a plurality of light sources; and
a light source unit clock configured to control a light source-light emission timing of the light source unit; and
a rangefinder configured to receive light reflected from a surface of an object, wherein the reflected light is output from each light source of the plurality of light sources included in the light source unit, wherein the rangefinder includes:
a time-of-flight (ToF) sensor configured to receive the light reflected from the surface of the object;
a sensor clock configured to control an image capture timing of the ToF sensor, wherein
the sensor clock is a clock specific to the rangefinder, and
the light source unit clock and the sensor clock are different independent clocks; and
a distance calculation unit configured to:
analyze an output of the ToF sensor;
calculate a distance between the rangefinder and the object based on two distance calculation formulas, wherein
the two distance calculation formulas calculate a distance from at least two light sources of the plurality of light sources included in the light source unit to the rangefinder,
the two distance calculation formulas are based on first data related to the distance between the rangefinder and the object, second data related to a distance between the object and each light source of the plurality of light sources included in the light source unit, and an offset C that corresponds to a rangefinding error, and
the rangefinding error occurs based on a difference in phase between the sensor clock and the light source unit clock;
create one difference calculation formula to calculate a difference of a first distance calculation formula and a second distance calculation formula of the two distance calculation formulas;
create a linear equation based on a line that connects the rangefinder and the object; and
solve the difference calculation formula and the linear equation as a first simultaneous equation.

10. The rangefinding system according to claim 9, wherein the light source unit further includes the plurality of light sources having fixed relative positions.

11. The rangefinding system according to claim 9, wherein the light source unit further includes three or more light sources having fixed relative positions.

12. The rangefinding system according to claim 9, wherein
the rangefinding system further includes
a plurality of light source units, wherein each light source unit of the plurality of light source units has the plurality of light sources, and
the plurality of light sources included in the plurality of light source units has a light emission timing controlled by the light source unit clock.

13. The rangefinding system according to claim 9, wherein
the plurality of light sources of the light source unit and the rangefinder are on one straight line, and
the rangefinder is configured to capture input light from a direction different from a direction of the straight line with the ToF sensor of the rangefinder.

14. The rangefinding system according to claim 9, further comprising:
a clock adjustment unit in at least one of the light source unit or the rangefinder, wherein the clock adjustment unit is configured to control elimination or reduction of a deviation in frequency between the sensor clock and the light source unit clock.

15. A rangefinding method executed in a rangefinder, the method comprising:
receiving, by a time-of-flight (ToF) sensor of the rangefinder, light reflected from a surface of an object, wherein the reflected light is output from each of a plurality of light sources included in a light source unit;
calculating a distance to the object based on creating a plurality of distance calculation formulas, wherein
the plurality of distance calculation formulas calculates a distance from the plurality of light sources of the light source unit to the rangefinder,
the plurality of distance calculation formulas is based on first data regarding a distance between the rangefinder and the object, second data regarding a distance between the object and each light source of the plurality of light sources included in the light source unit, and an offset C corresponding to a rangefinding error,
the rangefinding error occurs based on a difference in phase between a sensor clock and a light source unit clock;
creating a difference calculation formula for calculating a difference of a first distance calculation formula and a second distance calculation formula of the plurality of distance calculation formulas; and
calculating the distance to the object based on the created difference calculation formula.

16. A rangefinding method executed in a rangefinding system, the method comprising:
emitting, by a light source unit of the rangefinding system, light from each light source of a plurality of light sources included in the light source unit at a light emission timing defined by a light source unit clock;
capturing an image, by a ToF sensor of a rangefinder of the rangefinding system, at an image capturing timing defined by a sensor clock different from the light source unit clock, wherein the rangefinder is configured to receive light reflected from a surface of an object;
calculating, by a distance calculation unit of the rangefinder, a distance between the rangefinder and the object based on two distance calculation formulas, wherein
the two distance calculation formulas calculate a distance from at least two light sources of the plurality of light sources included in the light source unit to the rangefinder,
the two distance calculation formulas are based on first data related to the distance between the rangefinder and the object, second data related to a distance between the object and each light source of the plurality of light sources included in the light source unit, and an offset C that corresponds to a rangefinding error, and
the rangefinding error occurs based on a difference in phase between the sensor clock and the light source unit clock;
creating one difference calculation formula to calculate a difference of a first distance calculation formula and a second distance calculation formula of the two distance calculation formulas;
creating a linear equation based on a line that connects the rangefinder and the object; and
solving the difference calculation formula and the linear equation as a simultaneous equation.

17. A non-transitory computer-readable medium having stored thereon computer-executable instructions that, when executed by a computer, cause the computer to execute operations, the operations comprising:

receiving, by a time-of-flight (ToF) sensor of a rangefinder, light reflected from a surface of an object, wherein the reflected light is output from each of a plurality of light sources included in a light source unit;

calculating a distance to the object based on creating a plurality of distance calculation formulas, wherein
- the plurality of distance calculation formulas calculates a distance from the plurality of light sources of the light source unit to the rangefinder,
- the plurality of distance calculation formulas is based on first data regarding a distance between the rangefinder and the object, second data regarding a distance between the object and each light source of the light source unit, and an offset C corresponding to a rangefinding error,
- the rangefinding error occurs based on a difference in phase between a sensor clock and a light source unit clock;

creating a difference calculation formula for calculating a difference of a first distance calculation formula and a second distance calculation formula of the plurality of distance calculation formulas; and calculating the distance to the object based on the created difference calculation formula.

* * * * *